US010762516B2

United States Patent
Lane et al.

(10) Patent No.: US 10,762,516 B2
(45) Date of Patent: Sep. 1, 2020

(54) TRUSTED PLATFORM AND INTEGRATED BOP APPLICATIONS FOR NETWORKING BOP COMPONENTS

(71) Applicant: THE DUN & BRADSTREET CORPORATION, Short Hills, NJ (US)

(72) Inventors: Eoin Lane, County Dublin (IE); Anjana Bhattacharyya, New York, NY (US); Yuan Niu, Westfield, NJ (US); Xin Yuan, Basking Ridge, NJ (US); Nipa Basu, Warren, NJ (US)

(73) Assignee: THE DUN & BRADSTREET CORPORATION, Short Hills, NJ (US)

( * ) Notice: Subject to any disclaimer, the term of this patent is extended or adjusted under 35 U.S.C. 154(b) by 0 days.

(21) Appl. No.: 15/671,747

(22) Filed: Aug. 8, 2017

(65) Prior Publication Data

US 2018/0040007 A1     Feb. 8, 2018

Related U.S. Application Data

(60) Provisional application No. 62/372,135, filed on Aug. 8, 2016.

(51) Int. Cl.
*G06Q 10/00* (2012.01)
*G06Q 30/02* (2012.01)
(Continued)

(52) U.S. Cl.
CPC ..... *G06Q 30/0201* (2013.01); *G06Q 10/0637* (2013.01); *G06Q 20/382* (2013.01); *G06Q 40/12* (2013.12); *G06Q 50/01* (2013.01)

(58) Field of Classification Search
CPC .............. G06Q 30/0201; G06Q 40/12; G06Q 10/0637; G06Q 20/382; G06Q 50/01
See application file for complete search history.

(56) References Cited

U.S. PATENT DOCUMENTS

2004/0111302 A1* 6/2004 Falk ................. G06Q 10/10
705/4
2009/0049514 A1* 2/2009 Yan .................. G06F 21/445
726/1
(Continued)

FOREIGN PATENT DOCUMENTS

WO    2015135018 A1    9/2015
WO    WO-2015135018 A1 * 9/2015    ........... G06Q 20/065

OTHER PUBLICATIONS

Understanding modern banking ledgers through blockchain technologies: Future of transaction processing and smart contracts on the internet of money GW Peters, E Panayi—Banking beyond banks and money, 2016—Springer (Year: 2016).*

(Continued)

*Primary Examiner* — Jonathan G Sterrett
(74) *Attorney, Agent, or Firm* — Ohlandt, Greeley, Ruggiero & Perle, L.L.P.

(57) ABSTRACT

Embodiments are directed to a trusted platform powered by a client-side company application that implements a Business Organizing Principle ("BOP") for a company and distributed immutable ledger, which provides the company with secure transactions and transaction data.
The application's Business Organizing Principle identifies the business components for a company (e.g., HR, marketing, suppliers, etc.) which the application identifies as core, medium-core, and non-core. The application can then suggest and link the business to other businesses on the network based on matching BOP components. The platform's scoring engine uses the ledger's trusted transactions to generate a BOP network score and "local score" to augment traditional thereby creating a quickly developed trusted ecosystem for horizontal B2B integration between not just businesses, but business components.

22 Claims, 42 Drawing Sheets

(51) Int. Cl.
*G06Q 40/00* (2012.01)
*G06Q 10/06* (2012.01)
*G06Q 20/38* (2012.01)
*G06Q 50/00* (2012.01)

(56) References Cited

U.S. PATENT DOCUMENTS

| | | | | |
|---|---|---|---|---|
| 2011/0010309 | A1* | 1/2011 | Dunagan | G06Q 10/10 |
| | | | | 705/36 R |
| 2011/0078452 | A1* | 3/2011 | Bleckmann | G06F 21/57 |
| | | | | 713/176 |
| 2015/0256391 | A1* | 9/2015 | Hardy | H04L 41/0806 |
| | | | | 709/222 |
| 2015/0379442 | A1* | 12/2015 | Samanthapudi | G06Q 10/0633 |
| | | | | 705/7.27 |
| 2017/0200137 | A1* | 7/2017 | Vilmont | G06Q 20/10 |
| 2017/0228705 | A1* | 8/2017 | Sandor | G06Q 20/065 |
| 2017/0243287 | A1* | 8/2017 | Johnsrud | G06Q 40/025 |
| 2017/0364934 | A1* | 12/2017 | Tiell | G06Q 30/0201 |
| 2017/0372278 | A1* | 12/2017 | Frolov | G06Q 20/0655 |

OTHER PUBLICATIONS

International Search Report dated Oct. 24, 2017 from corresponding International PCT Application No. PCT/US2017/045911, 3 pages.
Written Opinion of the International Searching Authority dated Oct. 24, 2017 from corresponding International PCT Application No. PCT/US2017/045911, 11 pages.
IBM Business Consulting Services, "Component Business Models: Making specialization real", Aug. 2005, 19 pages, IBM, USA.
International Preliminary Report on Patentability dated Aug. 10, 2018 from corresponding PCT International Application No. PCT/US2017/045911, 17 pages.
Swan: "E-Commerce", Jan. 22, 2015 (Jan. 22, 2015), XP055406241, Retrieved from the Internet: URL:http://w2.blockchain-tec.net/blockchain/blockchain-by-melanie- swan.pdf, 150 pages.
Anonymous: "Blockchain—Wikipedia" ,Aug. 7, 2016 (Aug. 7, 2016), XP055664551, Retrieved from the Internet: URL:https://en.wikipedia.org/w/index.php?title=Blockchain&oldid=733458189#Blocks, 6 pages.
Supplementary European Search Report dated Feb. 27, 2020 in corresponding European Patent Application No. 17840144.4, 10 pages.

* cited by examiner

FIG. 13

TRUSTED PLATFORM AND INTEGRATED BOP APPLICATIONS FOR NETWORKING BOP COMPONENTS

CROSS REFERENCE TO RELATED APPLICATIONS

The present application claims priority to U.S. Provisional Patent Application No. 62/372,135, filed on Aug. 8, 2016, the entirety of which is incorporated by reference hereby.

BACKGROUND

Extant technology for business to business transactions do not provide a reliable platform for encouraging collaboration between businesses. Often established businesses rely on vertical relationships and proprietary internal technology in lieu of trusting outsiders, which comes at the expense of flexibility and interoperability in responding to fast growth in the open market. Other businesses may be more flexible and comfortable with interoperability, but have no technological platform to secure trusted relationships with other businesses or financiers. Finally, no known technological platform exists that can identify, create and verify trusted relationships between the varied components and competencies of different businesses.

SUMMARY

The following briefly describes embodiments in order to provide a basic understanding of some aspects of these embodiments. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to a technological platform for the generation and linking of Business Organizing Principal ("BOP") components for a business to create a trusted network. A BOP Application and platform enables a business to define its decision boundaries by breaking the business down into components. For purposes of simplification, examples of components are given as HR, Billing, Suppliers, Operations, Finance, Marketing, and Sales for a small company. However, BOP component modules can be configured for any business section, and can be configured with as many categories as needed to meet the size and complexity of any business. BOP components allow for more flexible horizontal integration with other businesses, or even more flexible vertical integration for extremely large entities.

The BOP is a useful management framework for setting goals, tracking activity etc. One advantageous use is the ability of the business to review each element, and determine whether it should perform this role internally, or consider engaging an external specialist.

Briefly stated, various embodiments are directed to a system, method, computer program product and application for providing a trusted network platform.

In at least one of the various embodiments, described is a system for providing a trusted network platform comprising:
a system configured to support a client application for a trusted platform, the application comprising
a Business Organizing Principle ("BOP") module for a client business entity, the BOP module comprising a BOP tool for identifying a plurality of BOP components, the BOP tool comprising a tool for distinguishing core BOP components,
a BOP component matching module configured to generate matching information, wherein the BOP component matching module is configured to at least:
match a BOP component to one or more scored business entities that can provide goods or services matched to the BOP component, wherein the BOP component is matched to a scored business entity based on one or more trusted scores for the scored business entity,
match a BOP component with at least one other BOP component based on at least one scored BOP component, and
a scoring tool configured to provide one or more trusted scores for a business, the scores including
a BOP network score, wherein the BOP network score is derived from validation data between BOP components, the validation data being derived from at least one distributed immutable ledger shared with a client registered to the application;
wherein the scoring tool is configured to use matching information from BOP component matches to calculate at least one score for the BOP business entity.

In at least one of the various embodiments, the application can comprise a data management tool configured to log transactions between matched BOP components on the distributed immutable ledger and matching information generated by the matching module to a client business entity database; and a transaction tool configured to transact on the distributed immutable ledger, wherein the distributed immutable ledger is configured to encrypt blocks of ledger data by encoding each ledger block with a hash of a prior block.

In at least one of the various embodiments, the BOP tool can be configured to allow a user to categorize BOP components, the categories including core BOP components, medium core BOP components, and non-core BOP components, and wherein the BOP component matching module is configured to present matching information based on a BOP component category.

In at least one of the various embodiments, the application can further comprise: the BOP module including an interface tool configured to display the BOP components for the client business entity, wherein the BOP interface is configured to show the BOP components as a hub and spoke configuration, wherein the BOP interface is configured to color code the BOP components based on BOP category, and wherein the BOP interface is configured to show matching information for BOP components.

In at least one of the various embodiments, the data management tool can be configured to allow a registered client business entity to control access to client data, including controlling access with the platform.

In at least one of the various embodiments, the system can be configured such that, if the client business entity gives access to the platform, the client business entity's distributed immutable ledger is replicated to the platform host.

In at least one of the various embodiments, the distributed immutable ledger can be a Blockchain.

In at least one of the various embodiments, the distributed immutable ledger can be selected from a Bitcoin Blockchain, an Ethereum Blockchain, a Ripple distributed immutable ledger, a Hyperledger distributed immutable ledger, a Stellar distributed immutable ledger, and an IBM Blockchain.

In at least one of the various embodiments, the distributed immutable ledger is the Ethereum Blockchain.

In at least one of the various embodiments, the data management tool can be configured to log and store client data in one or more databases of client data that is controlled by the client side of the application, wherein the client data includes data recorded on the distributed immutable ledger.

In at least one of the various embodiments, the transactions recorded on the distributed immutable ledger can be at least one of a smart contract or a cryptocurrency transaction.

In at least one of the various embodiments, the transactions interface can be linked to a BOP Billing component.

In at least one of the various embodiments, the application can comprise: an invitation interface tool for inviting businesses to join the platform or enter into transactions recorded on the distributed immutable ledger or both.

In at least one of the various embodiments, the registration tool for registering the client business entity linked to the application to the platform can be configured to determine if the client business entity is registered with the system platform, or register the client business entity to the system platform, wherein the application is configured to obtain firmographics information for the client business entity.

In at least one of the various embodiments, the application can further comprise: a map tool configured to populate a map interface with match information generated by the matching module; and the map interface, wherein the interface is configured to display trust information for trusted businesses, the trust information including trust information based on data provided from a client registered to the system.

In at least one of the various embodiments, a finance component can comprise the scoring tool being configured to generate a finance score derived from validation data confirming transactions validated between components on the distributed immutable ledger, wherein the finance score is based on at least the BOP network score; and a finance matching module configured to match a client business entity with a funding source, wherein the finance matching module matches funding sources to the client business entity using a finance score, wherein the finance matching module is configured to match funding sources to the client entity employing at least one of:
 a funding model;
 an SIC code, and
 a rate;
wherein the finance matching module is configured to allow the client business entity to provide access to the client data including data recorded on the distributed immutable ledger to a funding source; and
wherein the finance matching module is configured to provide the funding source with firmographic data and business operation data.

In at least one of the various embodiments, the BOP network score can be defined as $$S_i = \sum_j w_{ij} S_j$$

where
$w_{ij} = f(R_{ij}, V_{ij}, C_{ij}, \ldots)$
$R_{ij}$=Importance of firm j for the business i–core/non-core relationship
$V_{ij}$=Strength of relationship between firms i and j
$C_{ij}$=Network distance between businesses i and j
and wherein V_ij is a volume of transactions.

In at least one of the various embodiments, the BOP network score can include a base score and a plurality of tiered scores.

In at least one of the various embodiments, the BOP network score can be weighted into an entity rating score to generate an extended entity rating score In at least one of the various embodiments, the system can be configured to generate a geographic score. The geographic score can include a local score, wherein the local score is based on a BOP component distance.

In at least one of the various embodiments, the scoring tool can be configured to use business entity client data the system is given access to for generating at least one of the scores.

In at least one of the various embodiments, the scoring tool can be configured to use matching information from BOP component matches to recalculate at least the BOP network score.

In at least one of the various embodiments, the system further can comprise an interface for third party providers.

In at least one of the various embodiments, described is a computer implemented method for providing an entity rating score for each business entity registered to a business network platform; and providing an application in operative communication with a trusted network platform comprising at least one network computer, the method comprising:
 creating a Business Organizing Principle ("BOP") for a client business entity, the BOP comprising a plurality of BOP components,
 recording application usage and transaction data on a distributed immutable ledger, wherein the distributed immutable ledger is configured with encrypted blocks of ledger data, where each ledger block is encoded with a hash of a prior block;
 selecting one or more scored business entities and/or BOP component matched to the BOP component by a matching module;
 recording one or more transactions with the selected business entity and/or BOP component on the distributed immutable ledger;
 generating at least one score for businesses registered on the BOP network score based on BOP component transactions recorded on the distributed immutable ledger facilitated by the application.

In at least one of the various embodiments, a method for providing a trusted network comprises, in at least one computer including one or more processors and memory operatively coupled to the computer system, the method comprising the actions and processes described for the system and system components thereof herein.

In at least one of the various embodiments, a computer program product comprising computer readable storage medium encoded with instructions that, when executed by at least one processor in a computer system that comprises one or more processors and memory operatively coupled to the computer system causes the computer to perform the actions and processes and operate system components described for the system and methods herein.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIGS. 9-25 show user interfaces in accordance with at least one of the various embodiments.

DETAILED DESCRIPTION OF THE EMBODIMENTS

Figure 1:
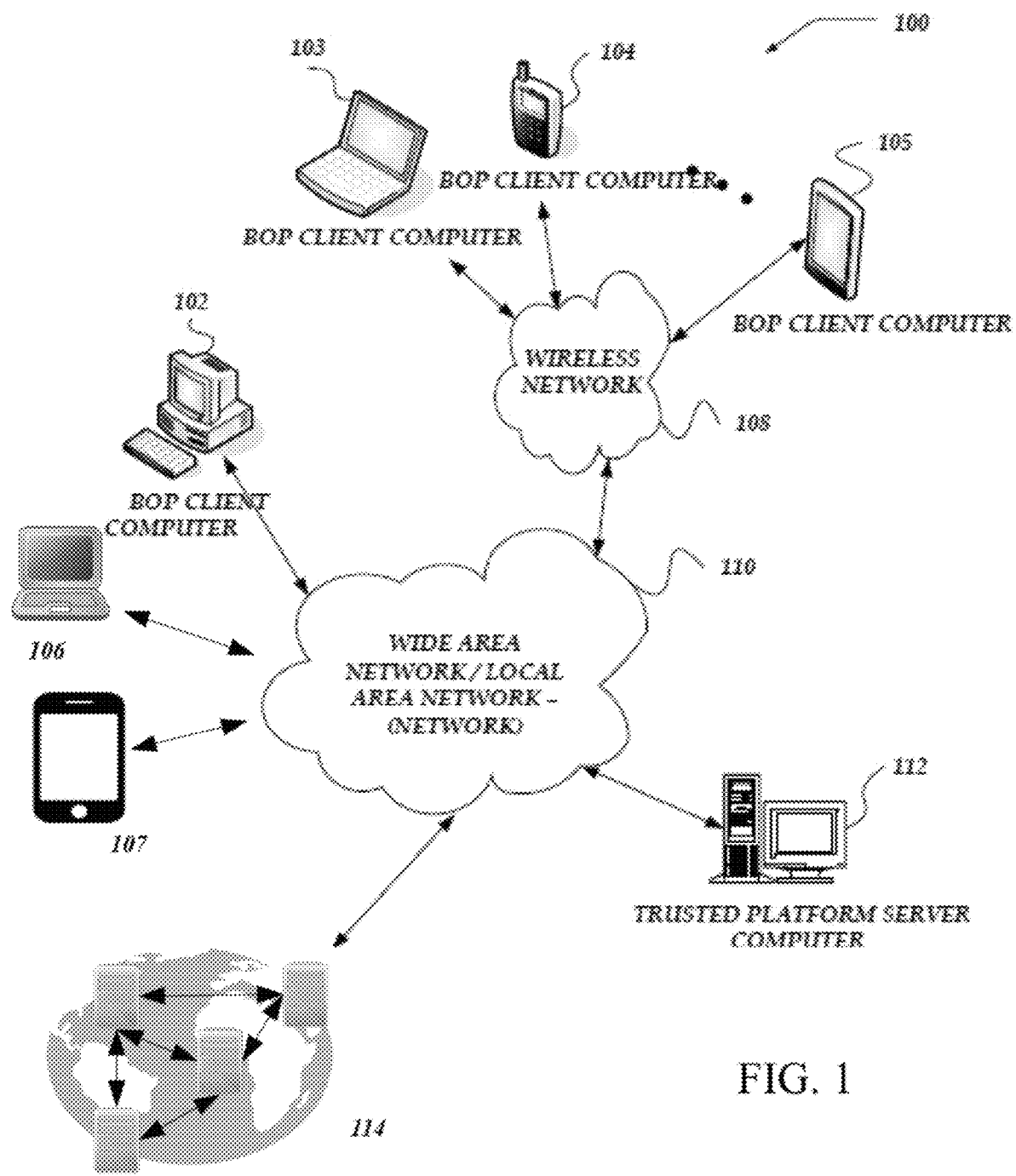
FIG. 1 is a system diagram of an environment in which at least one of the various embodiments may be implemented.

Various embodiments now will be described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "widget controller" refers to a computer program that may be operative on a client application. Widget controllers may be downloaded and/or otherwise deployed to a client application. Widget controllers may be arranged to be operative for downloading content, monitoring consumer actions, or otherwise managing widgets located within client applications.

As used herein, the term "widget" refers to a user-interface element located in the client application. Widgets may be invisible or visible to users of the client applications. In some cases, a widget controller may generate widget "on-the-fly" before deploying content into the widget. Widgets may be adapted to reflect the operating environment of the client application that they are being hosted within. For example, in clients that support HTML, CSS a widget may be an HTML element such as a DIV, P, or the like. For client application operative in a Java environment, a widget may be a View object or Window object, and so on.

As used herein, the term "Host" may refer to an individual person, partnership, organization, or corporate entity that may own or operate one or more trusted platforms (e.g., web sites, mobile applications, or the like). Hosts may arrange components and tools to integrate with widget controllers, Distributed Immutable Ledger Database servers, or trusted platform servers.

Illustrative Operating Environment

FIG. 1 shows components of one embodiment of an environment in which embodiments of the innovations described herein may be practiced. Not all of the components may be required to practice the innovations, and variations in the arrangement and type of the components may be made without departing from the spirit or scope of the innovations. As shown, system 100 of FIG. 1 includes local area networks (LANs)/wide area networks (WANs)—(network) 110, wireless network 108, Business Organizing Principle ("BOP") client computers 102-107, Trusted Platform Server Computer 112, and Distributed Immutable Ledger Server Computers 114.

At least one embodiment of client computers configured as BOP client computers 102-107 is described in more detail below in conjunction with FIG. 2. In one embodiment, at least some of BOP client computers 102-107 may operate over a wired and/or wireless network, such as networks 110 and/or 108. Generally, BOP client computers 102-107 may include virtually any computer capable of communicating over a network to send and receive information, perform various online activities, offline actions, or the like. In one embodiment, one or more of BOP client computers 102-107 may be configured to operate within a business or other entity to perform a variety of services for the business or other entity. For example, BOP client computers 102-107 may be configured to operate as a web server, an accounting server, a production server, an inventory server, or the like. However, BOP client computers 102-107 are not constrained to these services and may also be employed, for example, as an end-user computing node, in other embodiments. It should be recognized that more or less BOP client computers may be included within a system such as described herein, and embodiments are therefore not constrained by the number or type of BOP client computers 102-107 employed.

Computers that may operate as BOP client computer 102 may include computers that typically connect using a wired or wireless communications medium such as personal computers, multiprocessor systems, microprocessor-based or programmable electronic devices, network PCs, or the like. In some embodiments, BOP client computers 102-107 may include virtually any portable personal computer capable of connecting to another computing device and receiving information such as, laptop computer 103, smart mobile telephone 104, and tablet computers 105, and the like. However, portable computers are not so limited and may also include other portable devices such as cellular telephones, display pagers, radio frequency (RF) devices, infrared (IR) devices, Personal Digital Assistants (PDAs), handheld computers, wearable computers, integrated devices combining one or more of the preceding devices, and the like. As such, BOP client computers 102-107 typically range widely in terms of capabilities and features. Moreover, BOP client computers 102-107 may access various computing applications, including a browser, or other web-based application.

A web-enabled BOP client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), and the like, to display and send a message. In one embodiment, a user of the BOP client computer may employ the browser application to perform various activities over a network (online). However, another application may also be used to perform various online activities.

BOP client computers 102-107 may also include at least one other client application that is configured to receive and/or send content between another computer. The client application may include a capability to send and/or receive content, or the like. The client application may further provide information that identifies itself, including a type, capability, name, and the like. In one embodiment, BOP client computers 102-107 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client computers, Trusted Platform Server Computer 112, Distributed Immutable Ledger Database Server Computer 114, or other computers.

BOP client computers 102-107 may further be configured to include a client application that enables an end-user to log into an end-user account that may be managed by another computer, such as Trusted Platform Server Computer 112, Distributed Immutable Ledger Server Computers 114, or the like. Such end-user account, in one non-limiting example, may be configured to enable the end-user to manage one or more online activities, including in one non-limiting example, search activities, social networking activities, browse various websites, communicate with other users, or the like. However, participation in such online activities may also be performed without logging into the end-user account.

Wireless network 108 is configured to couple BOP client computers 103-105 and its components with network 110. Wireless network 108 may include any of a variety of wireless sub-networks that may further overlay stand-alone ad-hoc networks, and the like, to provide an infrastructure-oriented connection for BOP client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile devices, such as BOP client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between BOP client computers 103-105 and another computer, network, and the like.

Network 110 is configured to couple network computers with other computers and/or computing devices, including, Trusted Platform Server Computers 112, Distributed Immutable Ledger Server Computers 114, BOP client computer 102, and BOP client computers 103-105 through wireless network 108. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP). In essence, network 110 includes any communication method by which information may travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of Trusted Platform Server Computer 112 is described in more detail below in conjunction with FIG. 3. Briefly, however, Trusted Platform Server Computer 112 includes virtually any network computer capable of supporting BOP Applications and Application Program Interfaces therefor as well as providing network and scoring tools as describe herein. Computers that may be arranged to operate as Trusted Platform Server Computer 112 include various network computers, including, but not limited to personal computers, desktop computers, multiprocessor systems, microprocessor-based or programmable consumer electronics, network PCs, server computers, network appliances, and the like.

Although FIG. 1 illustrates Trusted Platform Server Computer 112 as a single computer, the invention is not so limited. For example, one or more functions of the Trusted Platform Server Computer 112 may be distributed across one or more distinct network computers. Moreover, Trusted Platform Server Computer 112 is not limited to a particular configuration. Thus, in one embodiment, Trusted Platform Server Computer 112 may contain a plurality of network computers. In another embodiment, Trusted Platform Server Computer 112 may contain a plurality of network computers that operate using a master/slave approach, where one of the plurality of network computers of Trusted Platform Server Computer 112 is operative to manage and/or otherwise coordinate operations of the other network computers. In other embodiments, the Trusted Platform Server Computer 112 may operate as a plurality of network computers arranged in a cluster architecture, a peer-to-peer architecture, and/or even within a cloud architecture. Other configurations, and architectures are also envisaged.

Distributed Immutable Ledger Server Computers 114 architecture is described in more detail below in conjunction with FIGS. 4 and 5A-5B. Briefly, however, Distributed Immutable Ledger Server Computers 114 includes virtually any network computer capable of sharing a ledger across a network and configured as a distributed immutable ledger node, including client computers and network computers as described herein. Distributed Immutable Ledger Server Computers 114 are distributed across one or more distinct network computers in a peer-to-peer architecture. Other configurations, and architectures are also envisaged.

In an embodiment, the network will be private to the parties concerned, permissioned so only authorized parties are allowed to join, and can be secure using cryptographic technology to ensure that participants only see what they are allowed to see. The shared ledger is replicated and distributed across the networked computers. Transactions are immutable (unchangeable) and final. Computers that may be arranged to operate as Distributed Immutable Ledger Server Computers 114 include various network computers, including, but not limited to personal computers, desktop computers, multiprocessor systems, microprocessor-based or programmable consumer electronics, network PCs, server computers, network appliances, and the like.

Illustrative BOP Client Computer

Figure 2A:
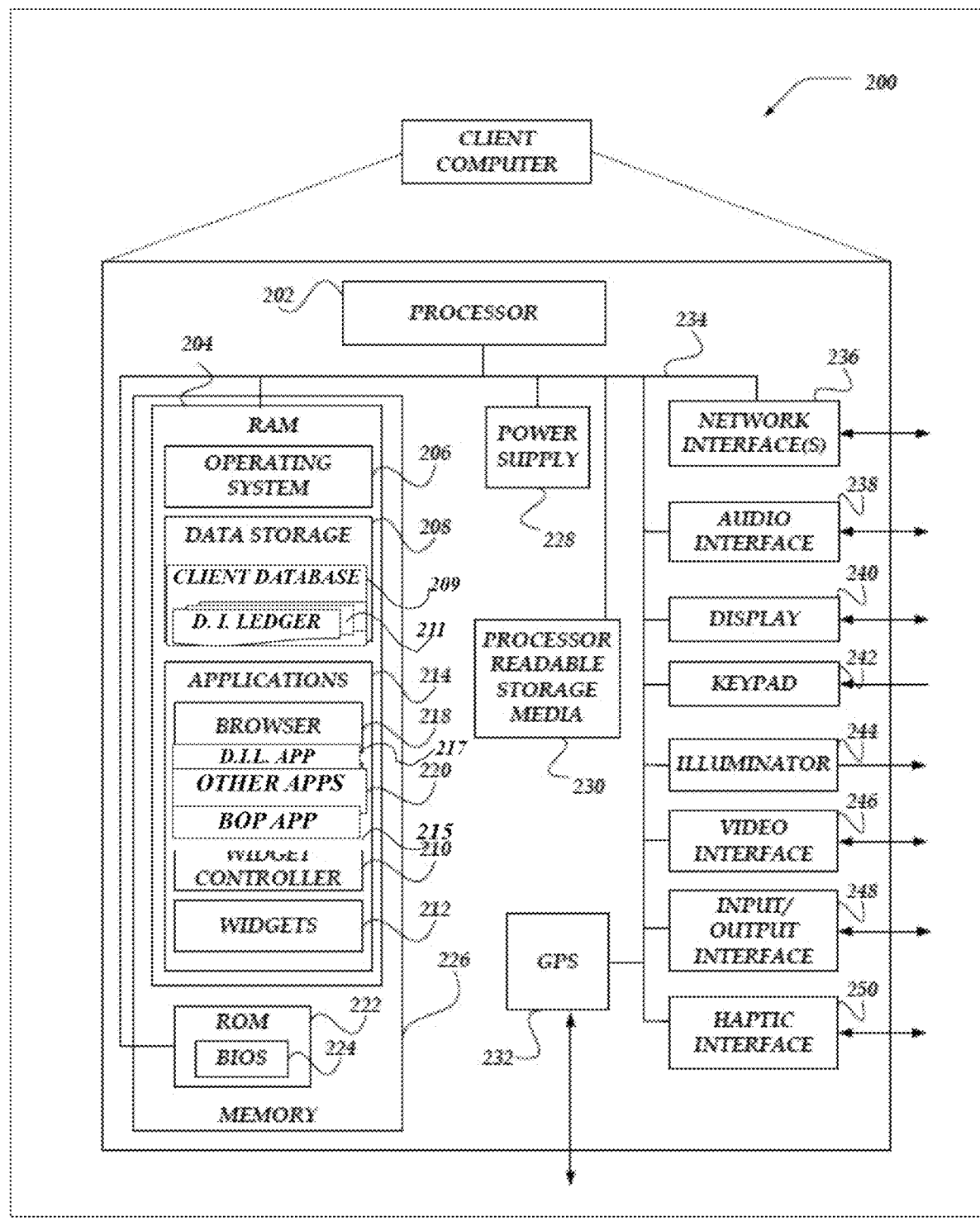
FIGS. 2A-2B show an embodiment of a client computer that may be included in a system such as that shown in FIG. 1.

FIG. 2A shows one embodiment of BOP client computer 200 that may be included in a system implementing embodiments of the invention. BOP client computer 200 may include many more or less components than those shown in FIG. 2. However, the components shown are sufficient to disclose an illustrative embodiment. BOP client computer 200 may represent, for example, one embodiment of at least one of BOP client computers 102-107 of FIG. 1.

As shown in the figure, BOP client computer 200 includes a processor 202 in communication with a mass memory 226 via a bus 234. In some embodiments, processor 202 may include one or more central processing units (CPU). BOP client computer 200 also includes a power supply 228, one or more network interfaces 236, an audio interface 238, a display 240, a keypad 242, an illuminator 244, a video interface 246, an input/output interface 248, a haptic interface 250, and a global positioning system (GPS) receiver 232.

Power supply 228 provides power to BOP client computer 200. A rechargeable or non-rechargeable battery may be used to provide power. The power may also be provided by an external power source, such as an alternating current (AC) adapter or a powered docking cradle that supplements and/or recharges a battery.

BOP client computer 200 may optionally communicate with a base station (not shown), or directly with another computer. Network interface 236 includes circuitry for coupling BOP client computer 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the BOP client computer is powered. Also, illuminator 244 may backlight these buttons in various patterns when particular actions are performed, such as dialing another BOP client computer. Illuminator 244 may also cause light sources positioned within a transparent or translucent case of the BOP client computer to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

BOP client computer 200 also comprises input/output interface 248 for communicating with external devices, such as a headset, or other input or output devices not shown in FIG. 2A. Input/output interface 248 can utilize one or more communication technologies, such as USB, infrared, Bluetooth™, or the like.

Haptic interface 250 is arranged to provide tactile feedback to a user of the BOP client computer. For example, the haptic interface 250 may be employed to vibrate BOP client computer 200 in a particular way when another user of a computing computer is calling. In some embodiments, haptic interface 250 may be optional.

BOP client computer 200 may also include GPS transceiver 232 to determine the physical coordinates of BOP client computer 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of BOP client computer 200 on the surface of the Earth. It is understood that under different conditions, GPS transceiver 232 can determine a physical location within millimeters for BOP client computer 200; and in other cases, the determined physical location may be less precise, such as within a meter or significantly greater distances. In one embodiment, however, BOP client computer 200 may through other components, provide other information that may be employed to determine a physical location of the computer, including for example, a Media Access Control (MAC) address, IP address, or the like.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224 for controlling low-level operation of BOP client computer 200. The mass memory also stores an operating system 206 for controlling the operation of BOP client computer 200. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™ or the Symbian® operating system. The operating system may include, or interface with a Java virtual machine module that enables control of hardware components and/or operating system operations via Java application programs.

Mass memory 226 further includes one or more data storage 208, which can be utilized by BOP client computer 200 to store, among other things, applications 214 and/or other data. For example, data storage 208 may also be employed to store information that describes various capabilities of BOP client computer 200. The information may then be provided to another computer based on any of a variety of events, including being sent as part of a header during a communication, sent upon request, or the like. Data storage 208 may also be employed to store social networking information including address books, buddy lists, aliases, user profile information, or the like. Further, data storage 208 may also store message, we page content, or any of a variety of user generated content. At least a portion of the information may also be stored on another component of BOP client computer 200, including, but not limited to processor readable storage media 230, a disk drive or other computer readable storage devices (not shown) within BOP client computer 200.

Processor readable storage media 230 may include volatile, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computer. Processor readable storage media 230 may also be referred to herein as computer readable storage media and/or computer readable storage device.

Applications 214 may include computer executable instructions which, when executed by BOP client computer 200, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another BOP client computer. Applications 214 may include, for example, browser 218, and other applications 220. Other applications 220 may include, but are not limited to, calendars, search programs, map programs, email clients, IM applications, SMS applications, voice over Internet Protocol (VOIP) applications, contact managers, task managers, transcoders, database programs, word processing programs, security applications, spreadsheet programs, games, search programs, and so forth.

Browser 218 may include virtually any application configured to receive and display graphics, text, multimedia, messages, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of BOP client computer 200 to communicate with another network computer, such as Trusted Platform Server Computer 112 and/or Distributed Immutable Ledger Server Computers 114 of FIG. 1.

Applications 214 may also include Widget Controller 210 and one or more Widgets 212. Widgets 212 may be collections of content provided to the BOP client computer by Trusted Platform Server Computer 112. Widget Controller 210 may be a program that may be provided to the BOP client computer by Trusted Platform Server Computer 112. Widget Controller 210 and Widgets 212 may run as native BOP client computer applications or they may run in Browser 218 as web browser based applications. Also, Widget Controller 210 and Widgets 212 may be arranged to run as native applications or web browser applications, or combination thereof. In at least one of the various embodiments, BOP Application and its components can be configured as Widgets.

Applications 214 can also include a BOP Application 215. BOP Application 215 can be a program that may be provided to the BOP client computer by Trusted Platform Server Computer 112 and supported by BOP Application Server of Trusted Platform Server Computer 112. BOP Application 215 can run as a native client computer application or can run in Browser 218 as a web browser based application. BOP Application 215 can also be arranged to run as a combination of a native application and a web browser application. BOP Application 215 and its tools and modules may employ processes, or parts of processes, similar to those described in conjunction with FIG. 6, to perform at least some of its actions.

Figure 2B:
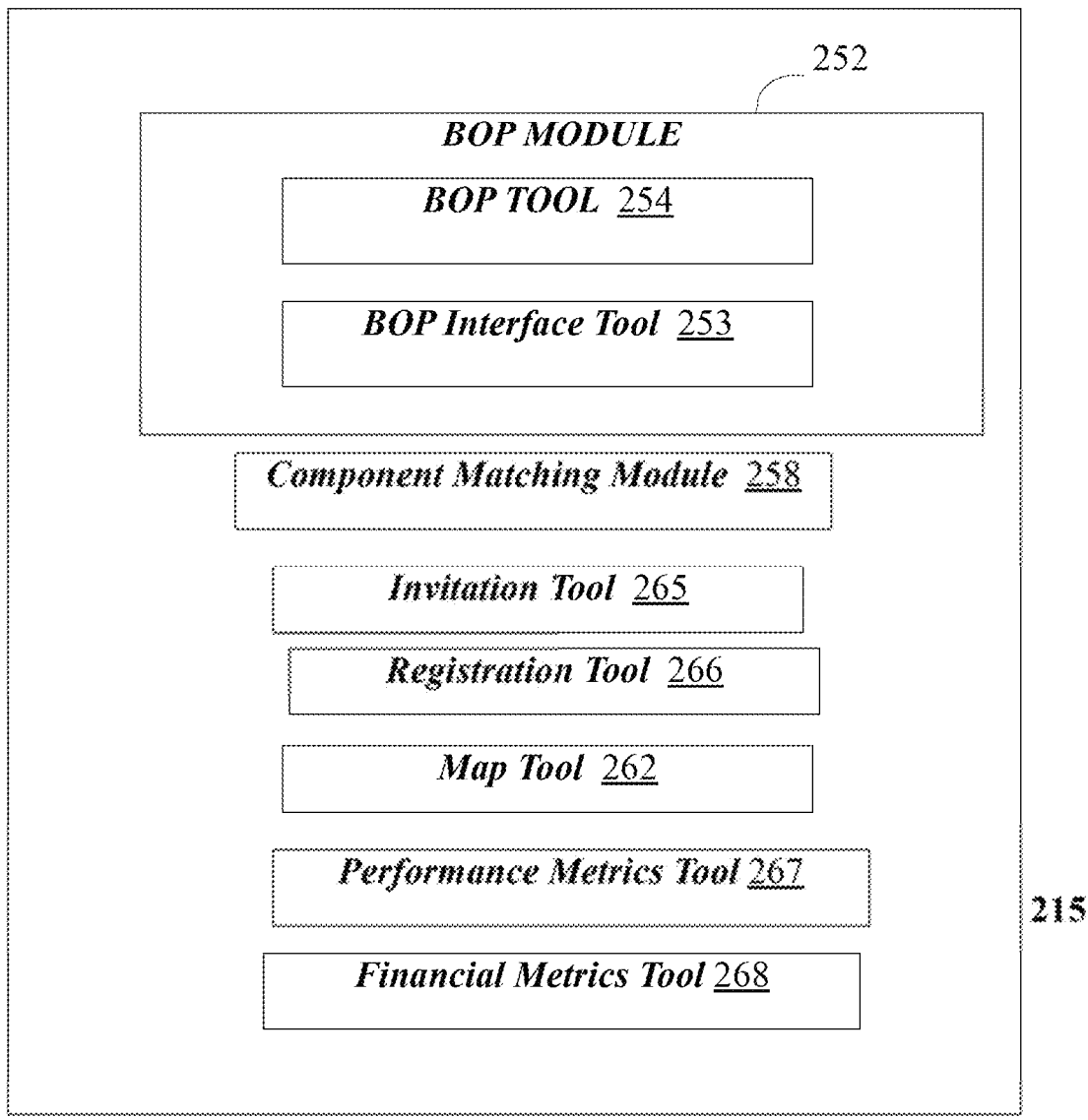
Figure 2B:
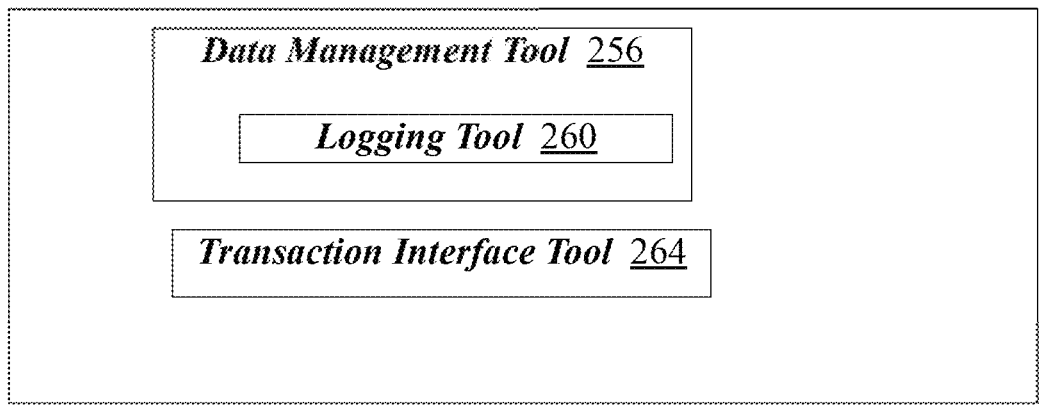

FIG. 2B shows one embodiment of BOP Application 215 that can be included in BOP Client Computer 200. The BOP Application can comprise a BOP module 252. The BOP module can include a BOP tool 254 for identifying a plurality of BOP components for a client business entity associated with the BOP Application 215. The BOP tool 254 can also be configured to distinguish core BOP components, for example core components, medium-core components and non-core components. The BOP module can also include a BOP interface tool 253 configured to display the BOP components for the client business entity. The BOP interface tool 253 can be configured to show the BOP components as a hub and spoke configuration. The BOP interface tool 253 can be also configured to show the BOP networked components as the hub and spoke configuration. The BOP interface tool 253 can be configured to color code the BOP components based on BOP category. The BOP interface tool 253 can also be configured to show matching information for BOP components.

The BOP Application 215 can include a component matching module 258 configured to generate matching information for BOP component matching to one or more scored business entities and other scored BOP components that can provide goods or services matched to the BOP component. The component matching module 258 can be configured to present matching information based on a BOP component category. Information generated by the component matching module 258 can be recorded to the client business entity database 209. The component matching module 258 can be configured to filter matches based on at least one of score, geography, industry, selection criteria, and performance measures.

The BOP Application 215 can include a registration tool 266 for registering the client business entity linked to the application to the system host. The registration tool 266 can be configured to obtain firmographics information for the client business entity, for example, BOP identification and categorization from the information from the BOP Tool. The registration tool can also be configured to determine if the client business entity is registered with the trusted platform system host or, if not, or register the client business entity to the trusted platform system host.

The BOP Application 215 can include an invitation interface tool 265 for inviting businesses to enter into transactions, which are recorded on the distributed immutable ledger 211.

The BOP Application 215 can also include a map tool 262 configured to populate a map interface with component match information generated by the component matching module 258. The map tool can be configured to display trust information for trusted businesses on the map interface, the trust information including trust information based on data provided from the client registered to the system.

In an embodiment the map tool can include a native map application for the BOP Module 252 to generate a map interface for a user. In an embodiment, the map tool 262 can be configured to use a third party map application, for example Google Maps, Apple Maps, MapQuest, etc.

The BOP Application 215 can also include a performance metrics tool 267 configured to allow the client user to set measurable goals for the client business entity and log data inputted into the system to measure progress toward set goals.

The BOP Application 215 can also include a financial metrics tool 268 configured track the finances of the client business entity.

A Distributed Immutable Ledger Application 217 is configured to provide a gateway to decentralized applications on the Distributed Immutable Ledger platform and act as a node on the Distributed Immutable Ledger platform. The Distributed Immutable Ledger Application 217 application is configured to hold and secure crypto-assets built on the platform, as well as to code, deploy and employ, inter alia, self-executing smart contracts.

The Distributed Immutable Ledger Application 217 can include a data management tool 256 configured to record application usage and transaction data to the distributed immutable ledger 211 associated with the client business entity that is also registered to the BOP application. The data management tool 256 can be configured to communicate with the Distributed Immutable Ledger Computer Servers 114 and, if permissioned, the Trusted Platform Server Computer 112 to control, share, accept, and synchronize data. In an embodiment, the data management tool 256 is configured to allow a registered client business entity to control access to client data, for example in the client business entity database 209, including controlling access with the system host and other outside servers, for example, the Trusted Platform Server Computer 112. In an embodiment, the data management tool 256 can include a logging tool 260 configured to log and store client data in one or more databases 209, including client transactions recorded on the distributed immutable ledger 211. The logging tool 211 can also be configured to log transactions between matched BOP components of other BOP clients on the distributed immutable ledger 211. The logging tool 211 can be configured to log transactions between BOP components and other entities on the distributed immutable ledger 211. In at least one of the various embodiments, Trusted Network Platform Sever Computer 112 is permissioned to a Distributed Immutable Ledger Computer Server 114 node for the distributed immutable ledger of the client business entity that is also registered to the BOP application.

The Distributed Immutable Ledger Application 217 can include a transaction interface tool 264 for entering into transactions that are recorded on the distributed immutable ledger, including transactions such as smart contracts and/or cryptocurrency transactions.

Illustrative Network Computer

Figure 3:
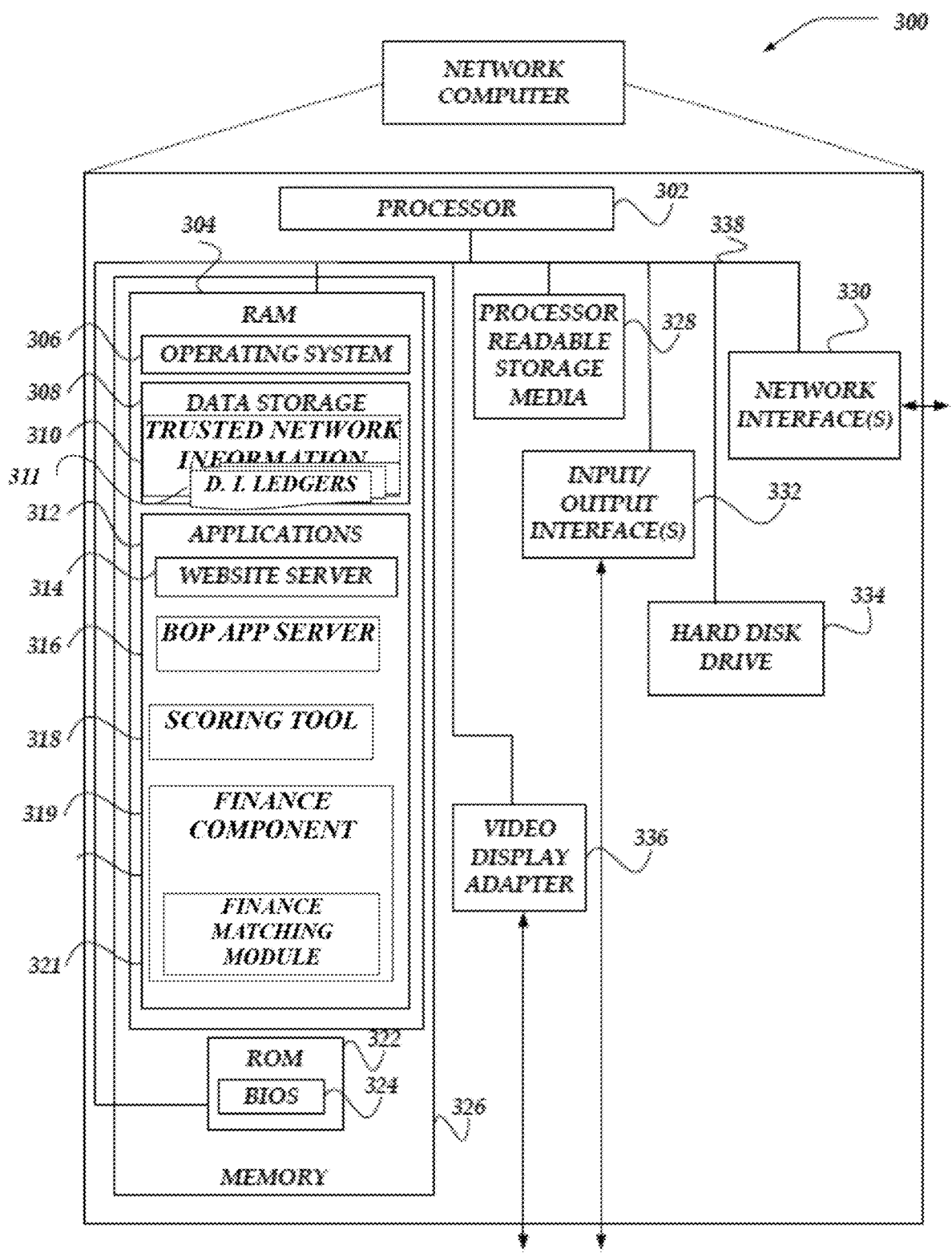
FIG. 3 shows an embodiment of a network computer that may be included in a system such as that shown in FIG. 1.

FIG. 3 shows one embodiment of a network computer 300, according to one embodiment. Network computer 300 may include many more or less components than those shown. The components shown, however, are sufficient to disclose an illustrative embodiment for practicing embodiments. Network computer 300 may be configured to operate as a server, client, peer, a host, or any other computer. Network computer 300 may represent, for example Trusted Platform Server Computer 112.

Network computer 300 includes processor 302, processor readable storage media 328, network interface unit 330, an input/output interface 332, hard disk drive 334, video display adapter 336, and memory 326, all in communication with each other via bus 338. In some embodiments, processor 302 may include one or more central processing units.

As illustrated in FIG. 3, network computer 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network computer 300. Any general-purpose operating system may be employed. Basic input/output system (BIOS) 324 is also provided for controlling the low-level operation of network computer 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computer.

Memory 326 further includes one or more data storage 308, which can be utilized by network computer 300 to store, among other things, applications 314 and/or other data such as trusted network information 310. For example, data storage 308 may also be employed to store information that describes various capabilities of network computer 300. The information may then be provided to another computer based on any of a variety of events, including being sent as part of a header during a communication, sent upon request, or the like. Data storage 308 may also be employed to store messages, web page content, or the like. At least a portion of the information may also be stored on another component of network computer 300, including, but not limited to processor readable storage media 328, hard disk drive 334, or other computer readable storage medias (not shown) within BOP client computer 300.

Data storage 308 may include a database, text, spreadsheet, folder, file, or the like, that may be configured to maintain and store user account identifiers, user profiles, email addresses, IM addresses, and/or other network addresses; or the like.

In at least one of the various embodiments, data storage 308 may include trusted network information 310, which can contain information analytics services (e.g. scores, and rankings), and listening services, including data obtained from client business entity database 209. Trusted network information can also include distributed immutable ledgers 311 that the Trusted Platform Server Computer 112 has been given access to. For each distributed immutable ledger 311 Trusted Platform Server Computer 112 has been given access to, the Trusted Platform Server Computer can become a node for the distributed immutable ledger.

Data storage 308 may further include program code, data, algorithms, and the like, for use by a processor, such as processor 302 to execute and perform actions. In one embodiment, at least some of data store 308 might also be stored on another component of network computer 300, including, but not limited to processor-readable storage media 328, hard disk drive 334, or the like.

Applications 312 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 312 may also include website server 314, BOP Application Server 316, Scoring Tool 318, Finance Component 319, and/or Finance Matching Module 321.

Website server 314 may represent any of a variety of information and services that are configured to provide content, including messages, over a network to another computer. Thus, website server 314 can include, for example, a web server, a File Transfer Protocol (FTP) server, a database server, a content server, or the like. Website server 314 may provide the content including messages over the network using any of a variety of formats including, but not limited to WAP, HDML, WML, SGML, HTML, XML, Compact HTML (cHTML), Extensible HTML (xHTML), or the like.

BOP Application Server 316 may be configured to support and provide content to client BOP Application and for BOP Application tools and modules as described herein. BOP Application Server can be hosted on Trusted Platform Server Computer 112 of FIG. 1, or the like. BOP Application Server 316 may employ processes, or parts of processes, similar to those described in conjunction with FIG. 6, to perform at least some of its actions.

Scoring Tool Application 318 may be arranged and configured to calculate and provide scores and rankings for business entities. In at least one of the various embodiments, Scoring Application 318 may be operative on Trusted Platform Server Computer 112 of FIG. 1 or the like. Scoring Tool Application 318 may employ processes, or parts of processes, similar to those described in conjunction with FIGS. 7-8, to perform at least some of its actions.

Finance Component Application 319 may be arranged and configured to provide rating and finance matching modules for data driven funding analysis. Finance Component Application 319 can be configured to employ Scoring Tool Application 318 to generate a finance score and/or obtain data from an entity score database to generate obtain score data and generate finance scores. In at least one of the various embodiments, Finance Component Application 319 may be operative on Trusted Platform Server Computer 112 of FIG. 1. Finance Component Application 319 may employ processes, or parts of processes, similar to those described in conjunction with FIG. 8 to perform at least some of its actions.

Finance Matching Module 321 of Finance Component Application 319 may be arranged and configured to match a client business entity with a funding source. In at least one of the various embodiments, [00113] Finance Matching Module 321 may be operative on Trusted Platform Server Computer 114 of FIG. 1. In any event, Finance Matching Module 321 may employ processes, or parts of processes, similar to those described in conjunction with FIG. 8, to perform at least some of its actions.

Illustrative Logical System Architecture

Figure 4:
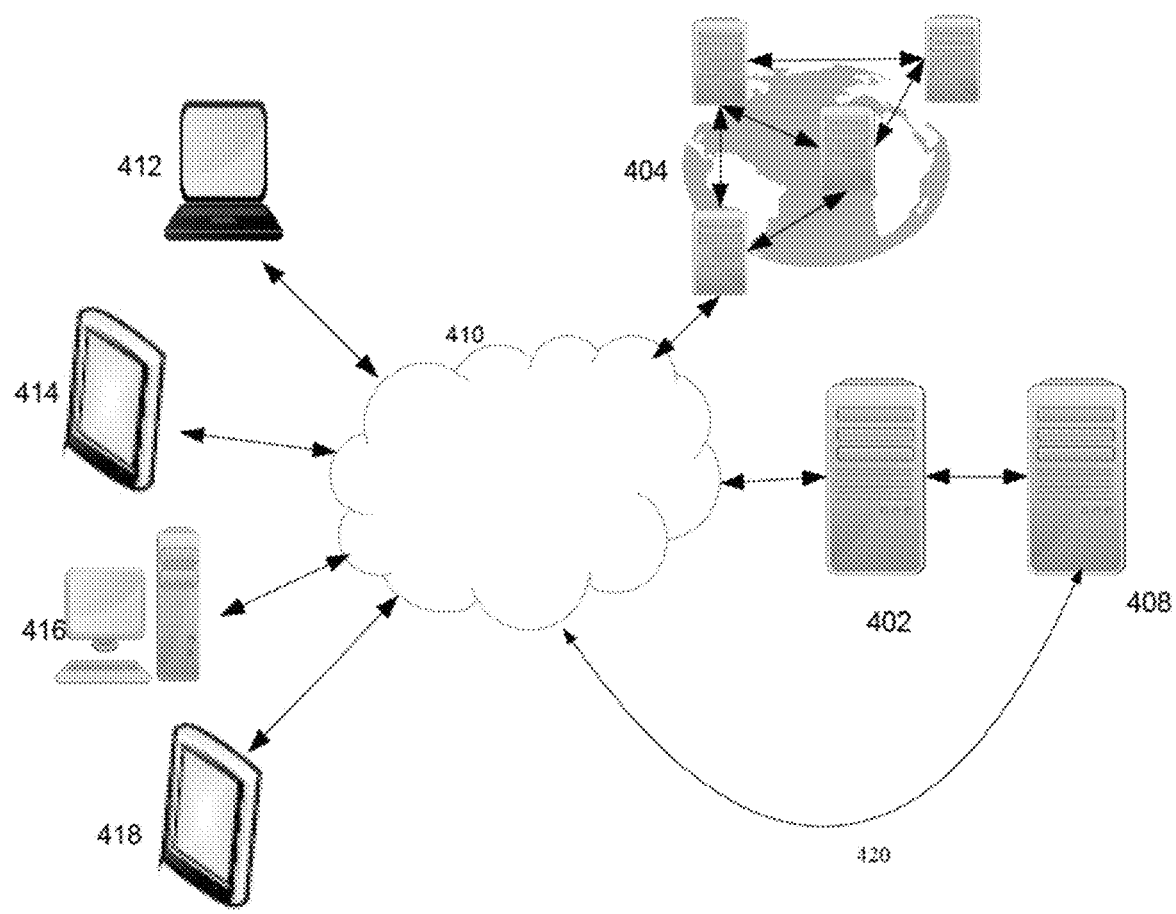
FIG. 4 illustrates a logical architecture of a system in accordance with at least one of the various embodiments.

FIG. 4 illustrates a logical architecture of system 400 for BOP analytics in accordance with at least one of the various embodiments. In at least one of the various embodiments, Trusted Platform Server 402 may be arranged to be in communication with Distributed Immutable Ledger Servers 404, Third Party Server 408, or the like.

In at least one of the various embodiments, Trusted Platform Server 402 may be one or more computers arranged to host, manage and support a BOP network. In at least one of the various embodiments, Trusted Platform Servers 404 may provide BOP support and tools to BOP client computers, such as, BOP client computer 412, BOP client computer 414, BOP client computer 416, BOP client computer 418, or the like.

In at least one of the various embodiments, Trusted Platform Server 402 can comprise one or more computers, such as, network computer 300, or the like, that host one or more types of BOP support tools. For example, hosting servers 406 may include one or more web servers providing web sites, map sever sites, application programming interfaces, or the like. In at least one of the various embodiments, hosting servers may be arranged to integrate with Trusted Platform Server 402 to provide the organizing principle, data, analytics services (e.g. scores, and rankings), and listening services (e.g., usage data from the app, registration tools) to BOP client computers, such as, BOP client computer 412, BOP client computer 414, BOP client computer 416, BOP client computer 418, or the like.

In at least one embodiment, Distributed Immutable Ledger Servers 404 comprise a distributed network of computers configured as nodes to a distributed immutable ledger platform that lets anyone build and use decentralized applications and log transactions that run on a distributed immutable ledger technology, for example, a blockchain technology.

In at least one of the various embodiments, Third Party Server 408, may include one or more third-party and/or external content provider services. Third Party Server 408 may include, for example social network platforms, media distribution platforms, third party application providers and developers, or the like. In at least one of the various embodiments, Trusted Platform Server 402 may be arranged to integrate and/or communicate with Third Party Server 408 using API's or other communication interfaces provided by the services.

In at least one of the various embodiments, content served from and/or hosted on Trusted Platform Servers 424, Third Party Server 408 may be provided over network 410 to BOP client computers, such as, BOP client computer 412, BOP client computer 414, BOP client computer 416, BOP client computer 418, or the like.

In at least one of the various embodiments, Trusted Platform Server 402 may be arranged to communicate directly or indirectly over network 410 to the BOP client computers using one or more direct network paths, such as network path 420. This communication may include transaction information associated with one or more events occurring on the BOP client computers.

One of ordinary skill in the art will appreciate that the architecture of system 400 is a non-limiting example that is illustrative of at least a portion of at least one of the various embodiments. As such, more or less components may be employed and/or arranged differently without departing from the scope of the innovations described herein. However, system 400 is sufficient for disclosing at least the innovations claimed herein.

Figure 5A:
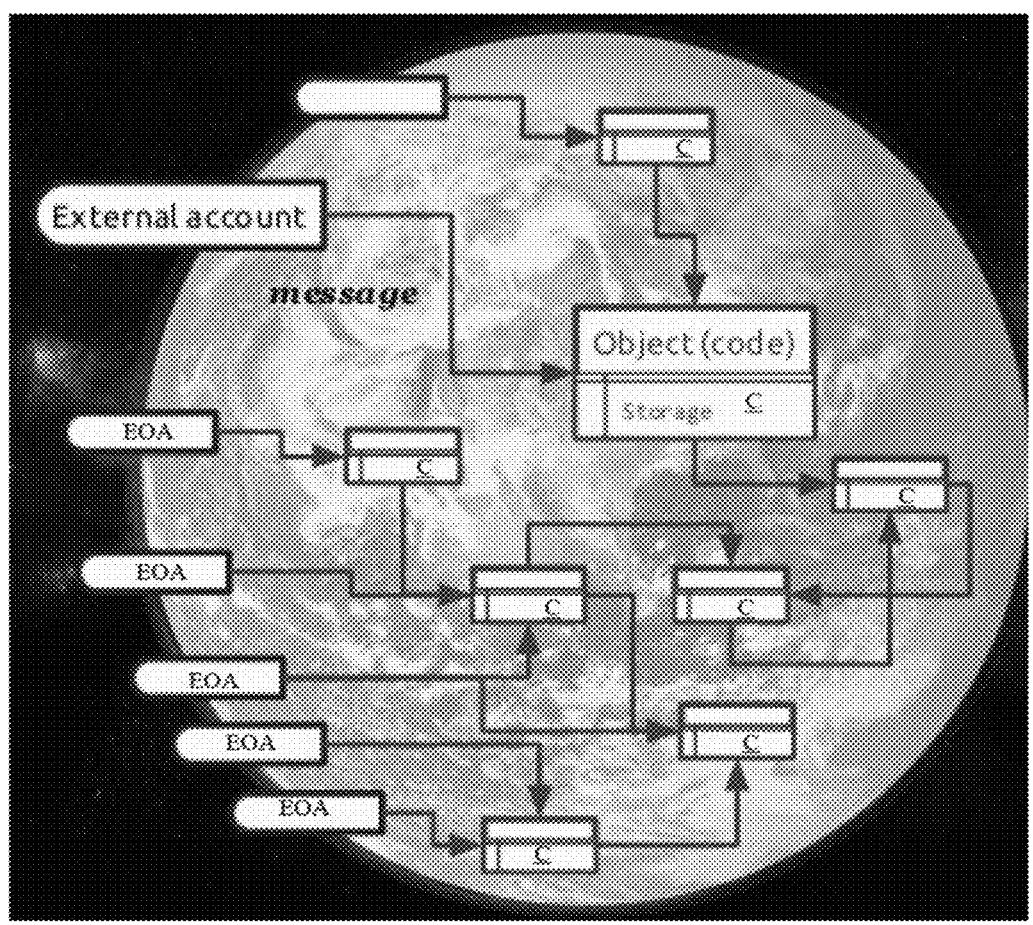
FIGS. 5A-5B represent a logical architecture for a system in accordance with at least one of the various embodiments.
Figure 5B:
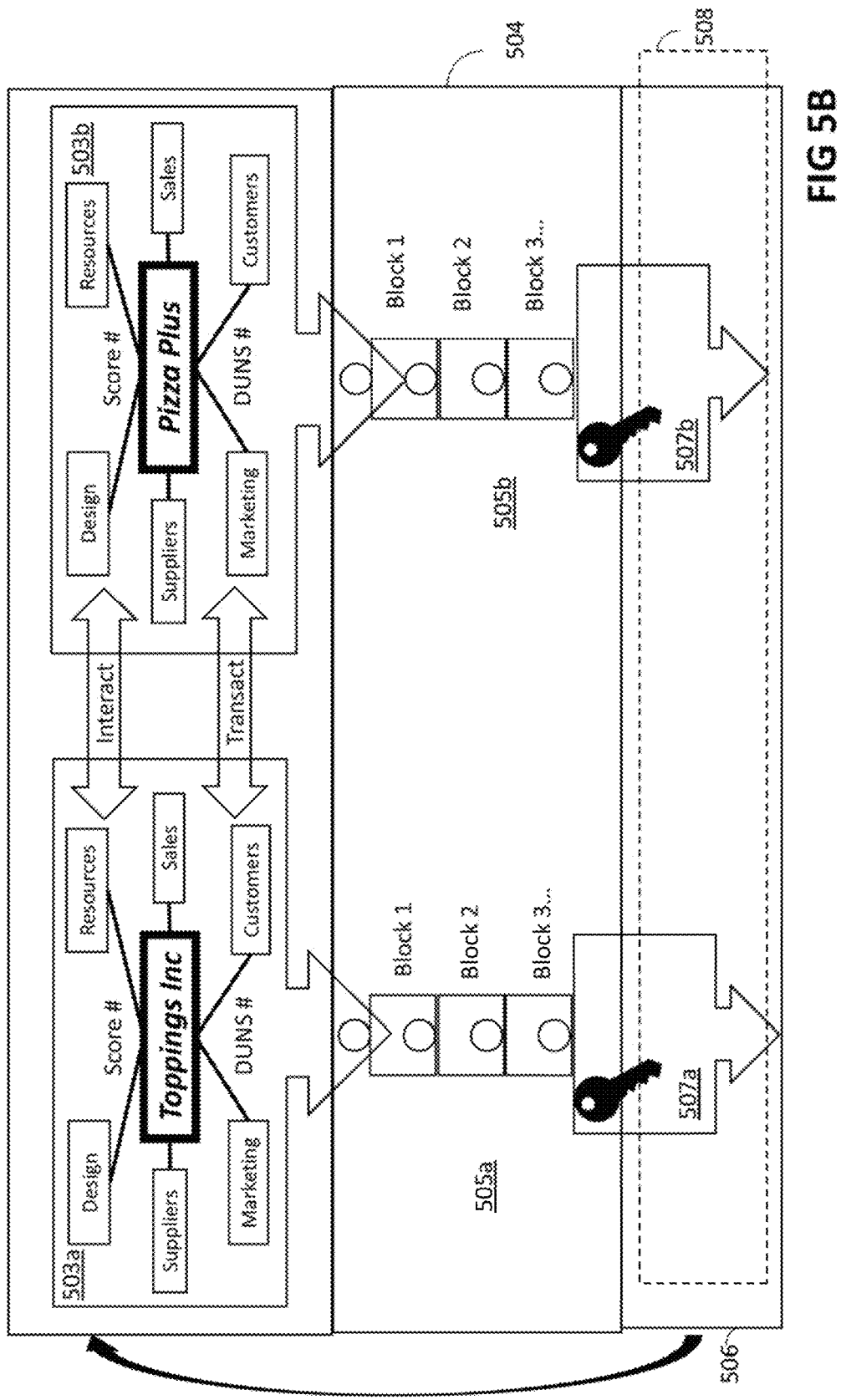

FIGS. 5A-5B represent a logical architecture for system 500 in accordance with at least one of the various embodiments.

FIG. 5A represents a logical architecture for a distributed immutable ledger. The distributed immutable ledger is a shared ledger that can be either public or private for recording the history of electronic business transactions that take place in a peer-to-peer (P2P) business network. A blockchain is an example of a distributed immutable transaction ledger. A blockchain network is a decentralized system for the exchange of assets and recording of transactions. A blockchain network may use "Proof of Work," or another consensus mechanism, as a basis of trust, accountability, and transparency, instead of relying on a third-party mediator financial institution or actor. In an embodiment, each permissioned node of the network has a replicated copy of the ledger, and all events on the ledger are synched across all nodes and immutable, resulting in full transparency for all node members.

A transaction system for a distributed immutable ledger can include digital signatures, cryptographic hashes, a timestamp server, and a decentralized consensus protocol that member nodes use to agree on ledger content. In a public ledger, integrity, privacy, and security are engineered in. For example, a blockchain ledger is comprised of unchangeable, digitally recorded data in packages called blocks. These digitally recorded "blocks" of data are stored in a linear chain. Each block in the chain contains data (e.g. for a cryptocurrency transaction, or a smart contract executable), that is cryptographically hashed. The blocks of hashed data draw upon the previous-block (which came before it) in the chain, ensuring all data in the overall "blockchain" has not been tampered with and remains unchanged. A distributed immutable ledger peer-to-peer network is resilient and robust thanks to its decentralized topology architecture. As member nodes join or leave the network dynamically, messages are exchanged between the network participants on a best-effort broadcast basis.

A number of distributed technological platforms for distributed immutable ledgers and consensus can be employed. Exemplary distributed immutable ledger platforms include Bitcoin, Ethereum, Ripple, Hyperledger, Stellar, IBM Blockchain, and other enterprise solutions.

Ethereum, for example, is a programmable distributed immutable ledger blockchain. Ethereum allows users to create their own operations of any complexity. In this way, the Ethereal distributed immutable ledger platform can support many different types of decentralized blockchain applications, including but not limited to cryptocurrencies and smart contracts. Ethereum comprises a suite of protocols that define a platform for decentralized applications. The platform comprises an Ethereum Virtual Machine ("EVM"), which can execute code of arbitrary algorithmic complexity. Developers can create applications that run on the EVM using friendly programming languages modelled on existing languages, for example, JavaScript and Python.

Ethereum also includes a peer-to-peer network protocol. The Ethereum distributed immutable ledger database is maintained and updated by many nodes connected to the network. Each and every node of the network runs the EVM and executes the same instructions. This massive parallelization of computing across the entire Ethereum network maintain consensus and immutability for the blockchain transactions and events on the ledger. Every Ethereum node runs the EVM in order to maintain consensus across the blockchain. Decentralized consensus gives Ethereum high fault tolerance, ensures zero downtime, and makes data stored on the blockchain forever unchangeable and censorship-resistant.

Ethereum's basic unit is the account. The Ethereum blockchain tracks the state of every account, and all state transitions on the Ethereum blockchain are transfers of value and information between accounts. There are two types of accounts: Externally Owned Accounts (EOAs), which are controlled by private keys and Contract Accounts C, which are controlled by their contract code and can only be "activated" by an EOA. For most users, the basic difference between these is that human users control EOAs—because they can control the private keys which give control over an EOA. Contract accounts, on the other hand, are governed by their internal code. If they are "controlled" by a human user, it is because they are programmed to be controlled by an EOA with a certain address, which is in turn controlled by whoever holds the private keys that control that EOA. The term "smart contracts" refers to code in a Contract Account—programs that execute when a transaction is sent to that account. Users can create new contracts by deploying code to the blockchain.

Contract accounts only perform an operation when instructed to do so by an EOA. So it is not possible for a Contract account to be performing native operations like random number generation or API calls—it can do these things only if prompted by an EOA. This is because the platform requires nodes to be able to agree on the outcome of computation, which requires a guarantee of strictly deterministic execution.

Nodes can download a distributed immutable ledger application that provides a gateway to decentralized applications on the Ethereum blockchain. The application is configured to hold and secure ether and other crypto-assets built on Ethereum, as well as to code, deploy and employ, inter alia, self-executing smart contracts.

On the distributed immutable ledger, anyone can set up a node that replicates the necessary data for all nodes to reach an agreement and be compensated by users. This allows user data to remain private and applications to be decentralized. The distributed immutable ledger also enables developers create, inter alia, fully automated applications that, for example, store registries of debts or promises, send messages, move funds in accordance with predetermined instructions, including encoding those given long in the past (e.g., like a will or a futures contract), all without a middle man or counterparty risk. As will be appreciated, the Ethereum blockchain is an example of distributed immutable ledger architecture and platform, and one or more of the embodiments can be configured to run on any distributed immutable ledger platform, including those referenced herein.

FIG. 5B represents a logical architecture for a trusted platform integration the network and with distributed immutable ledger technology and exposure for analytics in accordance with at least one of the various embodiments. In at least one of the various embodiments, transaction events from one or more BOP clients 503a, 503b are written to blocks of each client's respective distributed immutable ledger 505a 505b, which is enabled by the distributed immutable ledger technology platform 504. In at least one of the various embodiments, event sources can include currency transactions, smart contract executables, and the like. For purposes of simplicity, the illustration shown for system 500 illustrates a transaction between a pair of BOP enabled clients, each with a respective distributed immutable ledger application within the trusted platform network 502. As will be appreciated, the platform can include many more event sources than shown in FIG. 5B, and further, any transaction for a BOP client that is written to the distributed immutable ledger is recorded, even with entities that are not a part of the BOP network. If the client business entity has given access, for example via a public or private key 507a, 507b, the transactions are replicated to trusted platform host's 506 node the distributed immutable ledger as well. Each BOP client entity 503a, 503b controls access to its distributed immutable ledger, thus the platform host has separate replicated ledgers for each BOP client. The trusted platform 506 can then provide analytics and generate BOP network scores for BOP clients 503a, 503b. The trusted platform can also provide BOP component enhanced analytics for firmographic and business analysis, for example, look alike models for businesses based on granular transaction data from permissioned distributed immutable ledgers and BOP component segmentation and matching fed to, inter alia, firmographic variables for modeling.

Also, as described herein, third party entities 508, for example funding sources for financing or application development platforms, can be granted access to each client's distributed immutable ledger as another node. As such, the trusted platform can work with third party developers to provide applications to integrate with the BOP application or enhance their own applications with BOP and distributed ledger enhanced tools and analytics as described herein.

Generalized Operation

The operation of certain aspects of the invention will now be described with respect to FIGS. 6-8. In at least one of various embodiments, for processes 600, 700, 800, these processes or portions of these processes may be implemented by and/or executed on a plurality of network computers, such as BOP client computer 200 of FIG. 2 and network computer 300 of FIG. 3. However, embodiments are not so limited, and various combinations of network computers, BOP client computers, virtual machines, or the like may be utilized. Further, in at least one of the various embodiments, the processes described in conjunction with FIGS. 6-8 may be operative in system with logical architectures such as those described in conjunction with FIGS. 4-5B.

Figure 6:
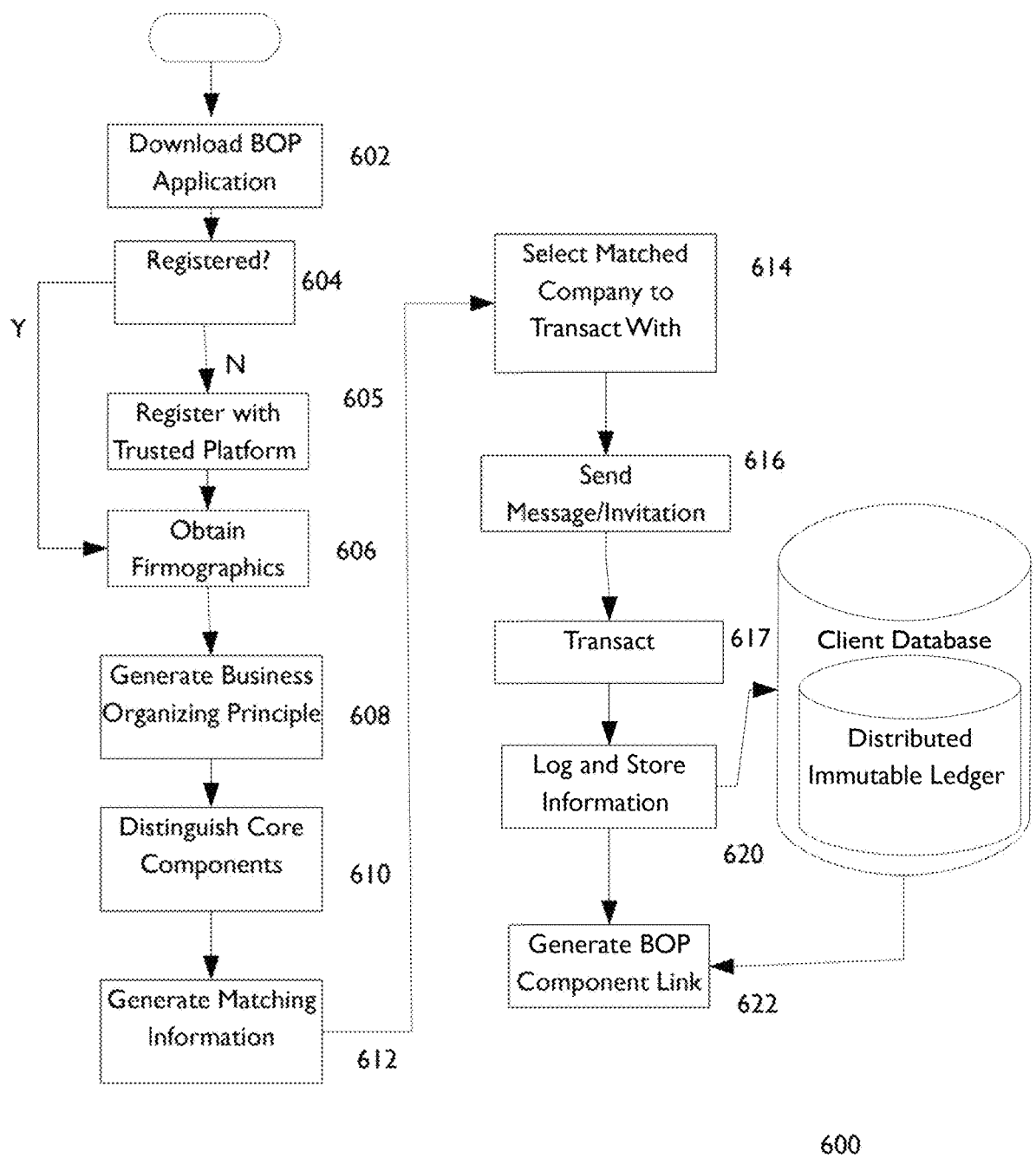
FIG. 6 illustrates an overview flowchart for a process in accordance with at least one of the various embodiments.

FIG. 6 illustrates a flowchart for process 600 for generating a BOP for a business entity and generating a BOP network component link between BOP components of different businesses in accordance with at least one of the various embodiments. The description of the embodiment describes the generation of a single BOP component link for a pair of BOP components. As will be appreciated, BOP network component links are generated between components to create growing network of BOP component linked businesses that become part of the trusted network: a trusted B2B network/ecosystem, an example of which is shown with respect to the graphic user interfaces of FIGS. 11A-11B.

This trusted ecosystem combines a flexible organizing principle (based on firmographics), a world-wide business index, and a reliable score system. Each business that is registered on the platform will have an organizing principle, a registration number, and a BOP network score. Based on these components, the platform technology allows each business to interact with other businesses, via their organizing principle, using the trust (provided by their respective scores), knowing that they are minimizing the risk in that transaction. In at least one of the various embodiments, each interaction then recorded on a distributed immutable ledger, which can be provided by a distributed immutable ledger platform, and the business has control over access to this data. In an embodiment, only the business can decide who else has access to this data. This will allow the business to monetize its own data as well as, if it chooses, give access to the trusted platform servers.

After a start block, at block 602, in at least one of the various embodiments, a BOP client downloads a BOP Application.

At block 604, in at least one of the various embodiments, the BOP Application determines via an interface with the trusted platform host if a client business entity linked to the application is registered to the system host. If not (N) at block 605 the system is configured to allow the business user register the business entity to the platform host and assign the business a unique identifier. For example, in an embodiment the platform host is the host of the DUNS Market Identifier database and the system is configured to determine if the business entity is matched with a Data Universal Numbering System (DUNS) number, which can thereafter be used to identify the entity. If not, the business can be assigned a temporary ID, and then the BOP Application can prompt the user to enter in the appropriate information for getting a DUNS number. In at least one of the various embodiments, the registration can be done via the BOP Application, for example using a registration tool, or the registration with the platform can be done by another means, for example via a web interface of the platform host, and the BOP Application downloaded thereafter. An exemplary embodiment of a registration interface for a client device is shown below at FIG. 9B.

At block 606, in at least one of the various embodiments, the BOP Application is configured to obtain firmographics information for the client business entity. Firmographics are sets of characteristics to segment prospect organizations. Firmographics variables can include features of organizational behavior in categorical segments, for instance by particular industry. Operating variables can then be analyzed and compared for like firmographics, for example purchasing approach, situational factors and measurable characteristics of relationships (e.g., credit, length of relationship). Exemplary firmographic variables can include:

Industry: for example, by North American Industry Classification System ("NAICS") or Standard Industrial Classification ("SIC") code.

Location: for example, by town, neighborhood, zip code, city, area code, state, region, country, etc., or by geofencing or other geolocation defined zones.

Customer size.

Status and Structure, for example, organization legal status (corporation, partnership, sole proprietor) and organizational relationship (parent, subsidiary, franchise).

Performance, for example annual revenue, rate of growth or decline, profits and losses, sales cycles.

Other firmographics variables can include, without limitation, Age, Financial, Decisions (e.g., at headquarter, branch) Ownership, Market (e.g. size, customer), Position, Stage, Trends, Customer (B2B, B2C, etc.), Property, Manufacturing (discrete, process), and Technology.

Firmographics also can include, for example, scores and ratings that have been generated for business entities or like entities, for example, Financial Stress, Viability, Delinquency, IT Demand, Buydex, Paydex, Energy Demand, network score, etc. Examples of entity scoring and network rating can be found in U.S. patent application Ser. No. 14/452,946, published as 20150178645A entitled "Discovering a business relationship network, and assessing a relevance of a relationship," and U.S. patent application Ser. No. 10/830,483, published as U.S. Pat. Pub. 20050240503, entitled "Detailed Trade Data Report," the entirety of each of which is incorporated by reference hereby. In at least one of the various embodiments, the business can already be registered with the platform host and the platform host may already have firmographic data for the client entity, including existing scores and ratings which the BOP Application can be configured to display as well as with the BOP network score as described herein.

At block 608, in at least one of the various embodiments, the BOP Application is configured to generate a BOP for a client business entity. For example, based on the firmographic information obtained for the business at block 606, the system can determine the business entity is a solely owned pizza shop in a given city. Based on firmographics for small restaurants in that region, the BOP tool can be configured to offer a selection of components for the company to select to build its BOP: for example, a Human Resources ("HR") component, a Billing component, an Operations component, Finance component, a Marketing component, and a Sales component. In at least one of the various embodiments, BOP components can be configured to have sub-components, for each BOP component. For example, a Marketing BOP component can include a Market Research subcomponent, a Competitive Standing subcomponent, an Advertising sub-component, and a Brand Leverage subcomponent. In at least one of the various embodiments, the BOP application can be configured to break down subcomponents to further levels based on, for example, company firmographics and data.

At block 610, in at least one of the various embodiments, the system is configured to distinguish core BOP components. For example, in an embodiment, the BOP Application includes a BOP tool configured to allow a user to categorize BOP components, as "Core Business" components, "Medium-Core Business" components," and "Non-Core Business" components. Core Business components are business components that are essential to the business; Medium-Core Business components are components that are important, but not core or essential to the business, and Non-Core components are components that are not core nor essential to the business. In at least one of the various embodiments, the BOP tool can be configured to allow the user to identify which BOP components are Core, Medium Core, and Non-Core. In at least one of the various embodiments, the BOP tool can be configured to preselect or offer suggestions for BOP categorizations based on, for example, firmographic data.

At block 612, in at least one of the various embodiments, the system is configured to include a BOP component matching module configured to generate matching information for BOP components. The BOP component matching module is configured to match a BOP component to one or more scored business entities that can provide goods or services matched to the BOP component. For instance, the BOP component is matched to a scored business entity component based on one or more trusted scores for the scored business entity. The BOP component matching module can be configured to match a BOP component with at least one other BOP component based on at least one scored BOP component. In at least one of the various embodiments, BOP component can be matched to at least one other BOP component based on one or more trusted scores for the at least one other BOP component. In at least one of the various embodiments, the BOP component can be a scored BOP component and is matched to the at least one other scored BOP component based on the one or more trusted scores for each BOP component. In an embodiment, each business entity is scored by at least a business rating score and can be additionally scored with a BOP network score as described herein with respect to FIG. 7.

In an embodiment, the matching module is configured to populate a map interface with match information generated by the matching module. The matching module can be configured to present matching information based on a BOP component category, for example, matching a Core Business BOP component for a business to a complementary Core Business BOP component of another business based on the firmographics upon which each of the Core Business BOP components are based. For example, a business entity can have a Core Business BOP component for "Suppliers." When the user selects "Suppliers," the BOP Application can be configured to provide a map view with suggestions on suppliers based on their firmographics, and past usage patterns. The matching module can be configured to filter matches based a business score, geography, industry, selection criteria, performance measures; or firmographic values. For example, the BOP Application can be configured to suggest which of the suppliers can provide the business with the best credit (based, for example, on anonymized trade data). The BOP Application may also recommend suppliers in the business's area or beyond the businesses immediate neighborhood, for example if data for the "non-local" matched business shows it supplies a number of businesses in its neighborhood. The application user interface is configured to display trust information for business, the trust information including trust information based on data provided from a client registered to the system, for example a business rating or custom model score for the matched business or businesses.

The matching module can be configured to present matching information based on a BOP component category, for example, matching a Non-Core Business BOP component for a business to a complementary Core Business component or Medium Core component of another business based on the firmographics upon which each of the Core Business BOP components are based. For example, if a BOP component (e.g. "HR") is not core to the business, when the user interacts with this HR BOP component, the system can be configured to show a map centered on the business location associated with the BOP component. The map can be populated with other businesses with, for example, complementary BOP components that provide HR services.

The matching module can be configured to present matching information based on a BOP component category, for example, a business to one or more businesses on which the Trusted Platform has firmographic data and operational data. For example, BOP application can be configured to match one or more complementary Business BOP components of other businesses based on the firmographics upon which each of the Business BOP components are based. The matching module can also match other businesses for which it has, for example, scores and ratings, but is not BOP enabled. For example, in at least one of the various embodiments, for a medium core business component that is important to a business (but not core), the BOP application can be configured to provide a map view with suggestions on both partnering and outsourcing options, including other BOP application enabled businesses as well as other businesses the Platform host has data on. The BOP application can also offer analytics service to provide the business with a competitive advantage. For example, in an embodiment, the BOP Application can be configured to present a customized model score computed by the BOP Trusted Platform to target prospects and suggesting the best channels to reach those customers e.g. e-mail, flyers, mail, etc. the BOP Trusted Platform can also make some modeling tools available on the platform to help the business create a prioritized target list. Different analytics strategies and services can also be made available depending on the marketing channels (e.g. B2B and B2C).

In at least one of the various embodiments, the BOP application is configured to allow a user to transact with a matched company. In at least one of the various embodiments, the BOP application is configured to allow users to transact on a distributed immutable ledger, for example, a Blockchain ledger. At block 614, a user selects a company from the matched companies to transact with via the BOP application. In an embodiment, at block 616 the BOP Application sends a message to the matched business, for example, via an alert, email, text, to a BOP Application of the selected supplier. If the matched business accepts the invitation to transact (Y), at block 617 the transaction is executed and at block 620 recorded on the distributed immutable ledger.

In an embodiment, if the matched business is not part of the trusted platform host's trusted BOP network, the BOP Application can be configured to send an invitation to join the platform by registering and downloading the BOP Application as described herein.

In an embodiment, the client may employ conventional billing, for example via PayPal, ApplePay, Google Wallet, wire or electronic payment, which the Distributed Immutable Ledger Application records to the distributed immutable ledger. In at least one of the various embodiments, the distributed ledger and secure trust technology of the Distributed Immutable Ledger Platform can facilitate alternative billing tools such as, for example, cryptocurreny and smart contracts. For example, in at least one of the various embodiments, at block 618, a transaction interface of the Distributed Immutable Ledger Application offers the user an option to transact, including transacting via a desired billing tool. For example, the Distributed Immutable Ledger Application can be configured to offer a Smart Contract that embeds business terms in a transaction database and executes them with each transaction. In at least one of the various embodiments, the transaction interface can be configured to transact and bill using cryptocurrency transactions, for example Bitcoin or Ether.

The Distributed Immutable Ledger Application includes a data management tool configured to record information generated by the matching module to a client business entity database. For example, at block 620, trading information, supplier recommendations, and transaction information is logged and stored to the client business entity database, including the distributed immutable ledger. In an embodiment, the client business owns the logged and stored data generated via the application. For example, in an embodiment, a data management tool is configured to log, store and control access to the data, which can then be monetized by the business or exchanged for other goods and services with other businesses on the platform. In an embodiment, the data management tool is configured to log and store client data in one or more databases of client data that is secured on the client side of the system, including client data recorded on the distributed immutable ledger. If the trusted network platform host is granted access, the trusted platform host can be given a private key and a permissioned distributed immutable ledger for the client can replicated to the trusted platform server.

At block 622, the trusted platform host is configured to generate a BOP component network link for the BOP component of the client business entity and the matched business with whom the client transacted. In an embodiment, if the matched business has not established a BOP, the platform can generate a link between the BOP component and the matched business. The trusted platform can update the BOP Application.

In an embodiment, if both parties to the transaction have generated a BOP, the trusted platform is configured to generate a component network link between the components and update the respective BOP Applications' BOP accordingly. Thus, with each user interaction and transaction logged and stored through each business component, the BOP for the company establishes a data driven trusted network of component resourcing.

In an embodiment, trusted platform host can be configured to generate a BOP component network link for multiple BOP components based on transaction information. For example, as noted above, a client business entity may employ conventional billing, for example via PayPal, ApplePay, Google Wallet, Wire or other electronic payment, or the client may employ alternative billing tools such as, for example, cryptocurrency (e.g Bitcoin or ether) and Smart Contracts. In an embodiment, the trusted platform can be configured to generate a network link between a billing BOP component for the business and the chosen payment platform, for example between the billing BOP component and a credit provider. If parties to a transaction have each generated BOPs including respective billing BOP and payment BOP components, the platform can also be configured to generate a network link between the BOP components indicating the type of payment, for example conventional credit transaction or an alternative billing and payment scheme, for example, regular self-executing cryptocurrency transactions pursuant to a Smart Contract.

In an embodiment, each BOP application can be configured to map the link between the components and update the BOP Application's BOP component for billing as well.

The system can be configured to provide firmographic data (e.g. company SIC) and score data, including a network score, and logged and stored usage analytics to suggest options for facilitating transactions, based on data for similar businesses as described herein.

Figure 7:
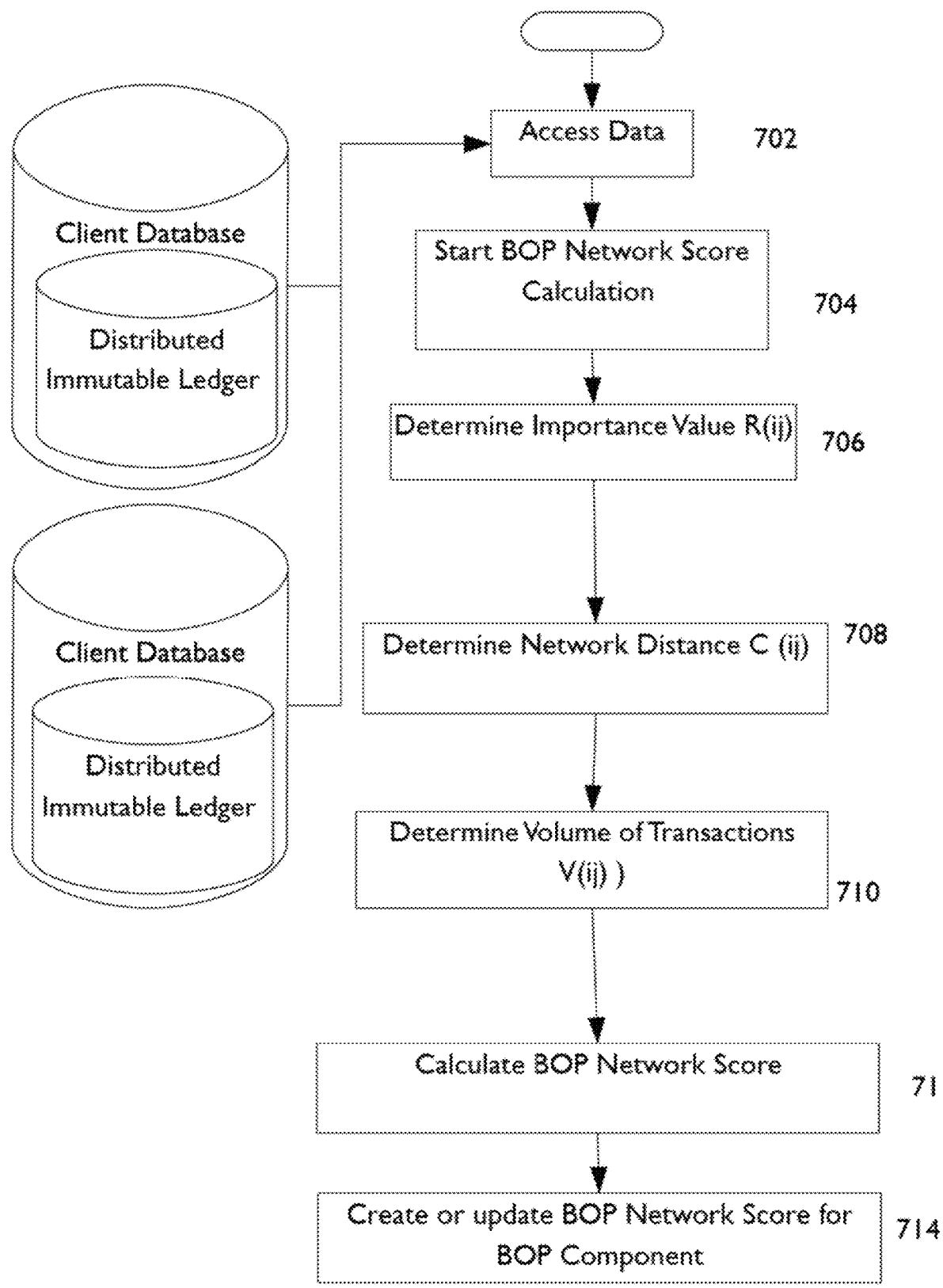
FIG. 7 illustrates a flowchart for a process for scoring in accordance with at least one of the various embodiments.

FIG. 7 illustrates a flowchart for process 700 for a scoring process in accordance with at least one of the various embodiments. In at least one of the various embodiments, a scoring tool of the trusted platform is configured to provide one or more trusted scores for a business registered to the platform. After a start block, at block 702, the scoring tool is configured to access business entity client data the system has or is given access to for generating at least one of the scores. As noted above, in at least one of the various embodiments the trusted network platform host can be granted access to one or more client business entities' respective distributed immutable ledgers, in which case a permissioned distributed immutable ledger for each client is replicated to the trusted platform server. In an embodiment the data can also firmographic data and BOP component network link data generated and processed via BOP Applications on the platform. BOP component network link data can include matching information generated by matching modules and transaction information for BOP components that is logged and stored to the respective client business entity databases, including their distributed immutable ledgers. At block 704, the scoring tool is configured to generate a network score, wherein the BOP network score is derived from data including transaction data between components on at least one client's distributed immutable ledger.

For example, in an embodiment, at block 706 the scoring tool identifies the BOP component categories between linked BOP components, and for each business entity determines an Importance value $R_{ij}$=Core/non-core relationship between business entity=Importance of firm $j$ to business $i$ At block 708, the scoring tool identifies a network distance between the BOP components and determines a Network Distance value:

$C\_ij$=Network distance between businesses $i$ and $j$.

For example, $C\_ij$ can have a 1 value for only a direct relationship, however there can be relationship weights or levels, for example a leveled Tier-N concept, depending on the firmographic or transactional category for the vector.

At block 710, the scoring tool identifies strength of relationship Vij for example volume of transactions $V\_ij$. The strength of relationship $V\_{ij}$ can comprise volume of transaction and/or other measures, for example duration of relationship, monetary value of transaction(s), etc.

At block 712, the scoring tool calculates a BOP network score for the business entity associated with the BOP:

$$S_i = \sum_j w_{ij} S_j$$

where
$w_{ij} = f_K(R_{ij}, V_{ij}, C_{ij}, \ldots )$.

As will be appreciated in view of the teachings of the present disclosure, other variables can be calculated for BOP component vectors.

In an embodiment, at block 714, the system is configured to create or update the BOP network score for the BOP with new business entity client data, for example new matching and BOP application data for the identified values as described above. The system is configured to provide the BOP network score to BOP Applications to facilitate trusted transactions between business components, for example as shown with respect to the exemplary graphic user interface at FIGS. 12A-12B.

In an embodiment, the BOP network score includes a base score and a plurality of tiered scores.

In an embodiment, the BOP network score can be weighted into an entity rating score to generate an extended entity rating score. For example, the platform host can generate scores and ratings for businesses, for example Financial Stress, Viability, Delinquency, IT Demand, Buydex, Paydex, Energy Demand, network score, etc. Examples of entity scoring and network rating can be found in U.S. patent application Ser. No. 14/452,946, published as U.S. Pat. Pub. 20150178645A entitled "Discovering a business relationship network, and assessing a relevance of a relationship," and U.S. patent application Ser. No. 10/830,483, published as U.S. Pat. Pub. 20050240503, entitled "Detailed Trade Data Report," the entirety of each of which is incorporated by reference hereby. The BOP network score can be weighted into one or more of these entity rating scores to generate an extended entity rating score.

In an embodiment, the system can be configured to generate a geographic score. For example, a geographic score a national score and/or a local score. A local score can based on a location: for example, by town, neighborhood, zip code, city, area code, state, region, etc., or by geofencing or other geolocation defined zones where the business entity has locations corresponding to BOP components.

In an embodiment, the local score can be weighted into the BOP network score. For example, the scoring tool can be configured to identify geographical distance D_ij between BOP components and calculate a local score for the BOP components, where $w_{ij}=f(R_{ij}, V_{ij}, C_{ij}, D\_ij \ldots)$.

The system can also be configured to calculate local scores for networked BOP components in a given geographic area using, for example, a geofence or location code and recalculating weighs for BOP components within the location. For example, within a given location, a volume of business may be weighted more than a duration of business.

In an embodiment, the scoring tool is configured to generate a customized model score based on data for, inter alia, targeting prospects and channel suggestions in a geographic location.

In an embodiment, the scoring tool is configured to generate a finance score for a BOP, for example for a BOP finance component. The scoring tool can be configured to generate a finance score derived from validation data confirming transactions validated between components on the distributed immutable ledger. The finance score can be based on at least the BOP network score, as well as firmographic data values and business operation data values. For example, in an embodiment, a BOP for a business entity can have a high BOP network score due to, inter alia, a high volume of trusted transactions on a distributed immutable ledger between many business components with different entities. Firmographics data for the BOP comparisons on the trusted network can show that in a business in given industry (i.e., from a SIC code value), location, network score.

Figure 8:
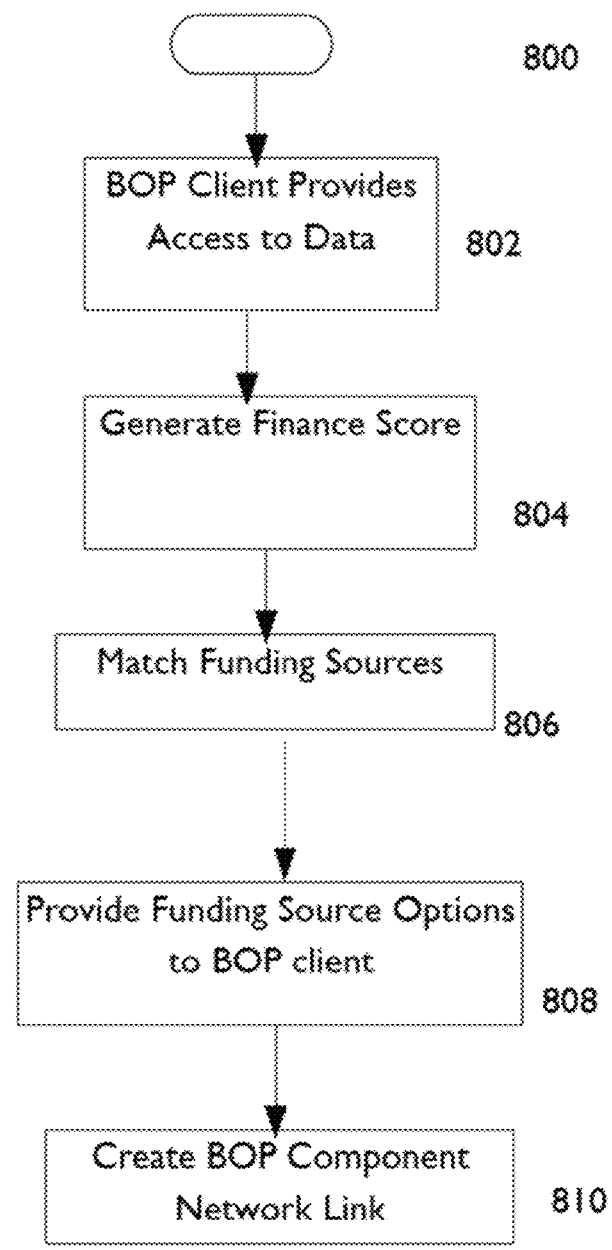
FIG. 8 illustrates a flowchart for a process for a finance component in accordance with at least one of the various embodiments.

FIG. 8 illustrates a flowchart for process 800 for a finance module configured to match a client business entity with a funding source, wherein the finance matching module matches funding sources to the client business entity using a finance score. The finance matching module can be configured to match funding sources to the client entity employing at least one of a funding model, an SIC code, and a rate.

After a start block, at block 802 the finance matching module is configured to allow a client business entity to provide access to the client data, including data recorded on the distributed immutable ledger to one or more funding sources. For example, the client business entity can choose to share their BOP Application data stored on the distributed immutable ledger, for example data on sales, business network, inventory, etc., with the platform host, who can provide access to funding sources in turn. At block 804, the scoring tool generates a finance score as described herein, for example using the BOP network score and the firmographic data.

At block 806, the finance matching module is configured to provide one or more funding sources with firmographic data and business operation data logged and stored to a client entity business database, as well as a finance score. At block 808, the BOP finance component can be configured to provide businesses with options of lenders and financial products that can serve the business financial needs, based on firmographic values, for example, the growth stage of the business. For example, the BOP finance matching module can be configured to invite financing entities to send offers to the business entity via the BOP application. In an embodiment, the finance module can list fund sources from traditional lending institutions as well as alternative financing sources (e.g. angel investors, crowdsourced funding, Fintech applications). At block 810, the platform can be configured to create and map a BOP component network link between a BOP Finance Component and funding source.

Accordingly, the platform is configured to allow businesses to use the score/index to shop for loans from myriad lenders. Furthermore, the platform can provide benchmarks of rates and terms of all funding options and prioritize them for businesses, based on, for example similar businesses' borrowing records in the trusted platform databases.

One exemplary advantage of the trusted platform's BOP network is it provides technological tools for early-stage small businesses and startups not available in existing Fintech platforms and tools. Small businesses and start-ups are often blocked out of the traditional financial markets due to their short history and annual revenue not meeting required thresholds. Although non-bank alternative lenders offer such businesses an opportunity to get funding, oftentimes the rates they receive are staggeringly high if the business is not ejected outright. As of today, many online lenders still require longer than a three-year financial history, positive cash flow and no debt, etc. to control risk. Lack of transparency in business and financial data is the main hurdle emerging businesses and startup face when trying to gain trust from potential investors in alternative lending scenarios. The trusted platform is configured to allow businesses to verify data on a distributed immutable ledger which is vectored into network component links and logged and stored as trusted data. Business entities can give access to this data to the platform host as well as to the borrowing business and other similar businesses (upon businesses consent) to build analytically driven scores/index as described herein to enable BOP Application enabled businesses to gain access to financial markets.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system or even a group of multiple computer systems. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Illustrative User Interface Use Cases

FIGS. 9-11B represent embodiments of graphical user interfaces for a trusted network platform and BOP applications with at least one of the various embodiments. In at least one of the various embodiments, user interfaces other than user interfaces described herein may be employed without departing from the spirit and/or scope of the claimed subject matter. Such user interfaces may have more or fewer user interface elements which may be arranged in various ways. In some embodiments, user interfaces may be generated using web pages, mobile applications, application programming interfaces, or the like. In at least one of the various embodiments BOP Application Server 316, Finance Component 319, or third party applications and the like, can include processes and/or API's for generating user interfaces as described herein.

Figure 9:
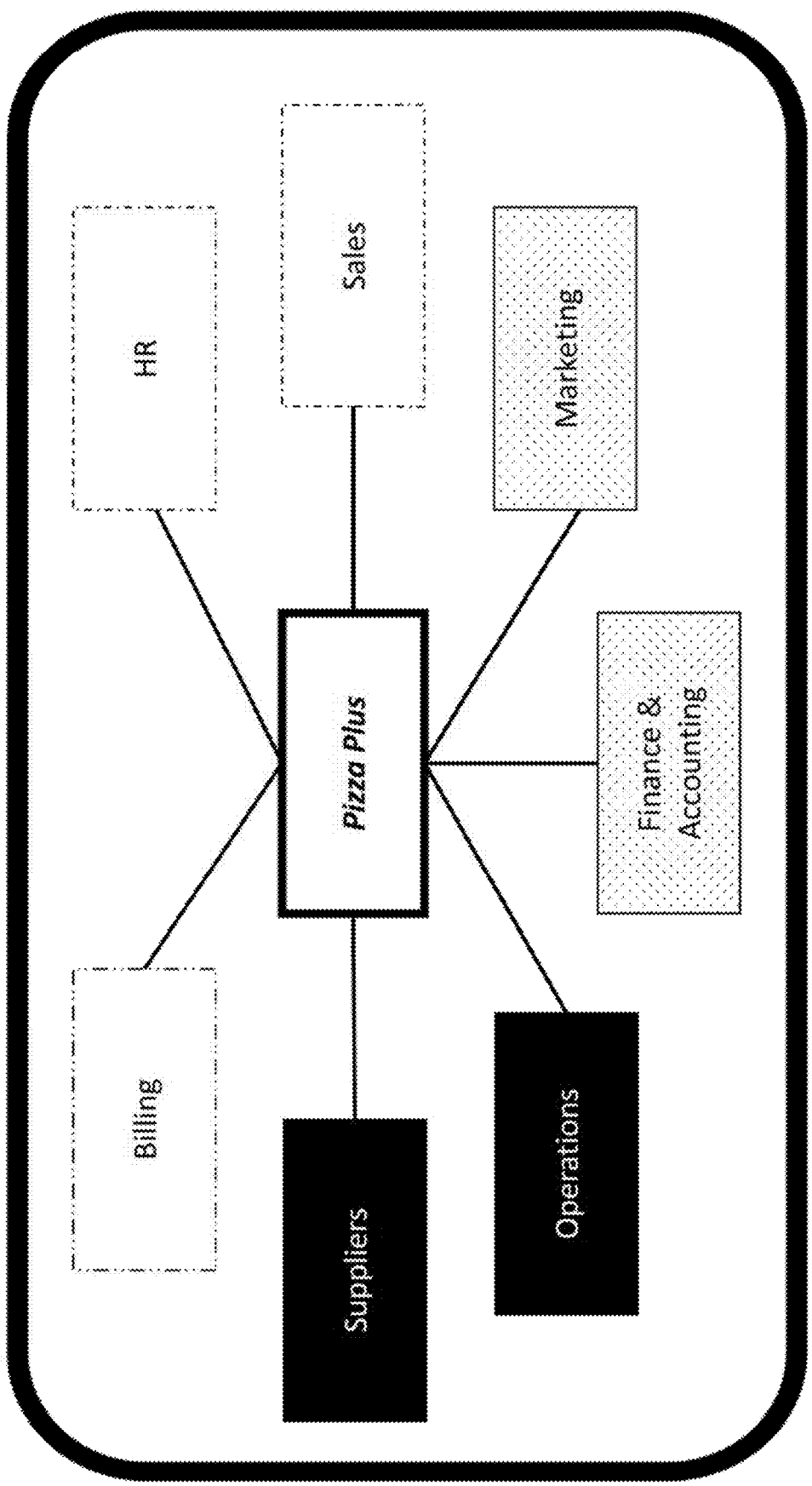

FIG. 9 shows an example of a graphical user interface for a BOP Application on a client device. As shown in FIG. 9 the BOP Application is configured to display the BOP components for the client business entity, shown in the exemplary interface as a small business "Pizza Plus." The BOP interface is configured to show the BOP components as a hub and spoke configuration, with the business entity as the hub and the BOP components as nodes (HR, Billing, Operations, Finance, Marketing, and Sales) at the end of each spoke. Each BOP component is distinguished by category, for example, as a Core Business component, a Medium-Core Business Component, or a Non-Core Business Component. As shown in FIG. 9, the BOP Application is configured to identify the BOP components based on BOP category, for example using graphic and/or textual indicia such as color coding. For example, colors for the components denote which components are core to the business (green/shown as a solid fill), which are medium core (cyan/shown as a pattern fill) and which areas are not core to business (grey/shown as dashed line around component). In at least one of the various embodiments, each of the components can be configured to be selected on the interface to provide user with BOP component tools based on the BOP component selected.

Figure 10:
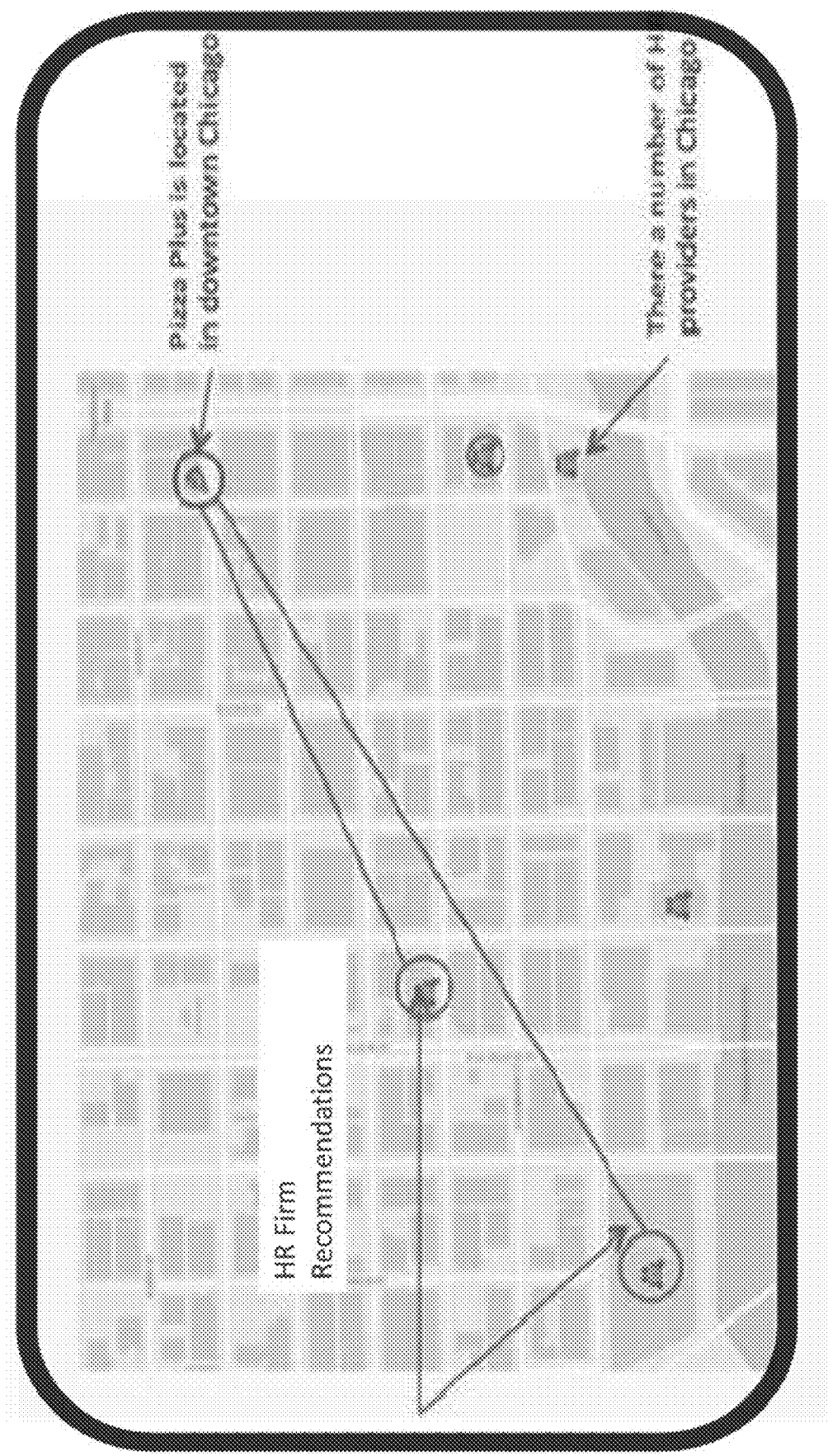
Figure 12:
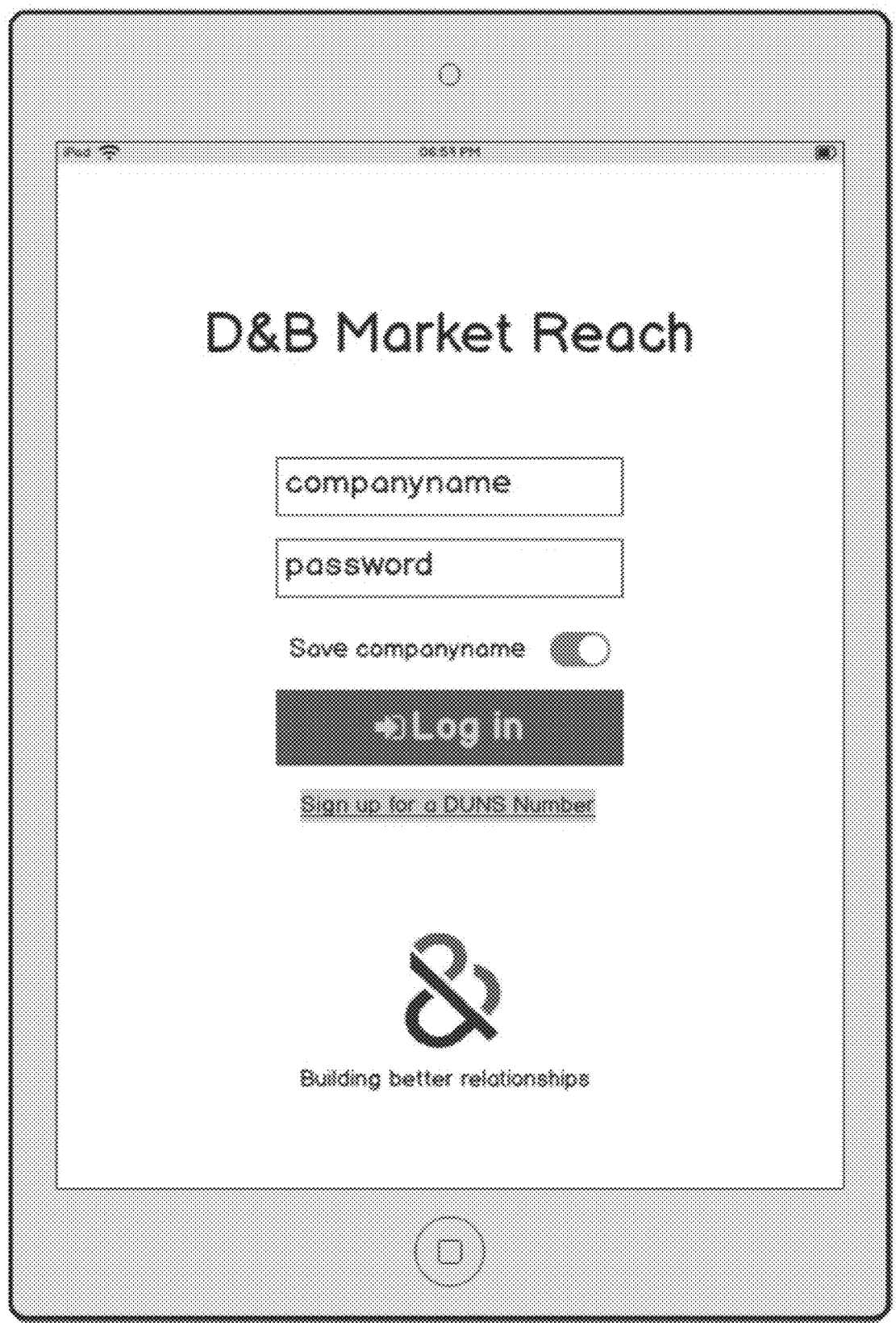

FIG. 10 is an example of a graphical user interface for a BOP Application including a mapping tool to present matching information for a BOP component. When a user selects a BOP component, the BOP application is configured to present an interface with BOP tools and information corresponding to the BOP component selected. As shown in FIG. 12, when the user selects the Non-Core Business component "HR", the BOP component displays a map centered on PizzaPlus's business location in downtown Chicago. The map interface is populated with matching information for BOP component: HR firms that PizzaPlus can do business with. The BOP application is also configured to obtain firmographics information from the trusted platform host to recommend to PizzaPlus, based on their firmographics, and past usage patterns. If PizzaPlus chooses one of these HR firms (e.g. "Peoples") the BOP application is configured to log the data and store it for Pizza Plus. In an embodiment, the trusted platform host also logs and stores the data. Another embodiment of exemplary mapping interfaces for "Pizza Plus" is shown with respect to the interfaces shown in FIGS. 20-25

Figure 11A:
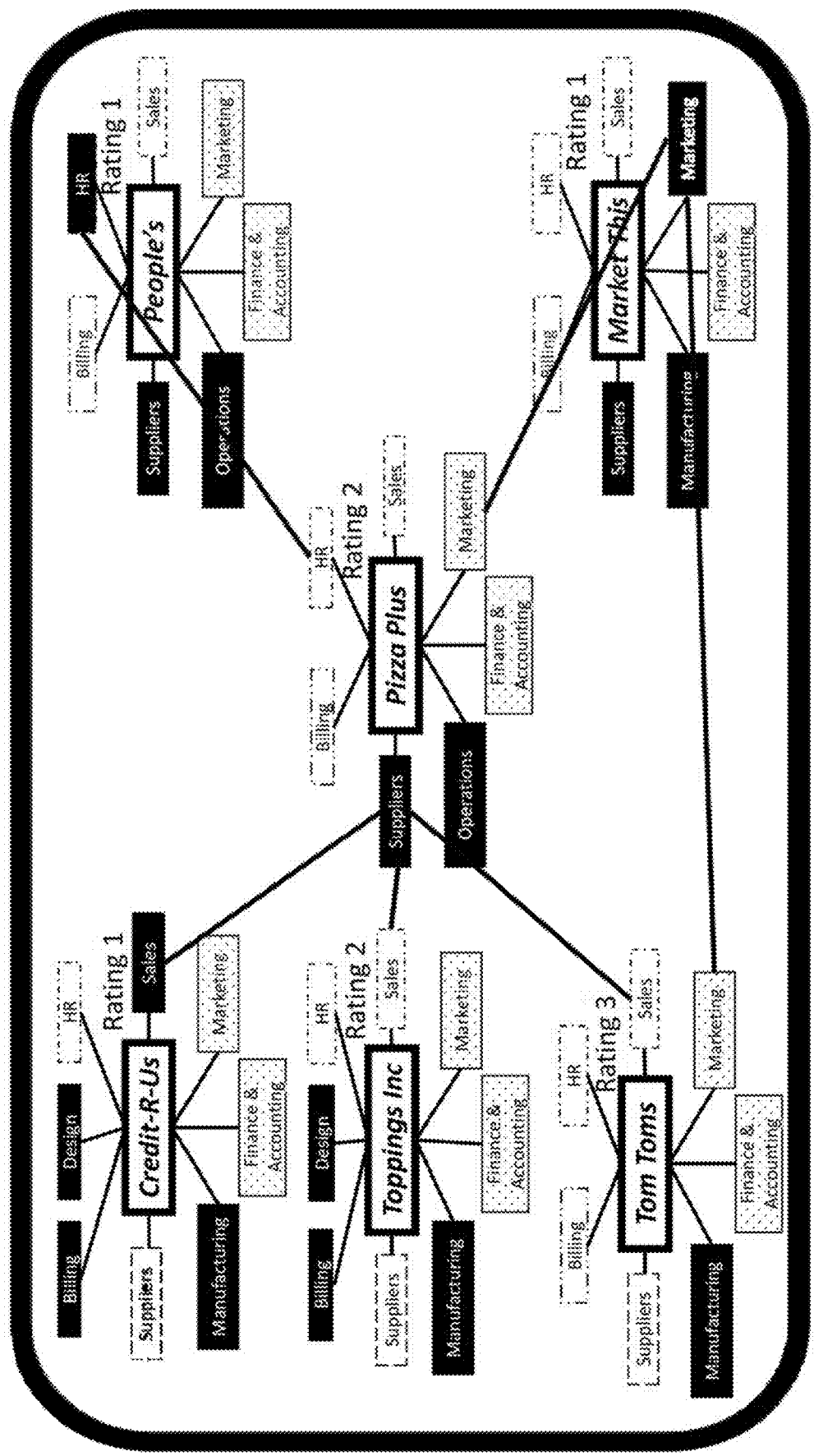
Figure 11B:
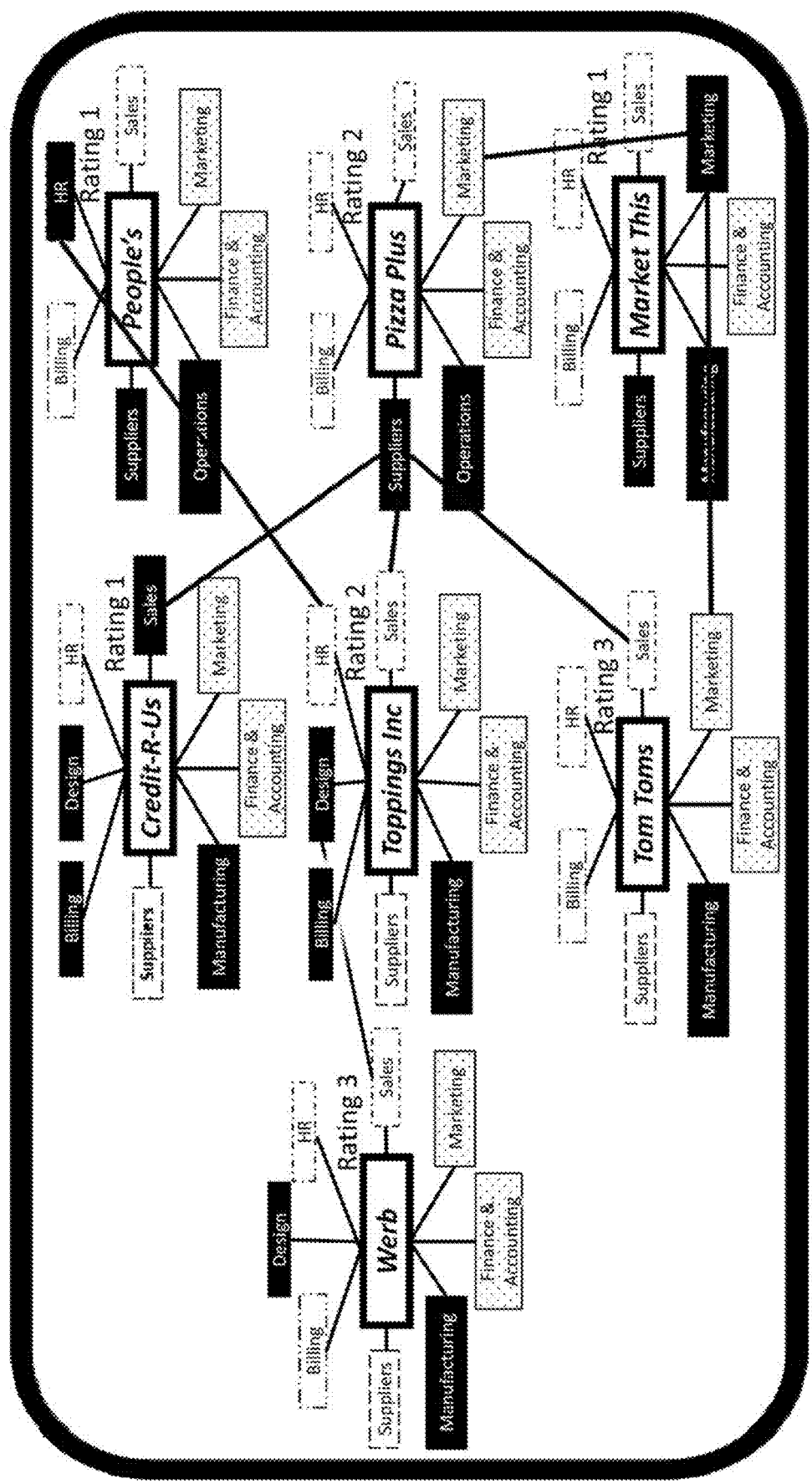

FIG. 11A and FIG. 11B each show graphic user interfaces configured to show BOP networked components as a hub and spoke configuration. As shown in the examples, FIG. 11A shows an interface of BOP networked components for the BOP Application for the company PizzaPlus. FIG. 11B shows the BOP networked components for the BOP Application for the company Toppings, Inc.

On each interface, each BOP is shown with its BOP Components in a hub and spoke configuration. Each BOP includes a rating, which can include the BOP network score calculated by the scoring tool, for example as shown with respect to FIG. 7. BOP network component links are shown between the BOP components for different business entities that do business with each other via the BOP applications and the trusted network platform. For purposes of illustration, the interfaces are shown with each BOP in the network with all components shown, however in at least one embodiment, interfaces can be configured to show only the BOP for the client business entity registered to the application and its Tier 1 network (direct connections), and can be further configured to show only the BOP components of companies it is linked to, or in the alternative only the company it is linked to without its BOP information.

For example, as shown in FIG. 11B, from Supplier Business "Topping Inc.'s" perspective, Toppings Inc. does business with PizzaPlus based on the trusted platform and BOP application. Using this trusted network and data supplied by the BOP Applications on the network, the trusted platform host technology facilitates the transaction between two companies via the distributed immutable ledger. Topping Inc. can also use transaction data to determine which purchasers are growing. Using this trusted network and data supplied by the BOP Applications on the network, the trusted platform host technology facilitates the transaction between two companies via the distributed immutable ledger. The BOP application can also be configured to employ the distributed ledger and secure trust technology such as, for example, cryptocurreny and smart contracts. A further example of exemplary interfaces for Topping, Inc's BOP interface application is shown with respect to FIGS. 14-19H.

Following the example, PizzaPlus's BOP interface as shown in FIG. 11A also shows BOP components horizontally networked with other business components. As described herein, all of their interactions are recorded in the distributed immutable ledger. As shown on the interface, the HR BOP Component is a Non-Core Business component, and is outsourced to a HR provider called "Peoples," for which the HR component is a Core Business component. PizzaPlus's Marketing BOP Component is a Medium Core Business component, and is outsourced to a business for whom Marketing Services are a Core Component: "MarketThis." The Trusted Platform powered by transactional data logged to the distributed immutable ledger as facilitated through the BOP Application allows these companies do business based on the trust in the network. A further example of exemplary interfaces for PizzaPlus's BOP interface is shown with respect to FIGS. 20-25.

FIGS. 12-25 show examples of graphical user interfaces for at least one embodiment of a BOP Application.

FIG. 12 shows an example of a Login Screen for at least one embodiment of a BOP Application. From the Login Screen a user can either login in with an existing account or register from an account.

Figure 13:
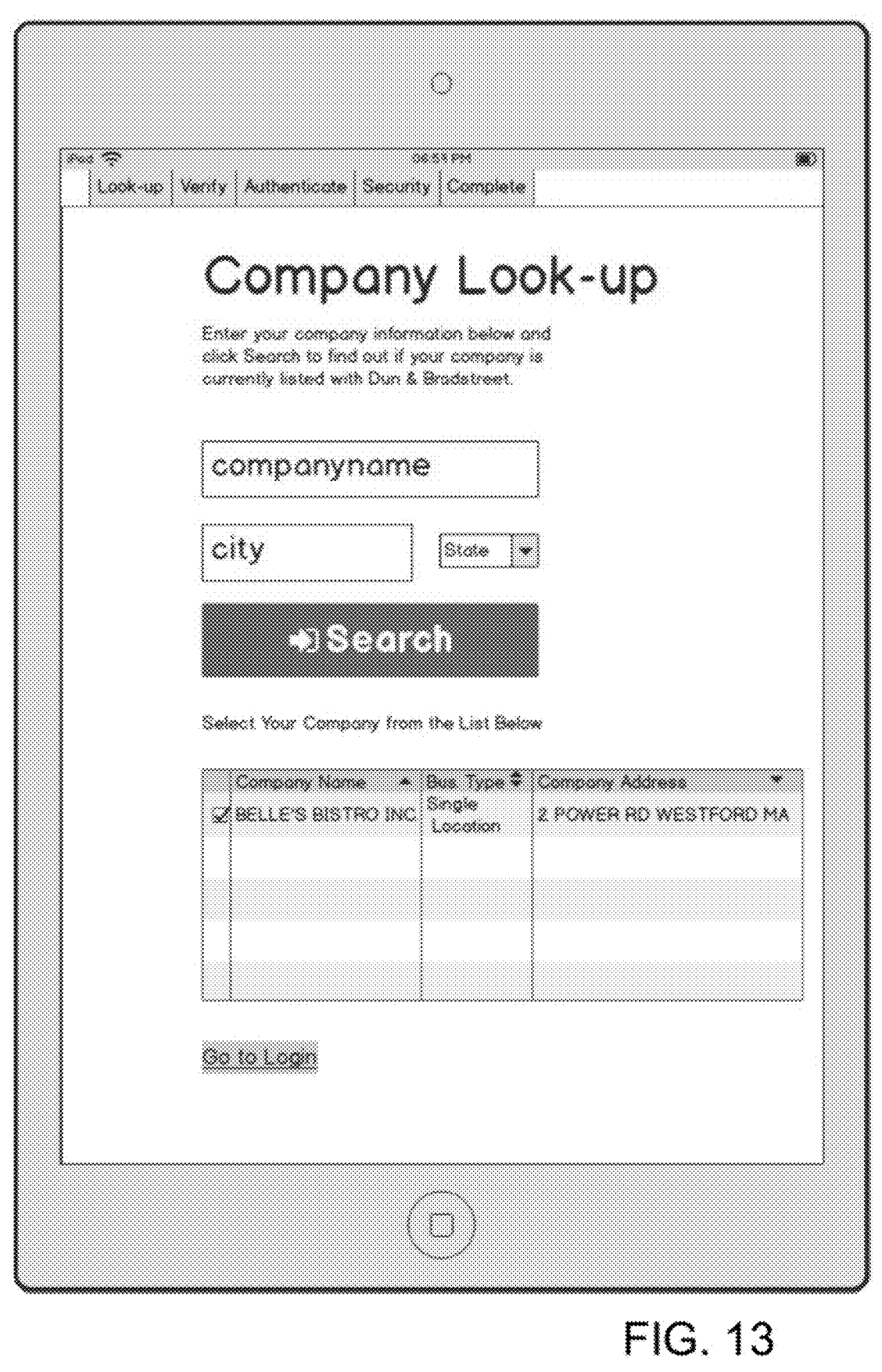

FIG. 13 shows an example of a Registration Screen for at least one embodiment of a BOP Application. The interface allows the user to look up their business to see if they are registered with the trusted platform, for example as described above with respect to FIG. 6.

FIG. 13 shows an example of a Registration Screen for at least one embodiment of a BOP Application.

Figure 14:
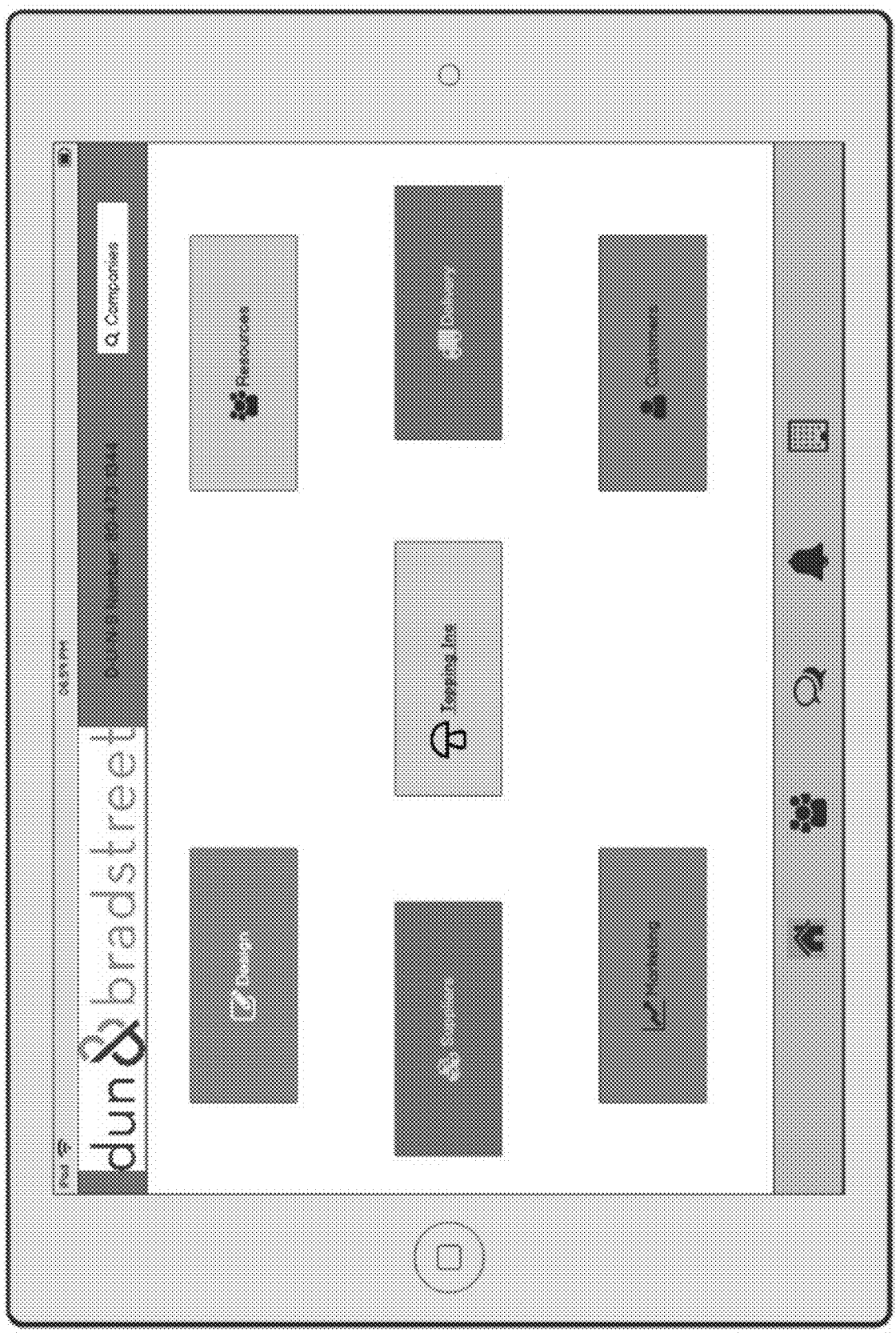

FIG. 14 shows an example of a Main Screen for at least one embodiment of a BOP Application including BOP Components.

Figure 15:
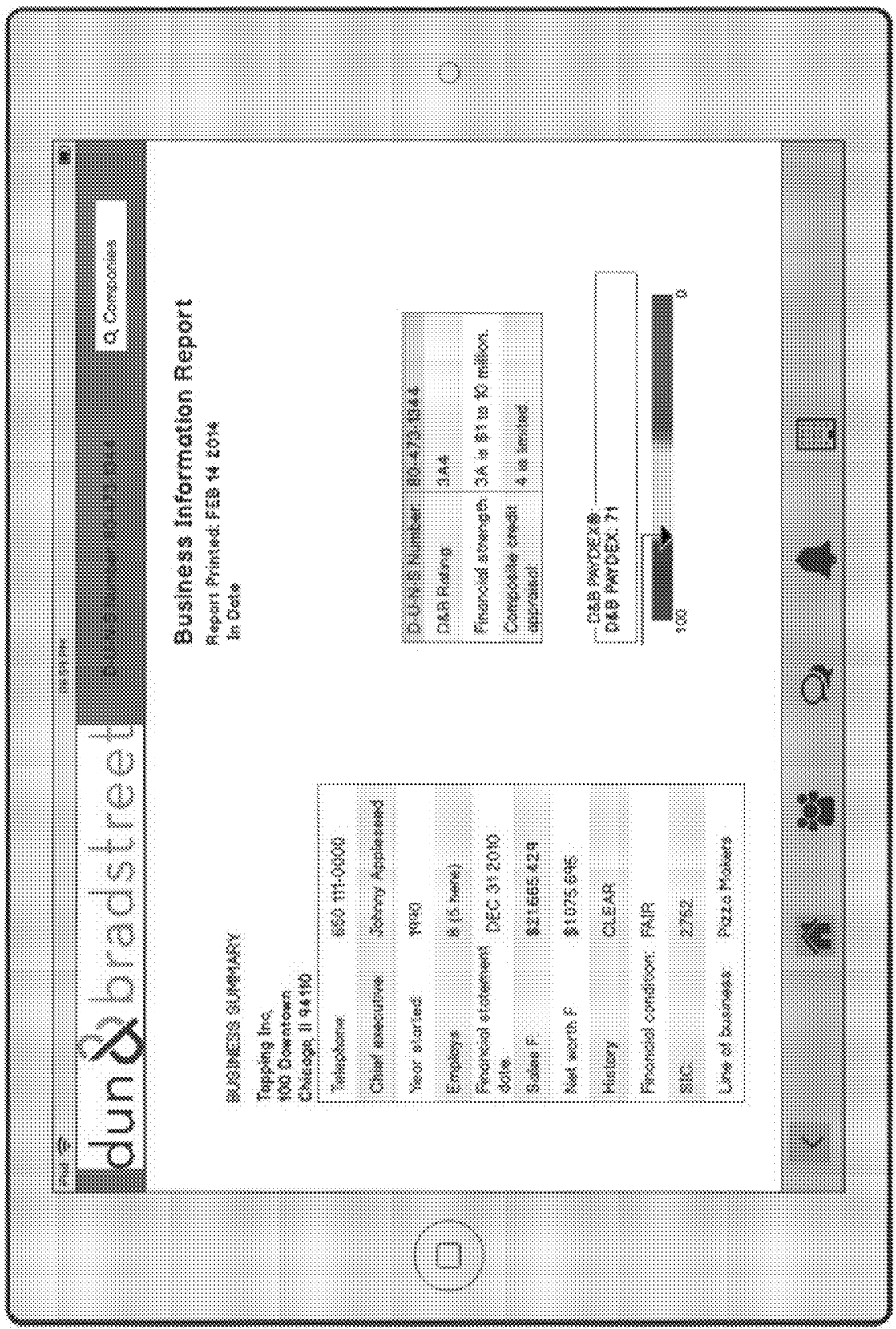

FIG. 15 shows an example of a Business Information Report for the registered BOP entity for at least one embodiment of a BOP Application, the information report including firmographic information and including entity rating scores, including a D&B rating and a D&B Paydex@. The Business Information Report is accessed from the registered BOP entity's hub for the BOP components.

Figure 16A:
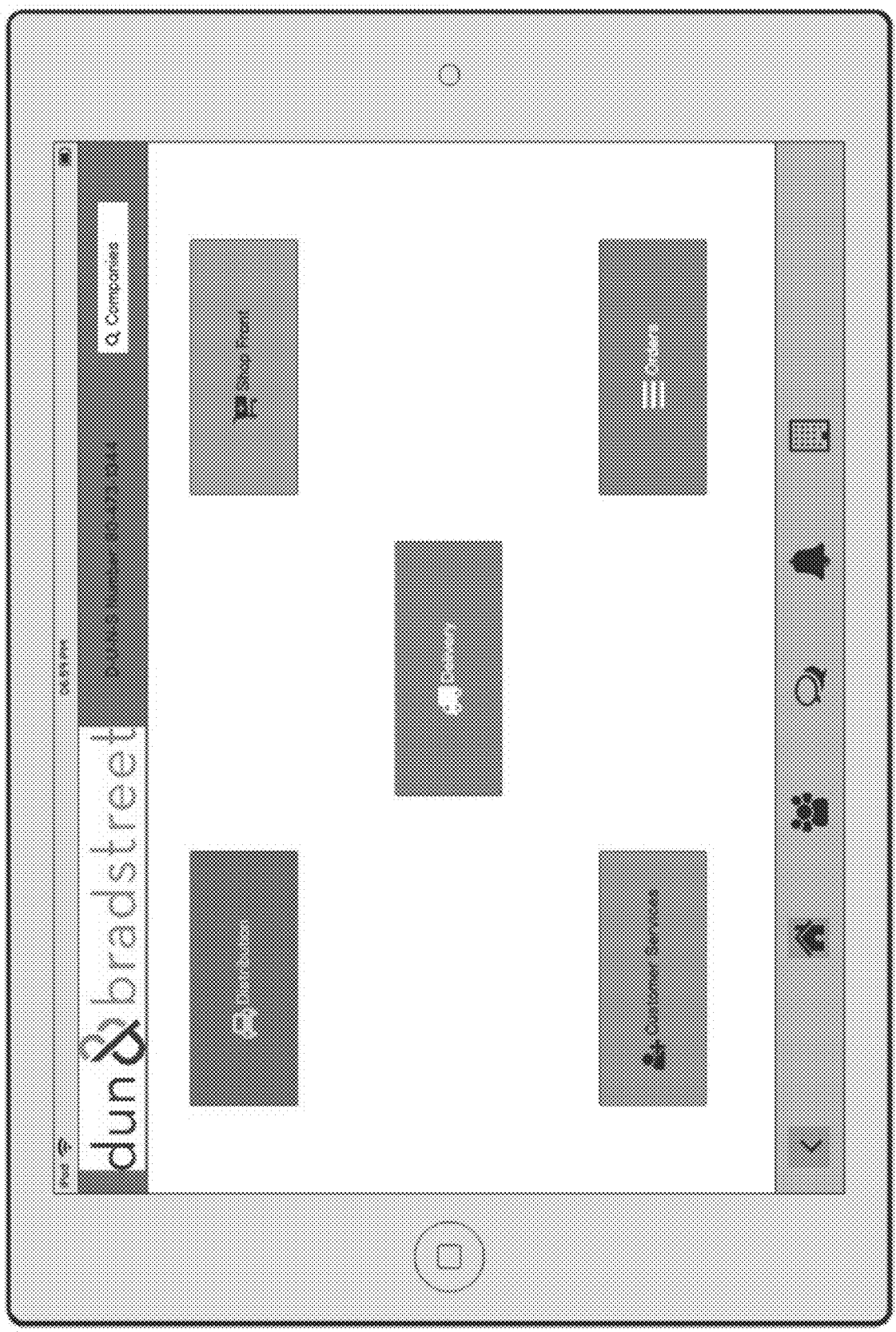

FIG. 16A shows an example of a BOP Component Screen, a Delivery Component Screen and a plurality of Delivery Component sub-components, for at least one embodiment of a BOP Application.

Figure 16B:
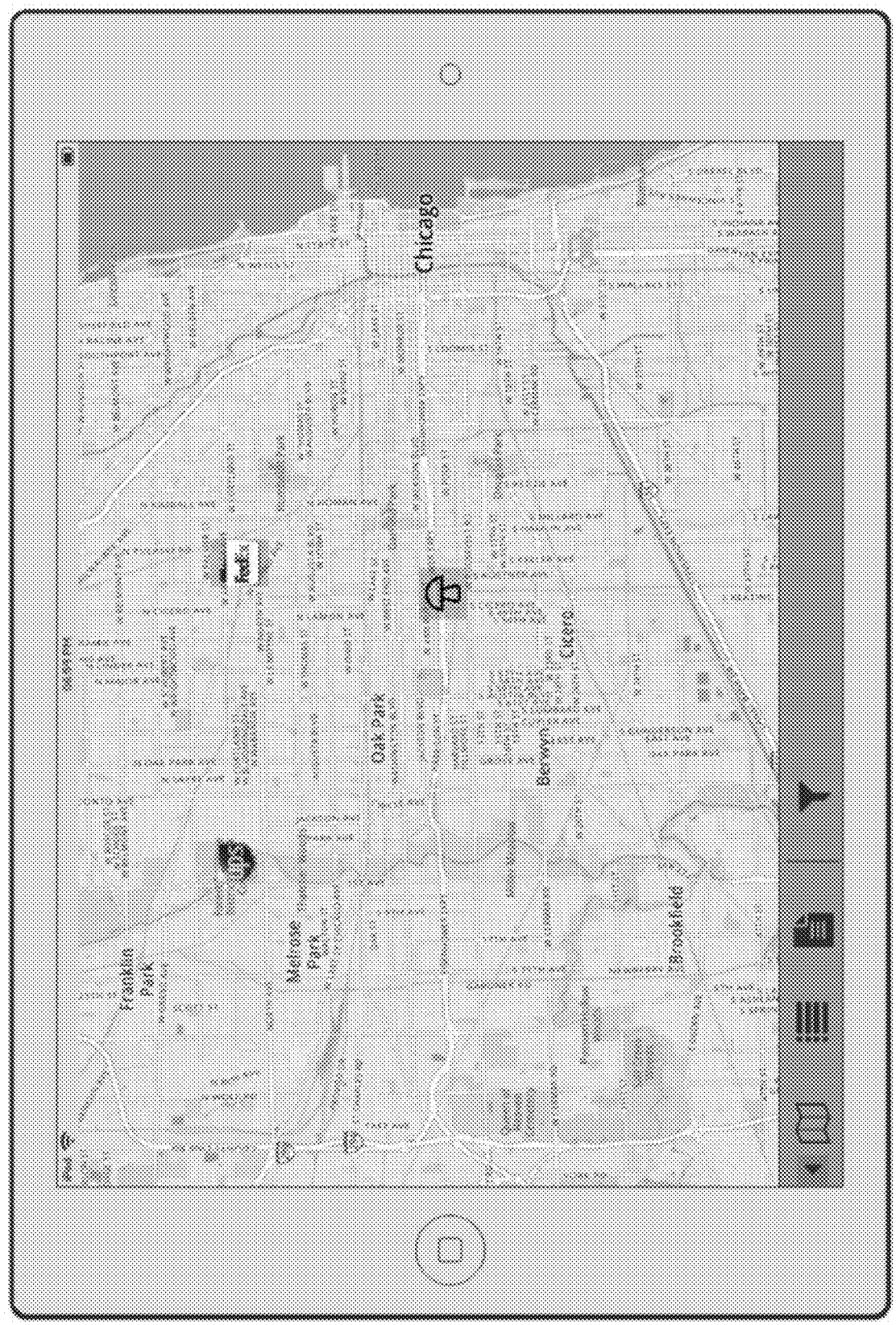

FIG. 16B shows an example of a Map Interface showing mapped icons of Local Distributers for the registered BOP business accessed from a Distribution sub-component of the Delivery Component Screen of FIG. 16A for at least one embodiment of a BOP Application.

Figure 16C:
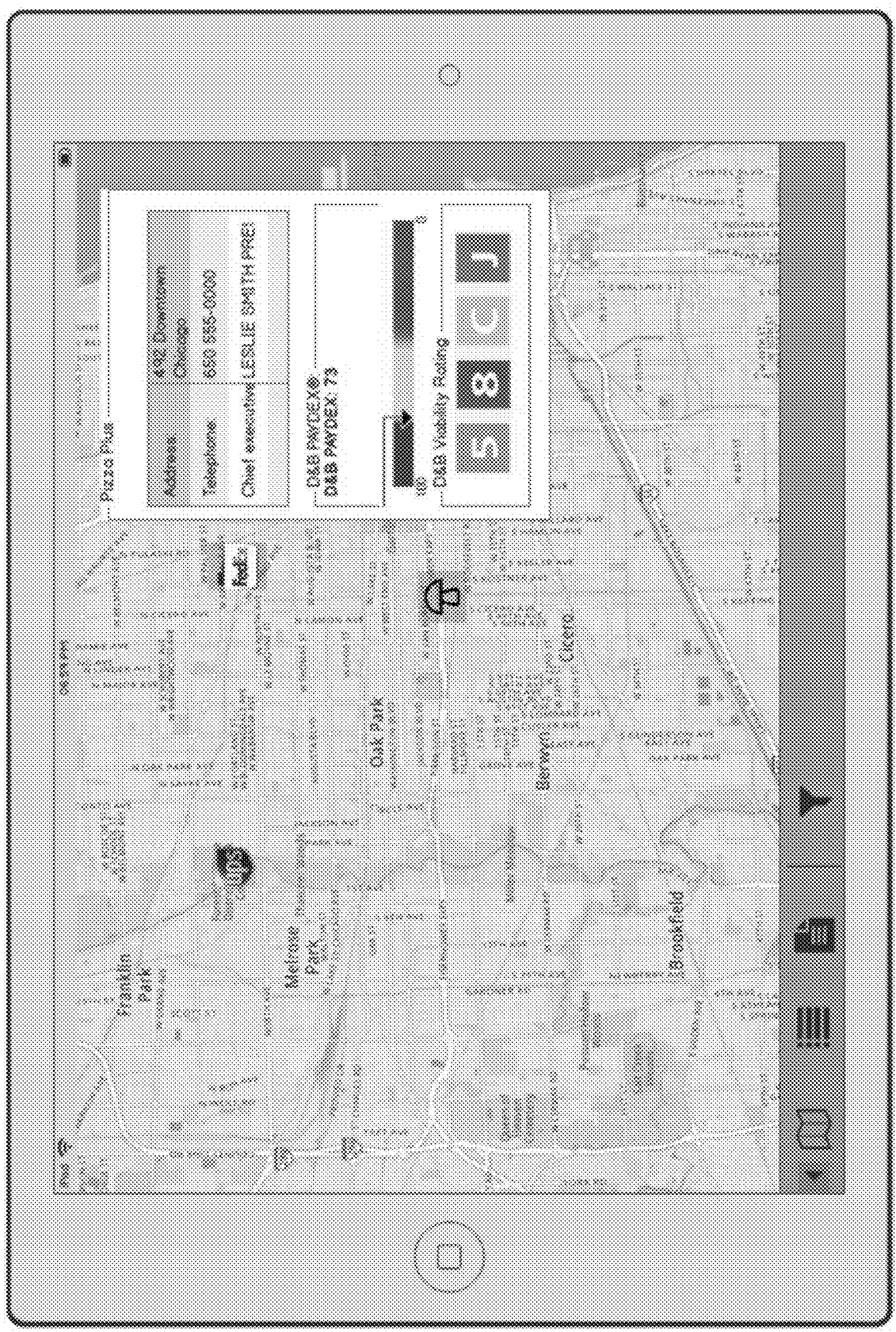

FIG. 16C shows an example of a Purchaser Report selected from an icon of a Local Distributer on FIG. 16B for at least one embodiment of a BOP Application.

Figure 16D:
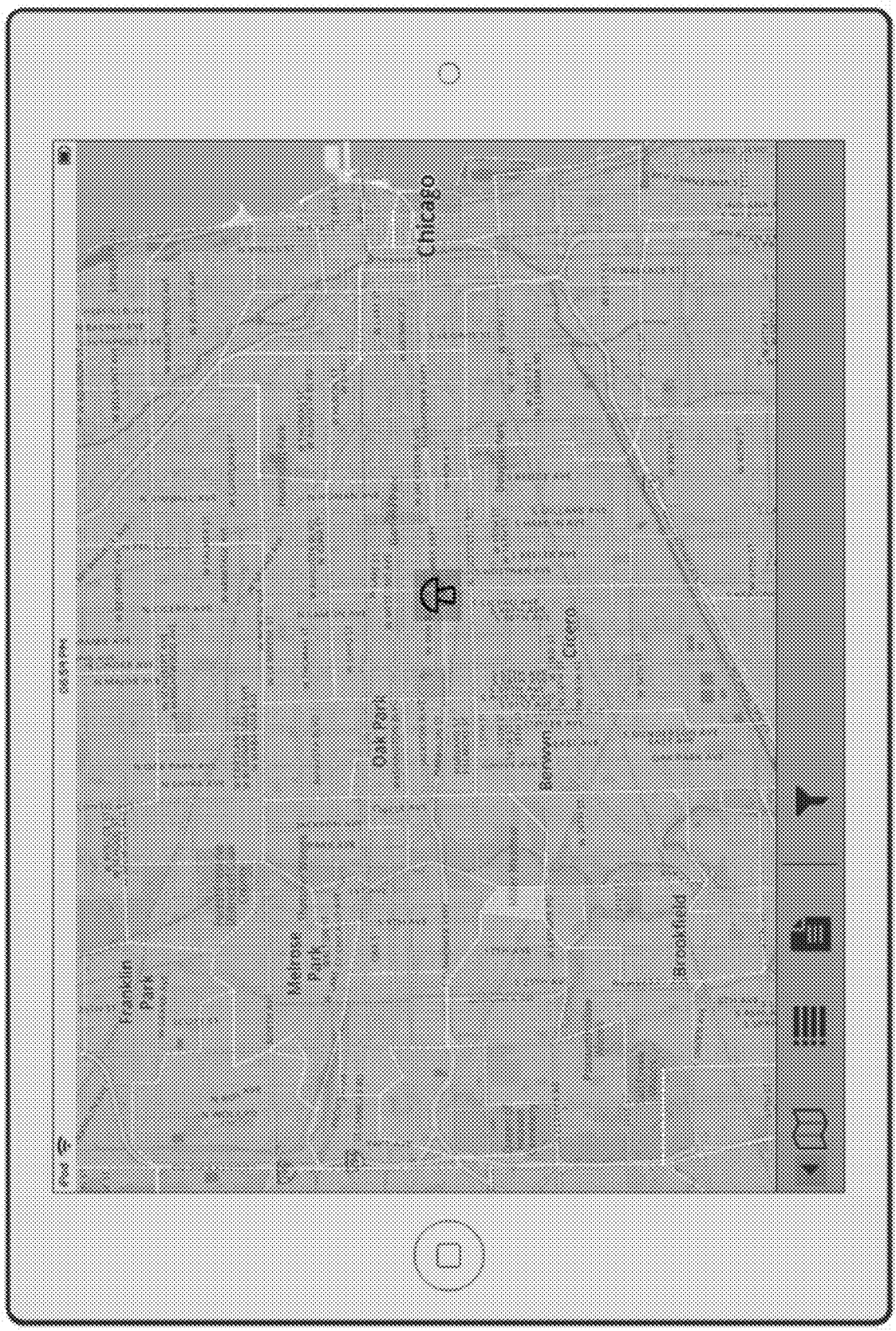

FIG. 16D shows an example of a Map Interface showing a Shop Front report for the registered BOP business accessed from a Shop Front sub-component of the Delivery Component Screen of FIG. 16A for at least one embodiment of a BOP Application.

Figure 17:
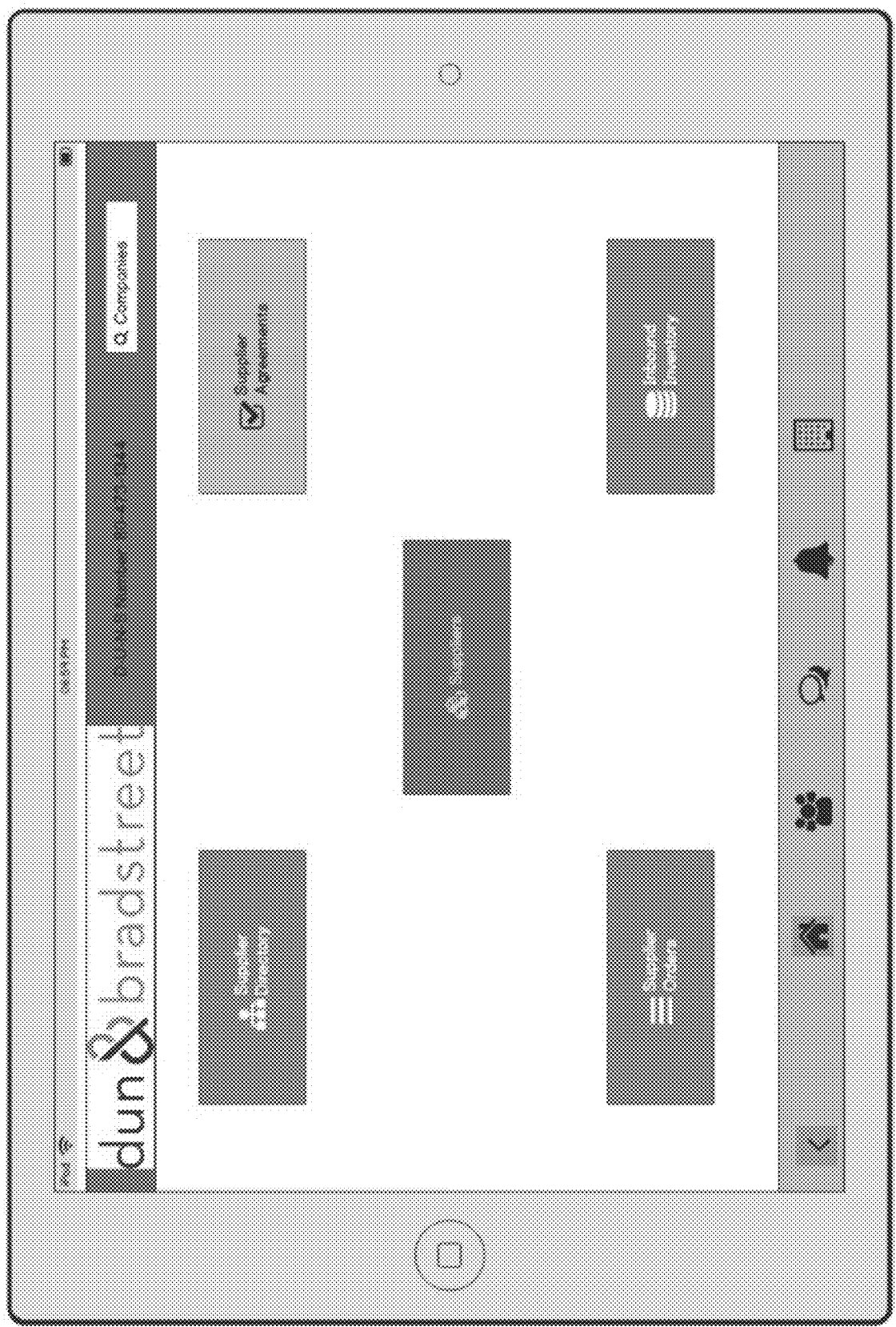

FIG. 17 shows an example of a BOP Component Screen, a Suppliers Component Screen and a plurality of Supplier Component sub-components, for at least one embodiment of a BOP Application.

Figure 18A:
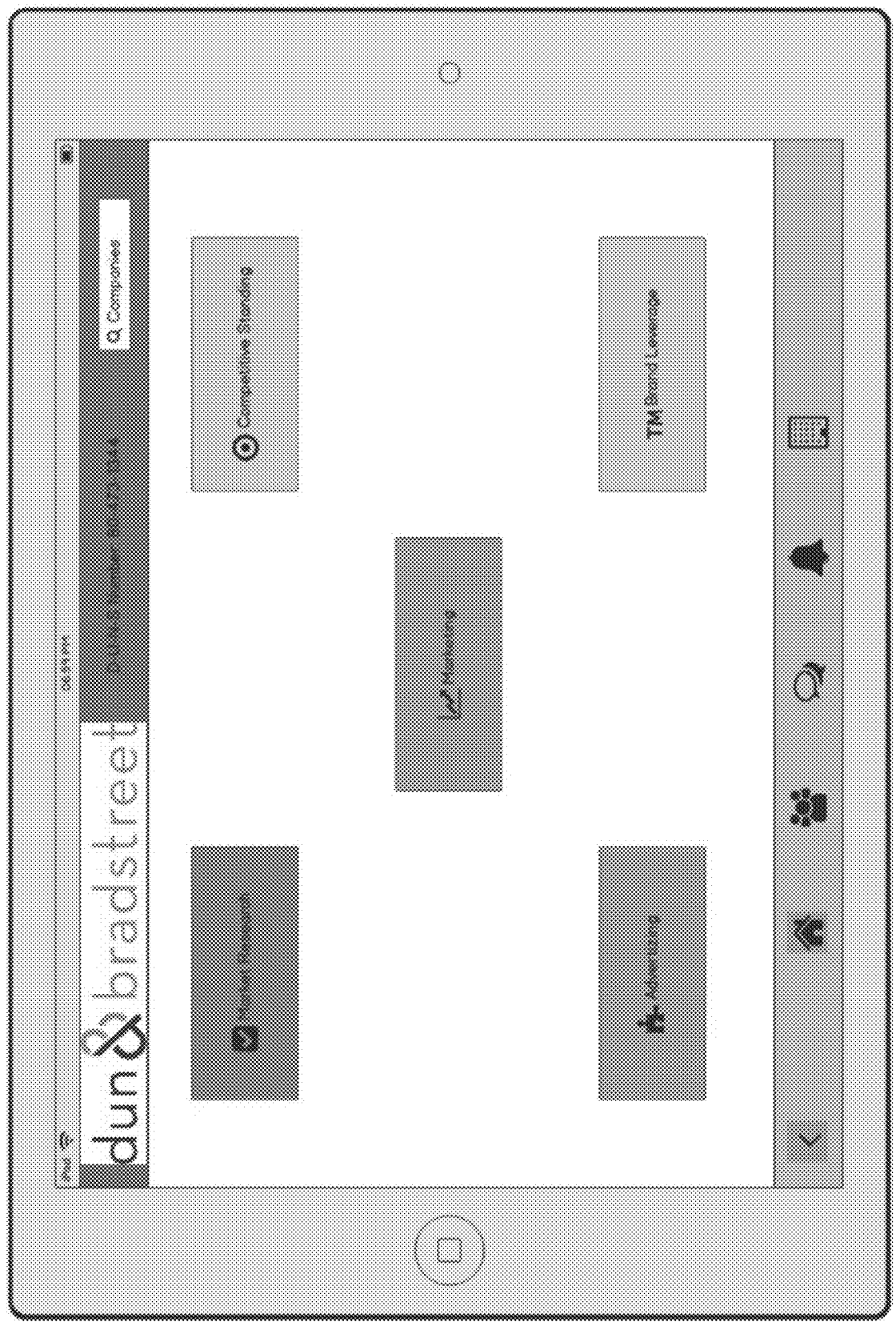

FIG. 18A shows an example of a BOP Component Screen, a Marketing Component Screen and a plurality of Marketing Component sub-components, for at least one embodiment of a BOP Application.

Figure 18B:
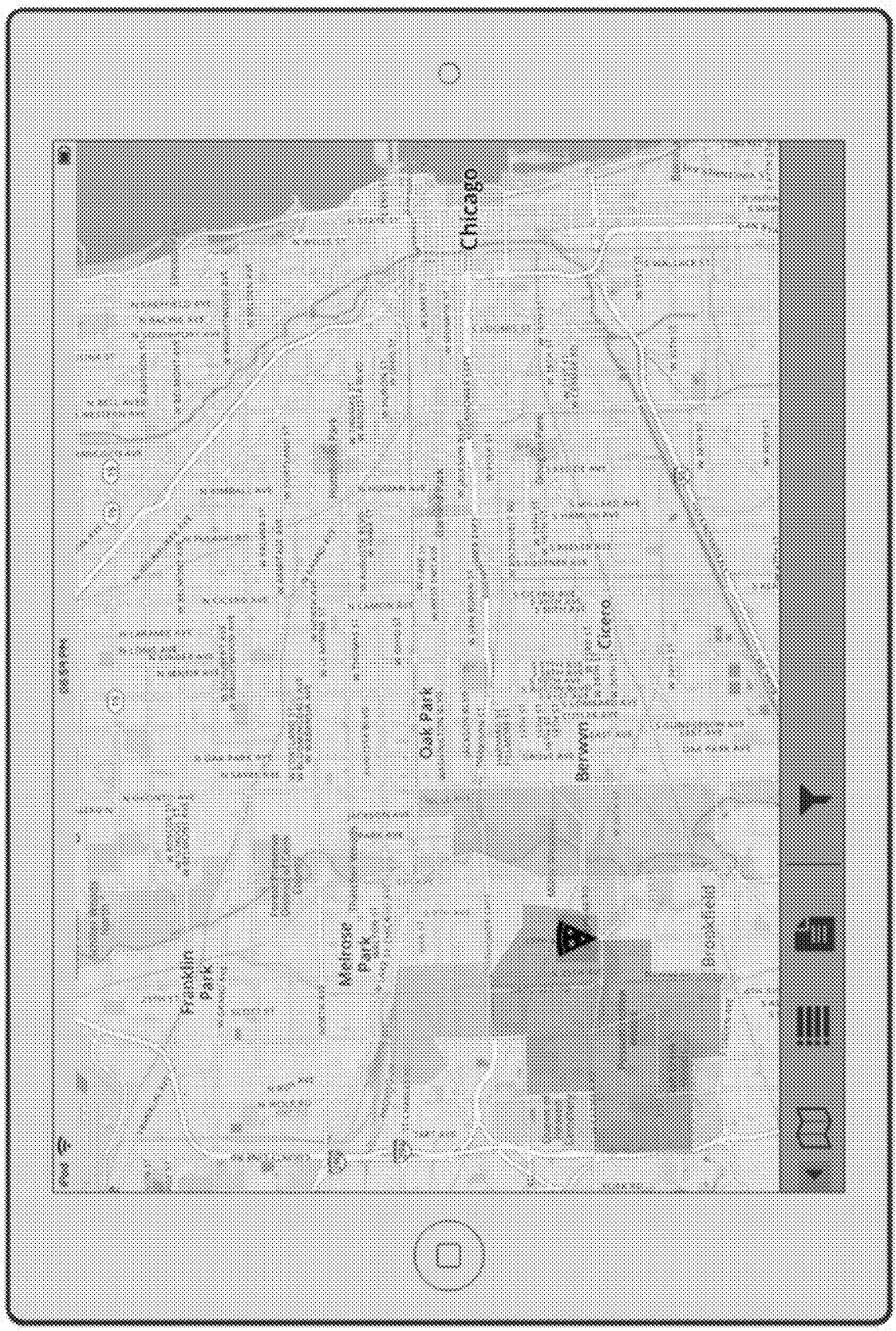

FIG. 18B shows an example of a Map Interface showing a Market Research screen accessed from a Market Research sub-component of the Delivery Component Screen of FIG. 16A for at least one embodiment of a BOP Application.

Figure 19A:
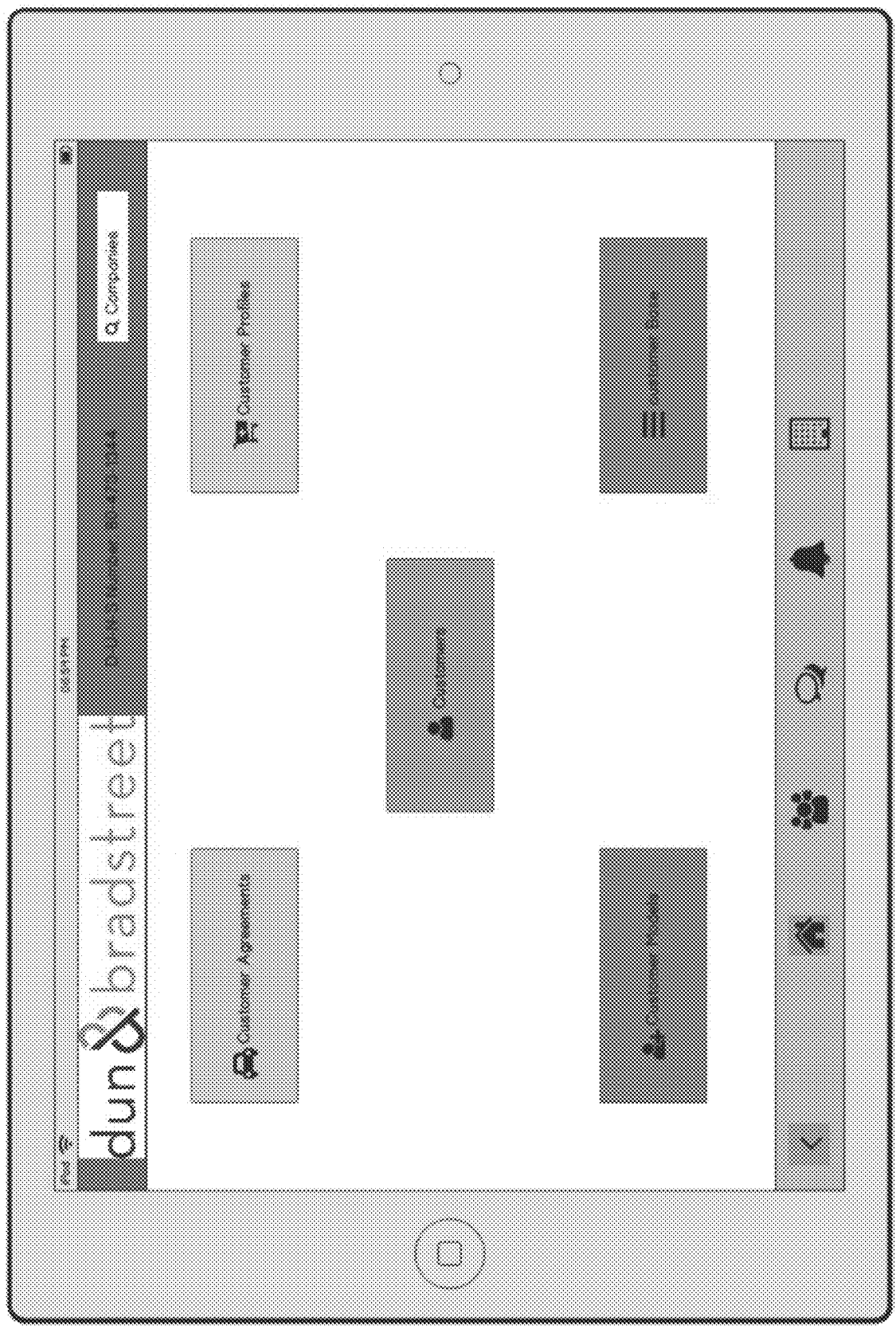

FIG. 19A shows an example of a BOP Component Screen, a Customers Component Screen and a plurality of Customer Component sub-components, for at least one embodiment of a BOP Application.

Figure 19B:
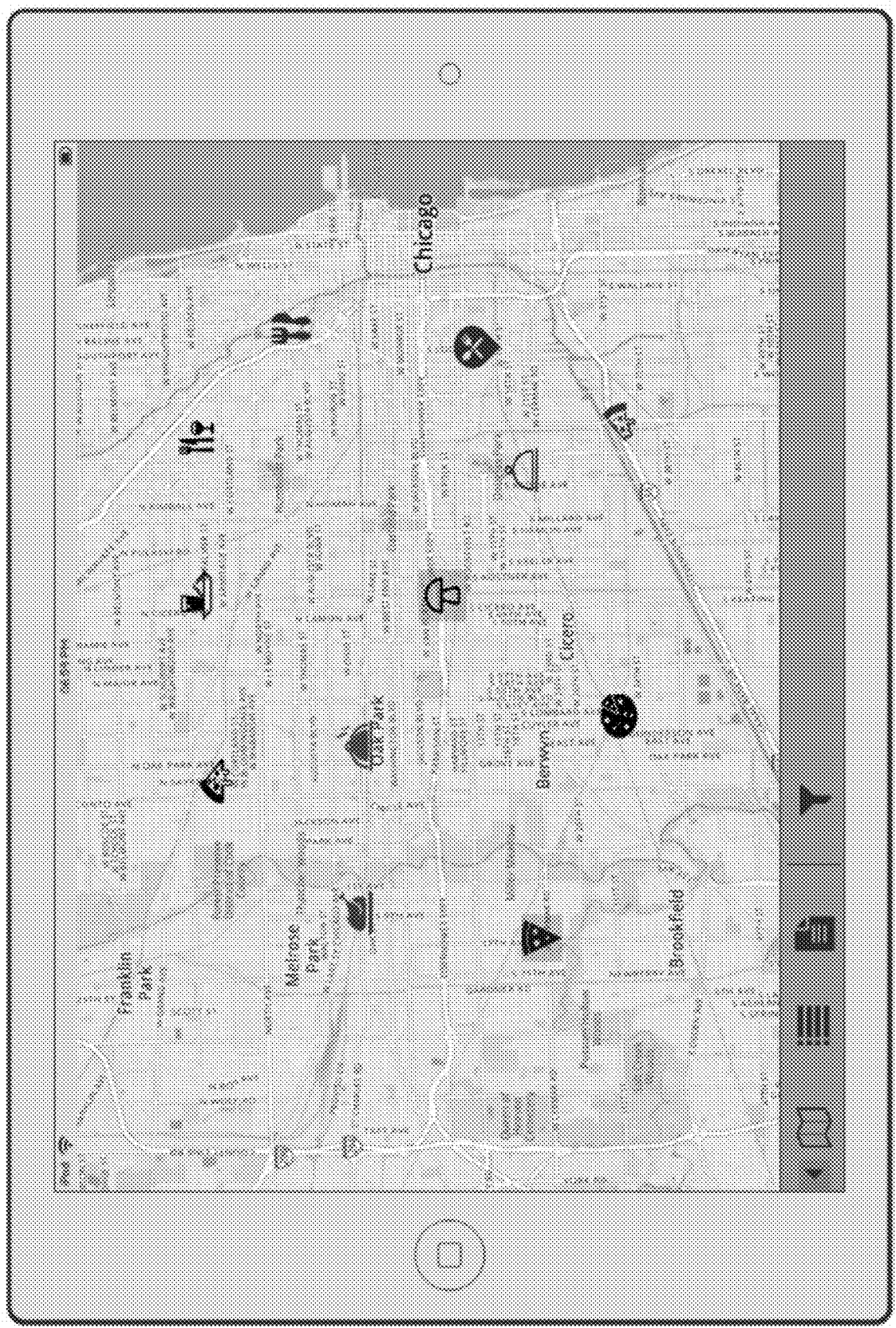

FIG. 19B shows an example of a Map Interface displaying mapped icons of customers of the registered BOP entity, the Map Interface being accessed from a Customer Base sub-component of the Customer Component Screen of FIG. 19A for at least one embodiment of a BOP Application.

Figure 19C:
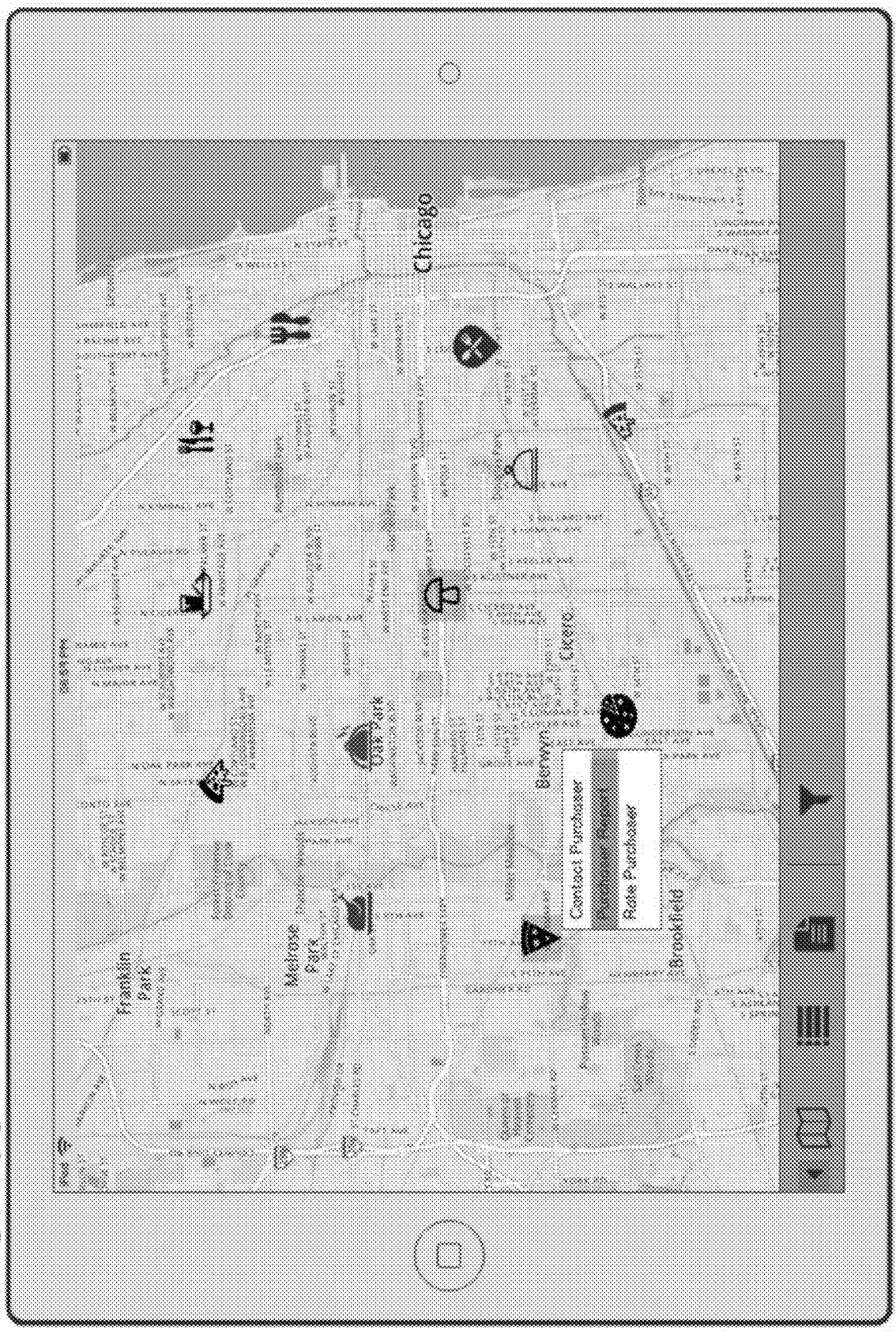

FIG. 19C shows an example of a Map Interface displaying a drop down menu from one of the mapped icons of customers of the registered BOP entity on the Map Interface of FIG. 19B for at least one embodiment of a BOP Application.

Figure 19D:
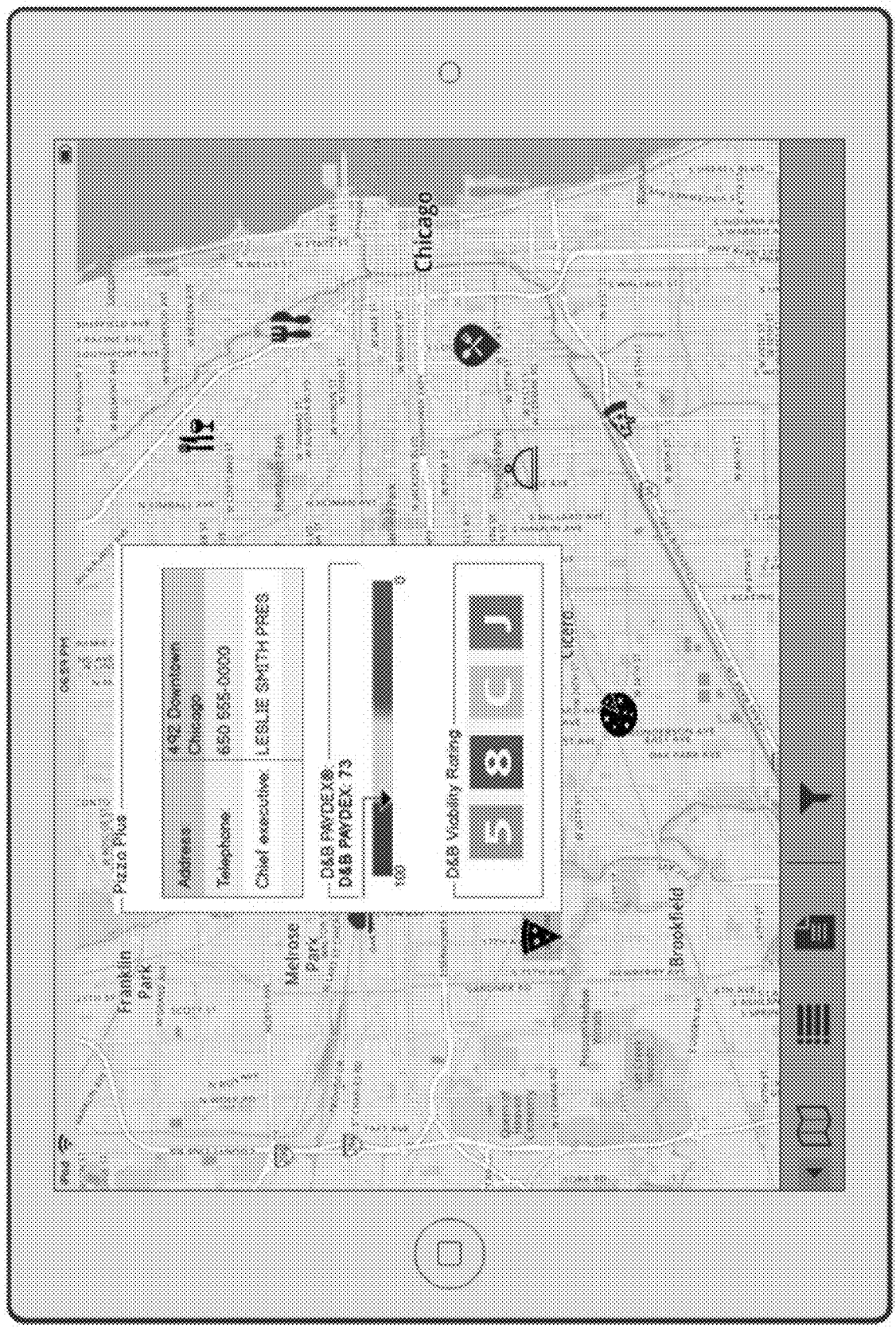
Figure 19E:
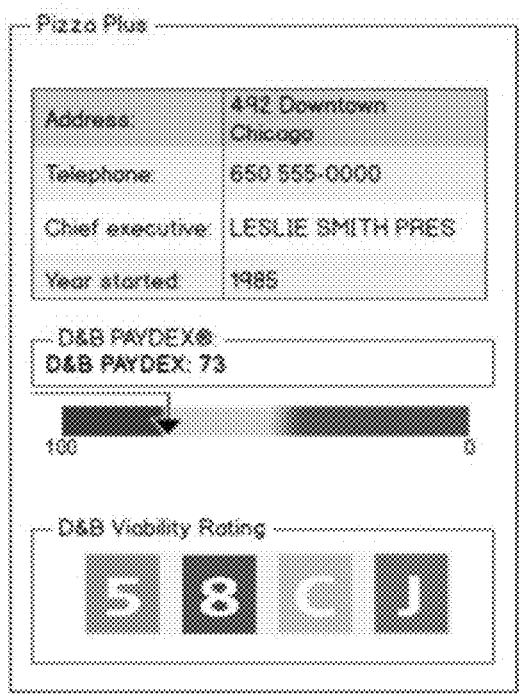

FIGS. 19D and 19E show an example of a Purchaser Report selected from the drop down menu on FIG. 19C for at least one embodiment of a BOP Application, the report including a D&B Paydex@ score and a D&B viability rating.

Figure 19F:
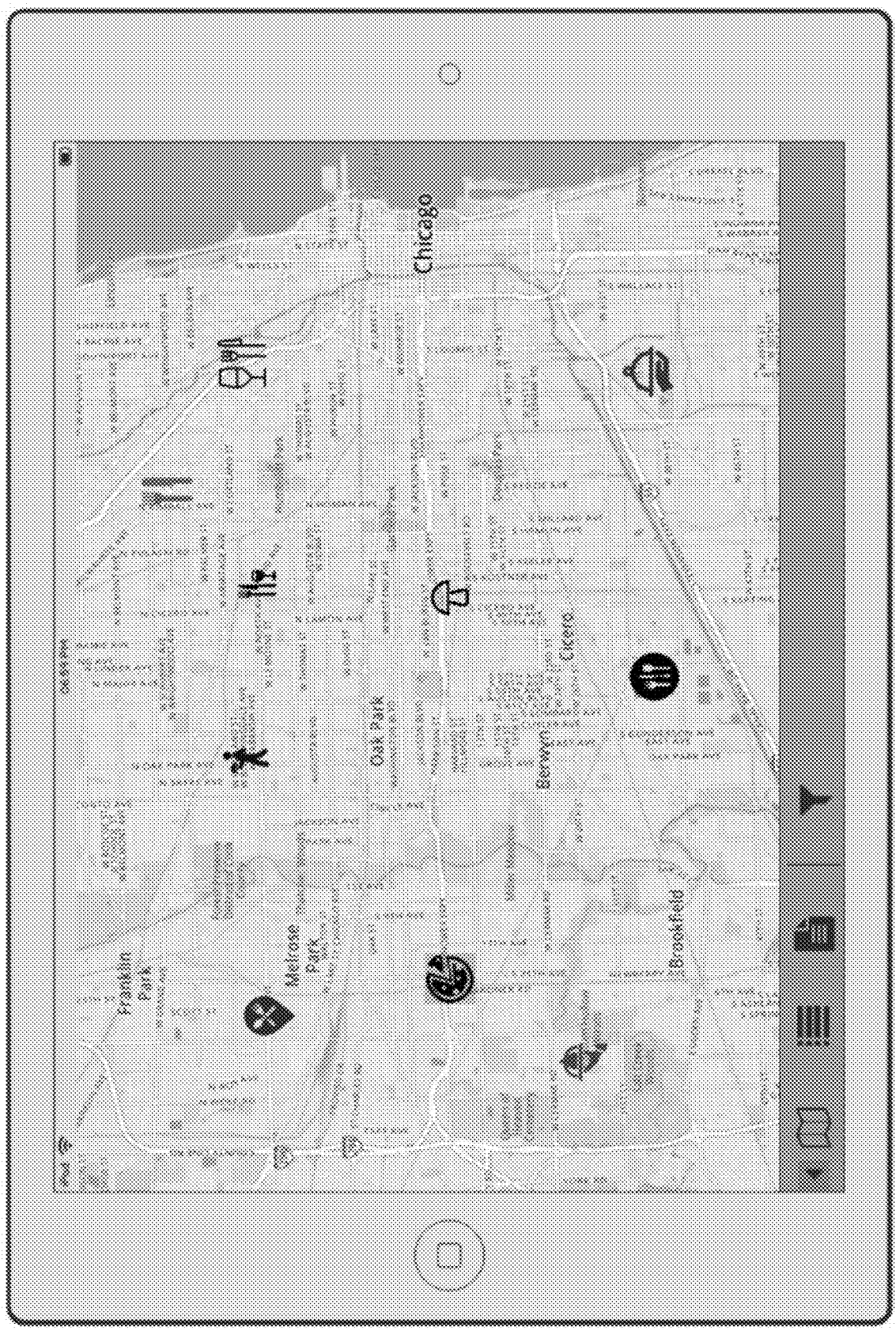

FIG. 19F shows an example of a Map Interface displaying mapped icons of customer models matched to the registered BOP entity, the Map Interface being accessed from a Customer Models sub component of the Customer Component Screen of FIG. 19A for at least one embodiment of a BOP Application.

Figure 19G:
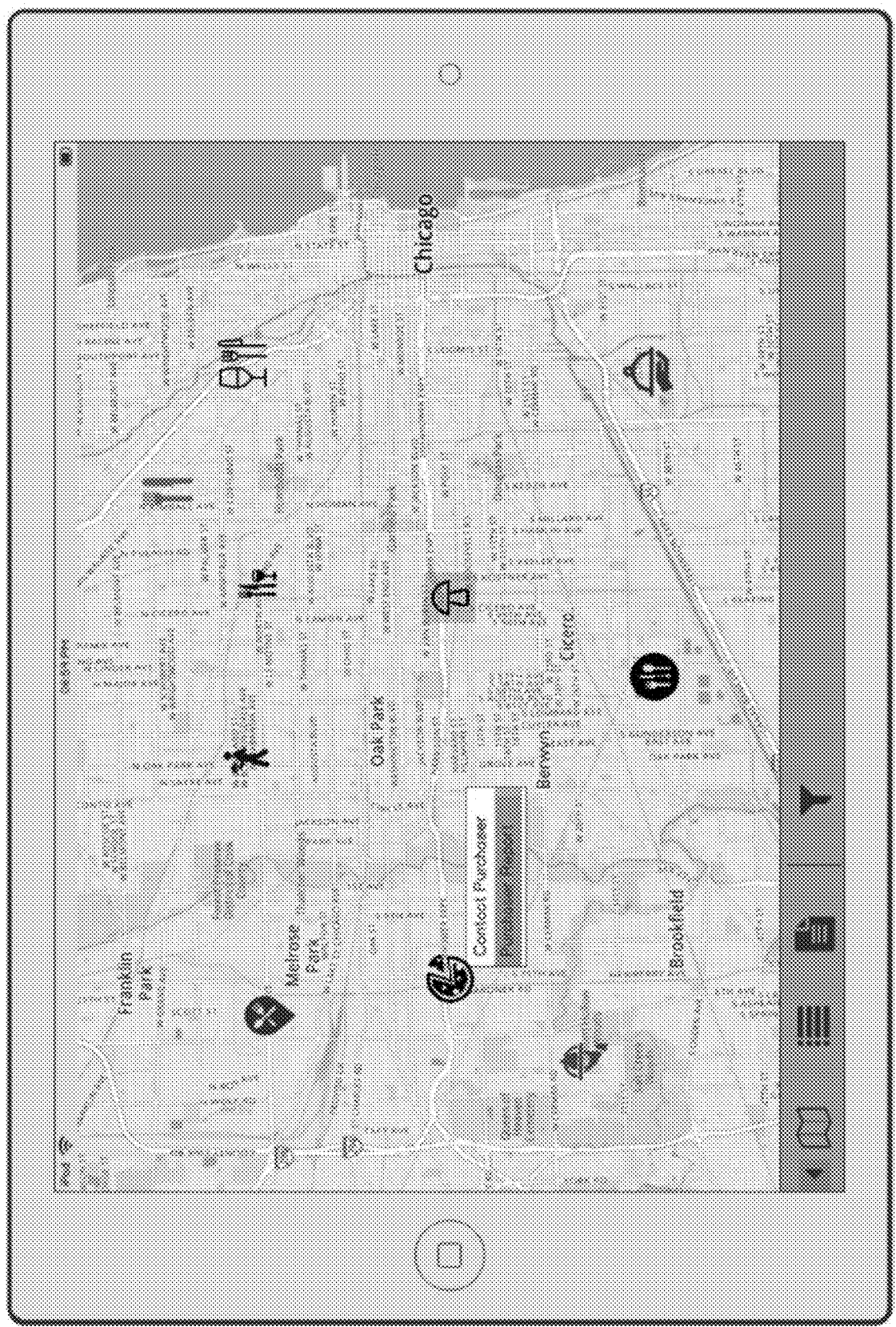

FIG. 19G shows an example of a Map Interface displaying a drop down menu from one of the mapped icons of the modeled customer icons on the Map Interface of FIG. 19F for at least one embodiment of a BOP Application.

Figure 19H:
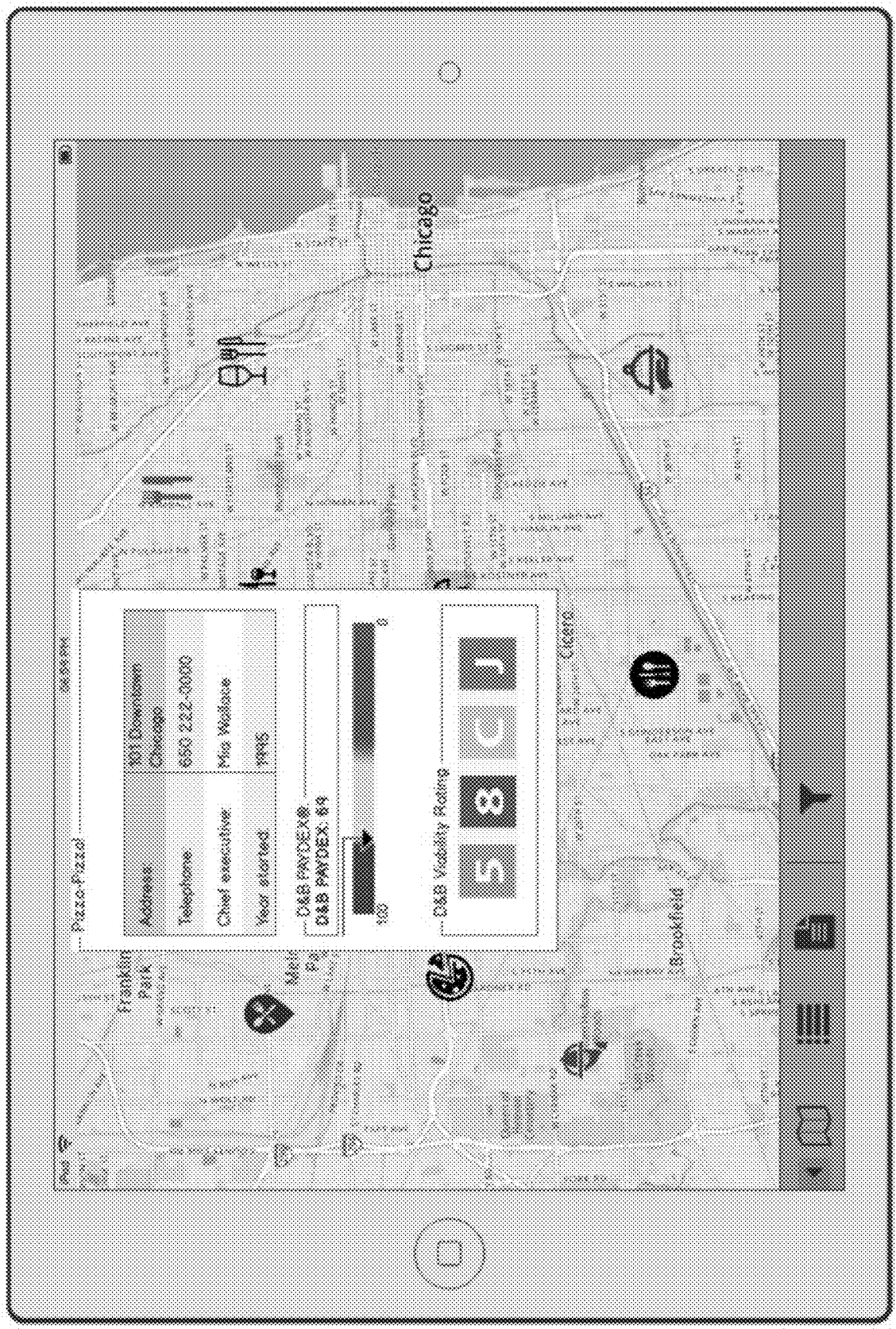

FIG. 19H shows an example of a Purchaser Report selected from the drop down menu on FIG. 19F for at least one embodiment of a BOP Application, the report including a D&B Paydex@ score and a D&B viability rating.

FIGS. 20A-21B show selected interfaces for a for at least one embodiment of a BOP Application. The exemplary BOP application is the same as that shown in FIGS. 12-19H, however the registered BOP entity (Pizza Plus Company) is different. As shown in the selected interfaces, the BOP entity of the interfaces shown in FIGS. 20A-21B is the Purchaser (Topping Inc.) shown in FIGS. 19C-E, and is shown as a Supplier in FIGS. 21A-21C.

Figure 20:
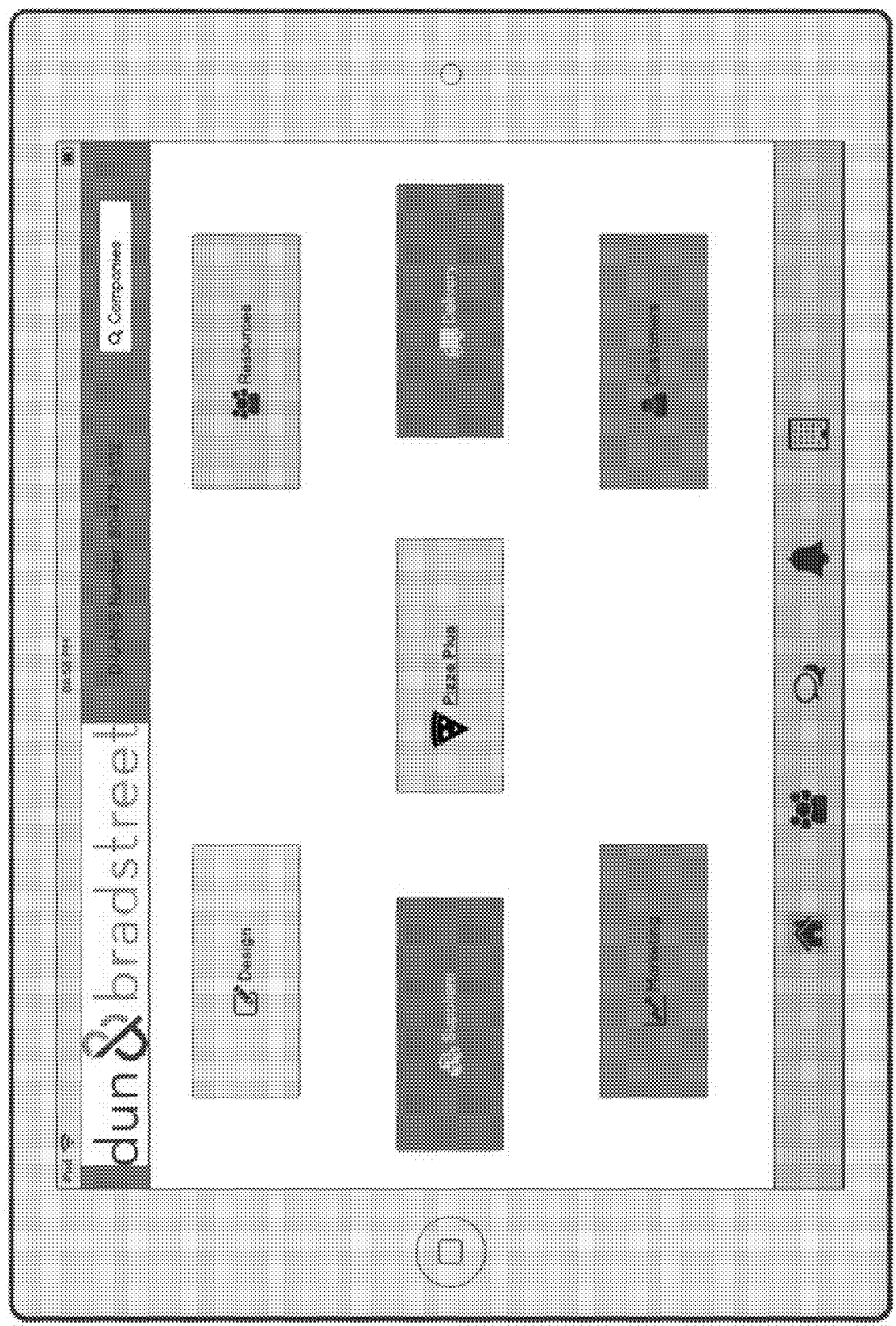

FIG. 20 shows an example of a Main Screen for at least one embodiment of a BOP Application including BOP Components for the registered BOP entity.

Figure 21:
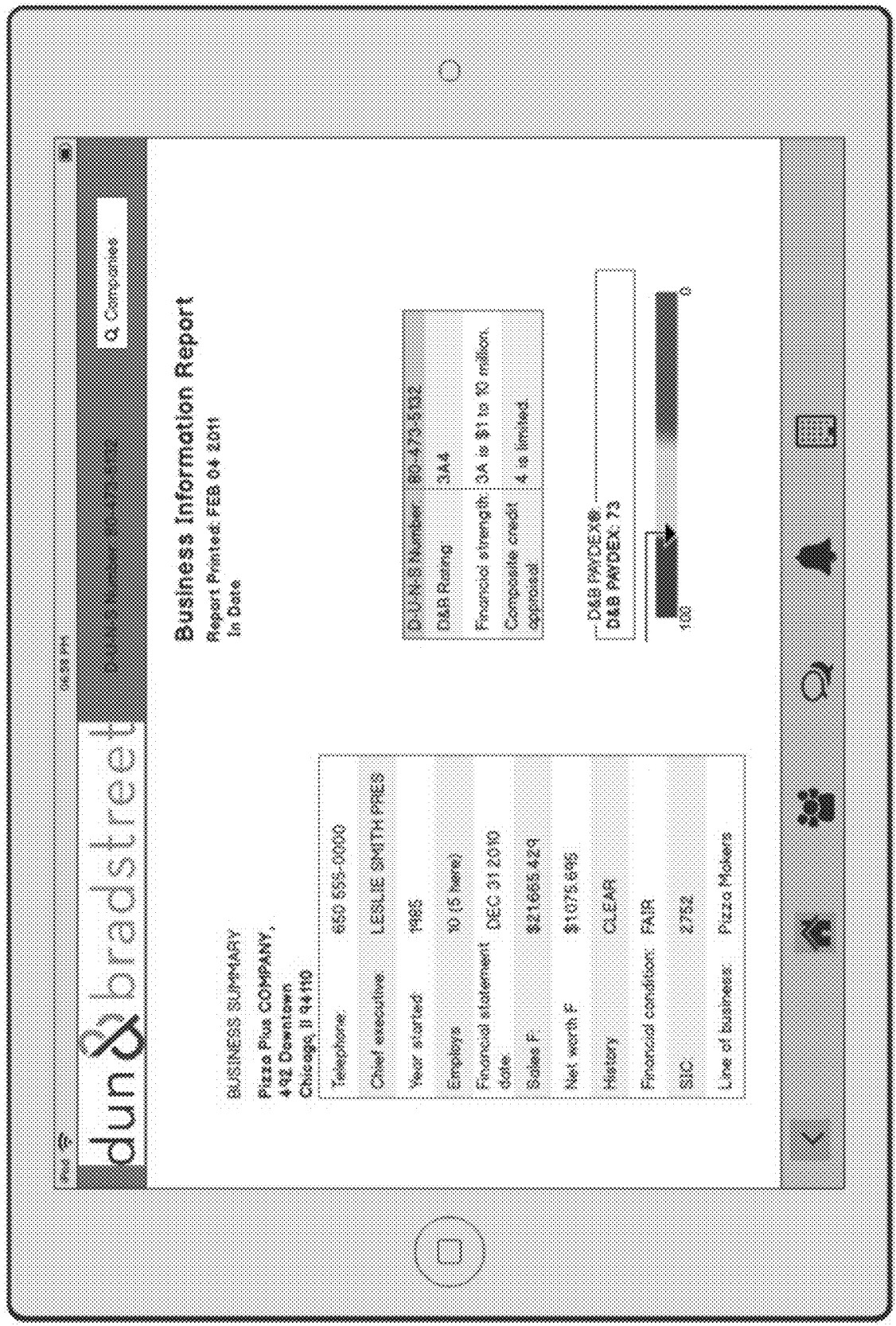

FIG. 21 shows an example of a Business Information Report for the registered BOP entity for at least one embodiment of a BOP Application, the information report including firmographic information and including entity rating scores, including a D&B rating and a D&B Paydex@. The Business Information Report is accessed from the registered BOP entity's hub for the BOP components.

Figure 22A:
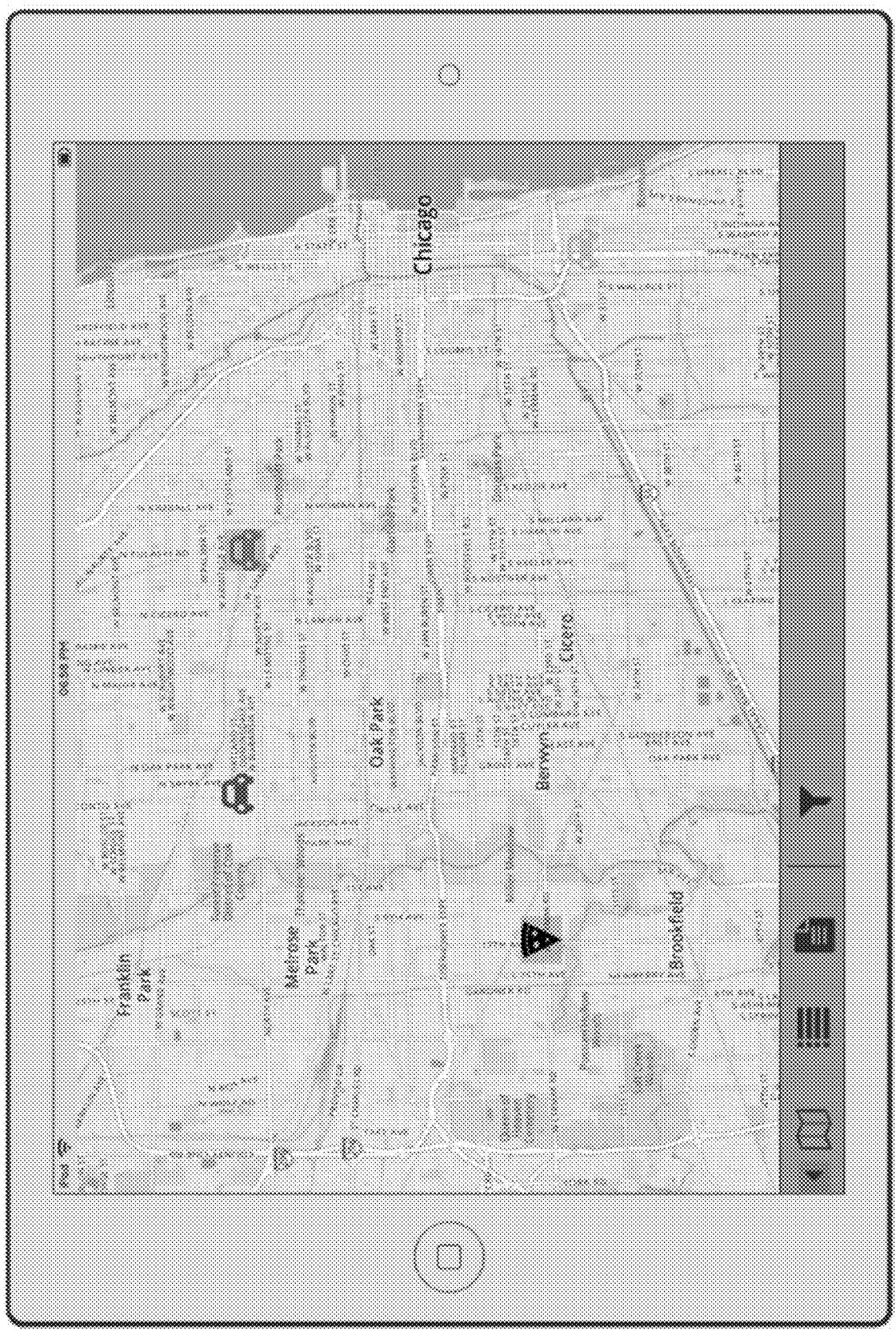

FIG. 22A shows an example of a Map Interface displaying mapped icons of Local Distributors for the registered BOP entity, the Map Interface being accessed from a Delivery Component as shown in FIG. 20, for at least one embodiment of a BOP Application.

Figure 22B:
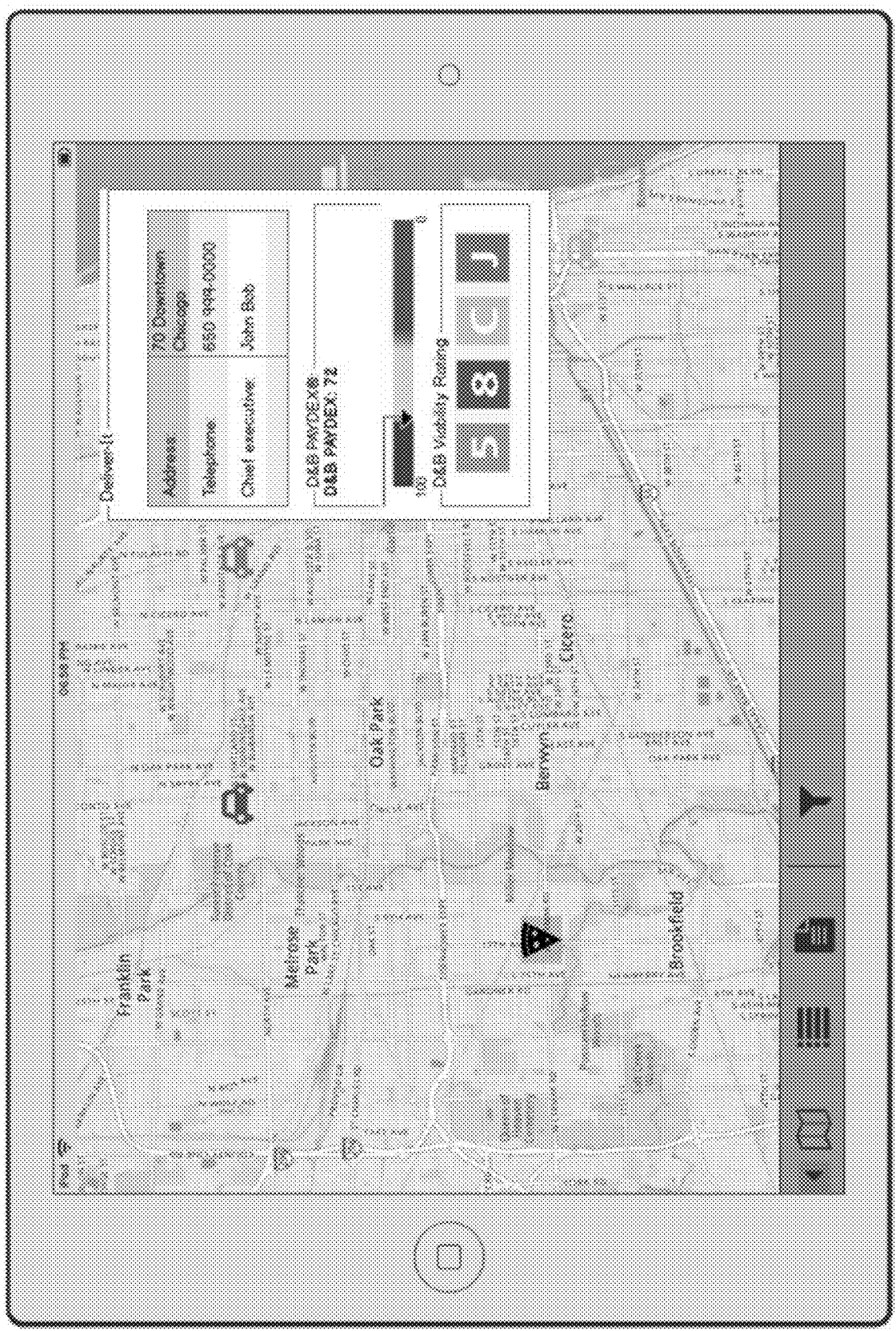

FIG. 22B shows an example of a Delivery Report for a delivery company selected from the drop down menu on FIG. 22A for at least one embodiment of a BOP Application, the report including a D&B Paydex@ score and a D&B viability rating.

Figure 23A:
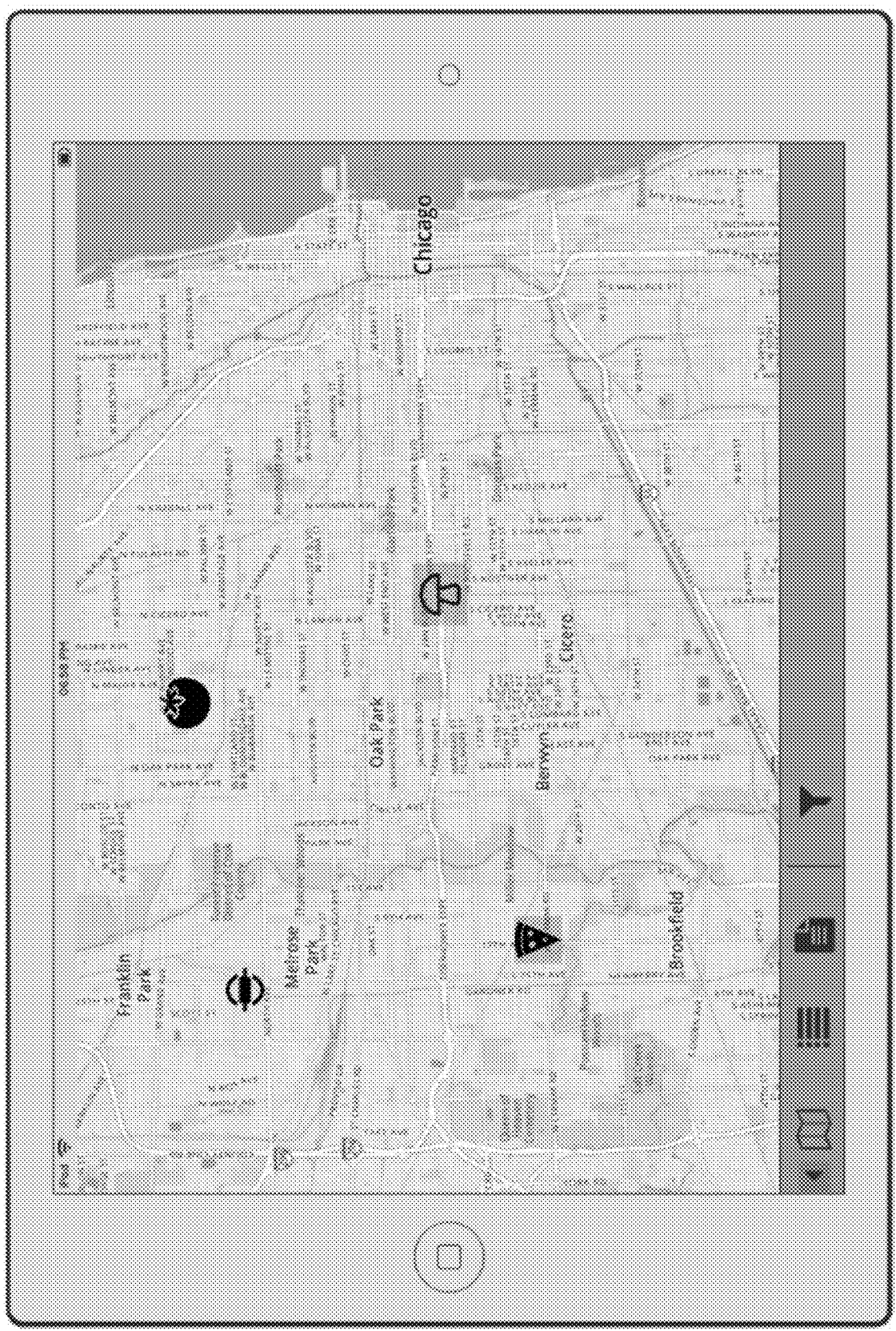

FIG. 23A shows an example Map Interface displaying mapped icons of Suppliers for different registered BOP entity, the Map Interface being accessed from a Supplier Directory sub component of Suppliers Component Screen similar to that shown in FIG. 17, for at least one embodiment of a BOP Application. As will be appreciated, the Supplier company of FIG. 23A is the registered business entity for the BOP Application interfaces shown in FIGS. 12-19H. As such the BOP and BOP Components of the two companies can have a BOP Network Score.

Figure 23B:
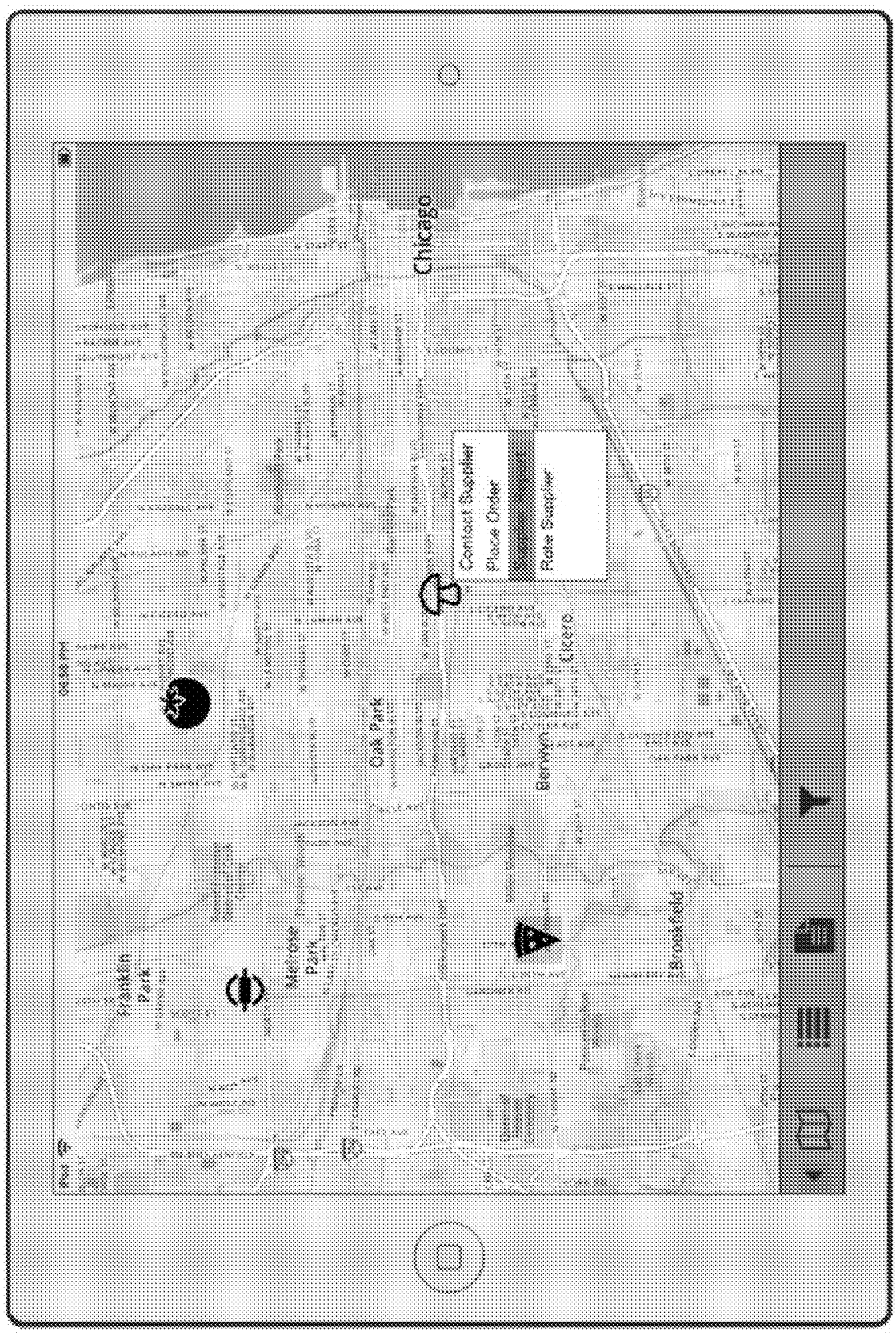

FIG. 23B shows an example of a Map Interface displaying a drop down menu from one of the mapped icons of a selected supplier icon on the Map Interface of FIG. 23A for at least one embodiment of a BOP Application.

Figure 23C:
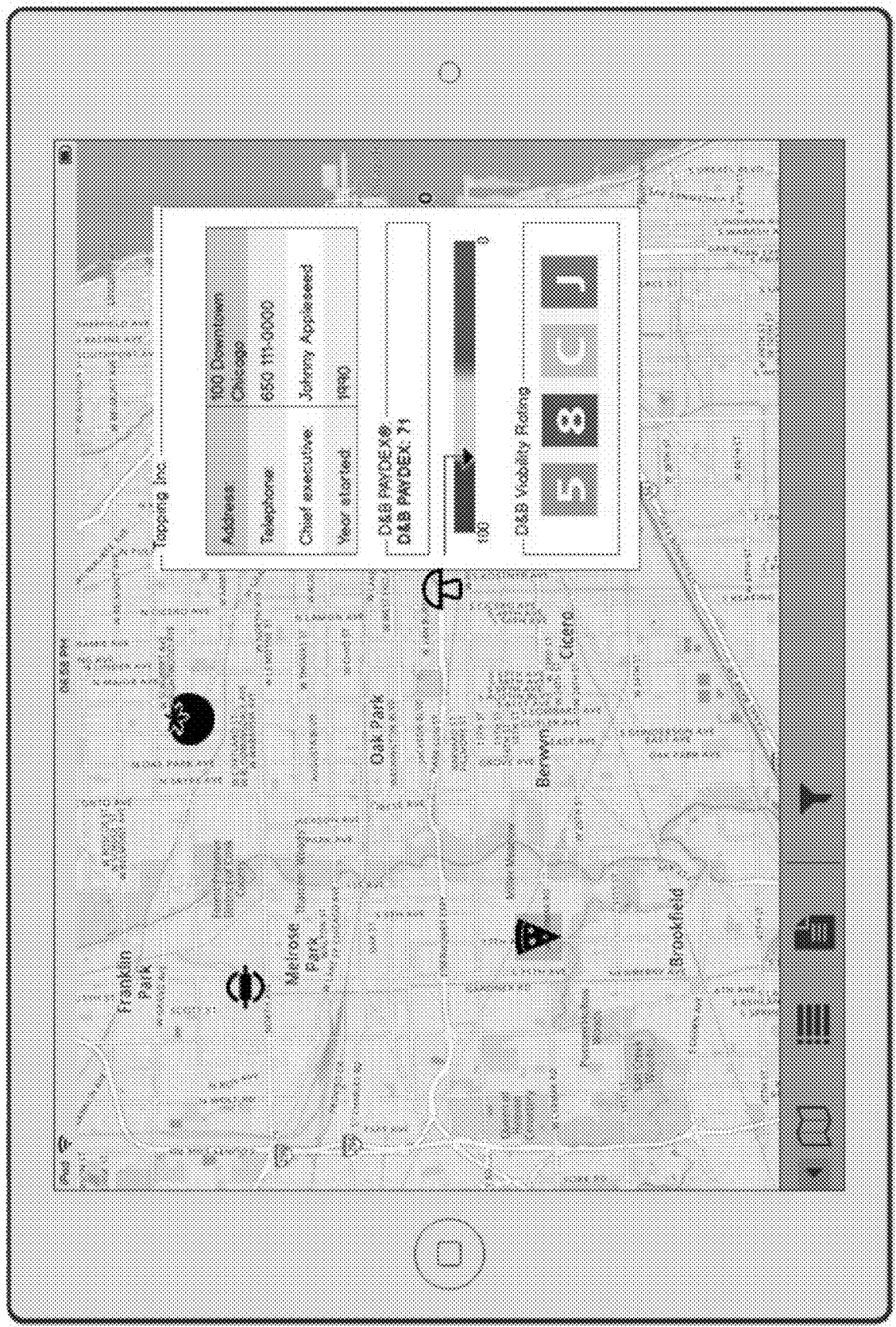

FIG. 23C shows an example of a Supplier Report selected from the drop down menu on FIG. 23B for at least one embodiment of a BOP Application, the report including a D&B Paydex@ score and a D&B viability rating.

Figure 24:
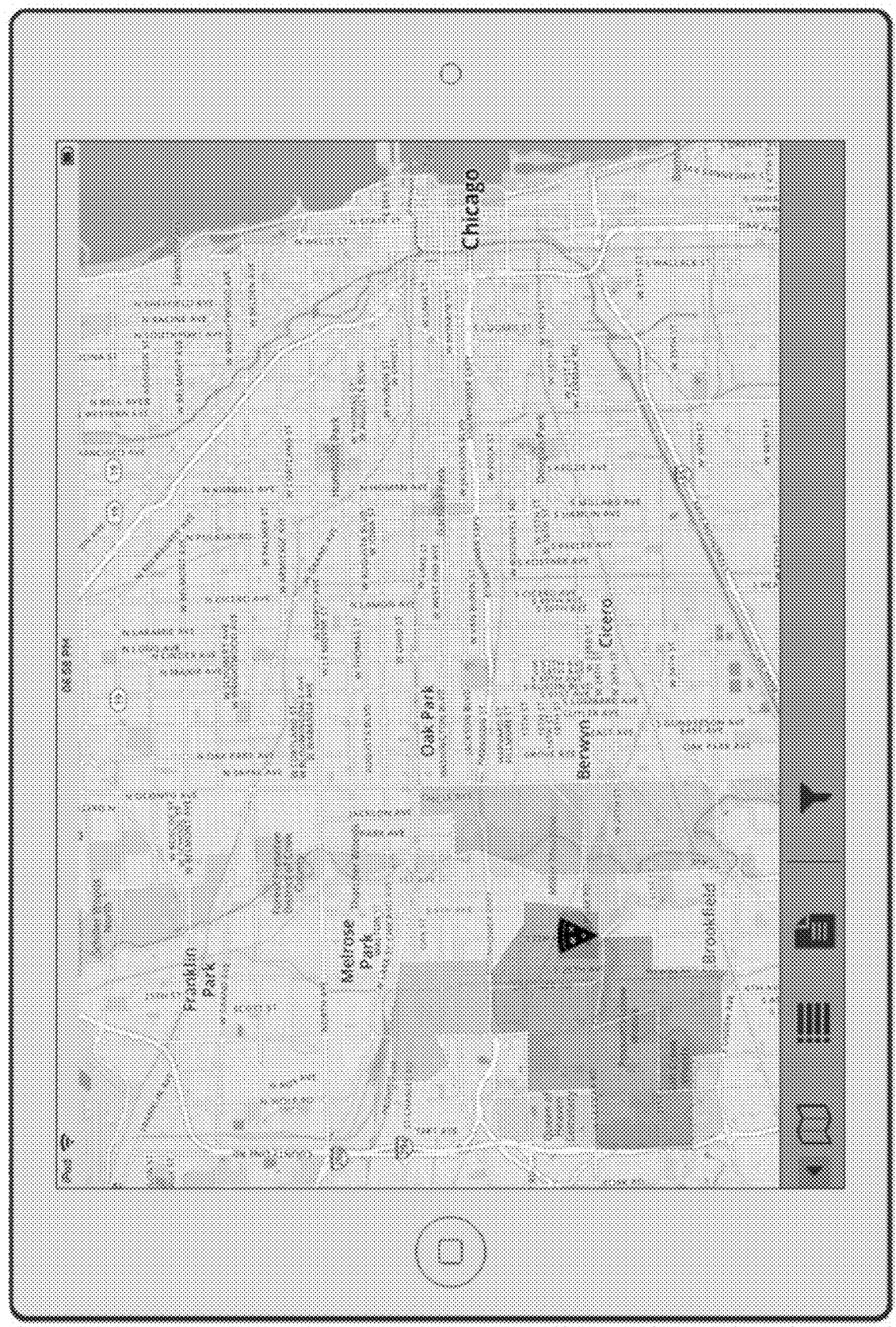

FIG. 24 shows an example of a Map Interface showing a Market Research screen accessed from a Market Research sub-component of the Delivery Component Screen of FIG. 20 for at least one embodiment of a BOP Application.

Figure 25:
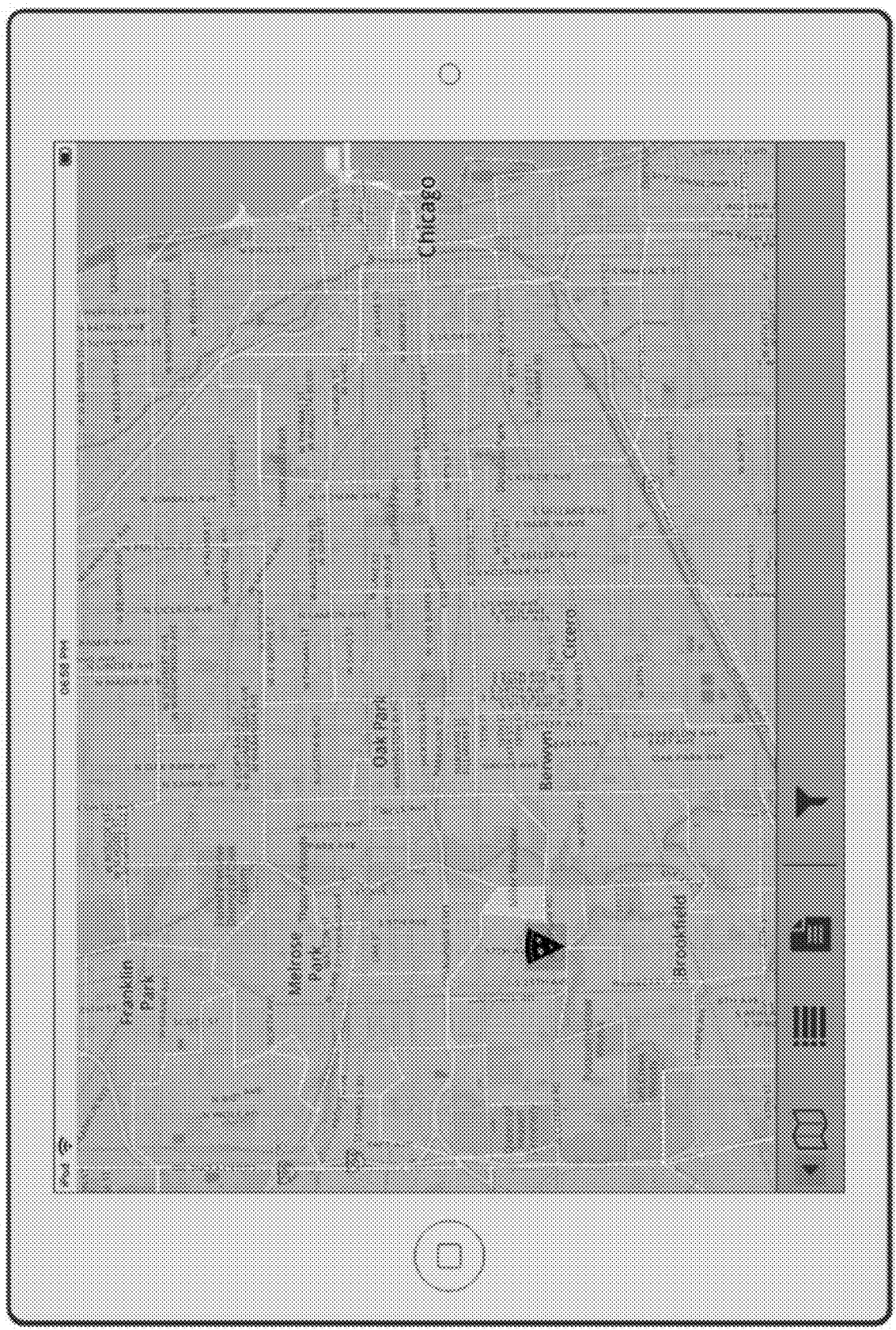

FIG. 25 shows an example of a Map Interface showing a Shop Front report for the registered BOP business accessed from a Shop Front sub-component of the Delivery Component Screen of FIG. 20 for at least one embodiment of a BOP Application.

It will be understood by those skilled in the art that various modifications, combinations, sub-combinations and alterations may occur depending on design requirements and other factors insofar as they are within the scope of the appended claims or the equivalents thereof.

The invention claimed is:

1. A system for providing a trusted network platform comprising:
   a system including one or more processors, a memory operatively coupled to at least one of the processors, and a computer-readable storage medium encoded with instructions executable by at least one of the processors, the system being configured to support a client application for a trusted network platform, the application comprising:
   a Business Organizing Principle ("BOP") module for a client business entity, the BOP module comprising a BOP tool for identifying a plurality of BOP components for the client business entity based on firmographic data for the client business entity, the BOP tool comprising a tool for distinguishing core BOP components from other BOP components,
   a BOP component matching module configured to generate matching information based on the firmographic data for the client business entity, wherein the BOP component matching module is configured to at least:
      match a BOP component of the plurality of the BOP components for the client business entity to at least one other scored business entity that can provide goods or services to the client business entity for that matched BOP component, wherein the BOP component is matched to the other scored business entity based on one or more trusted scores for the other scored business entity,
      generate a BOP component network link between the BOP component for the client business entity and the other matched scored business entity, and
      match the BOP component with at least one other BOP component of the at least one other scored business entity based on at least one score of the other BOP component, wherein the BOP component of the at least one other scored entity is based on firmographic data of the at least one other scored business entity,
   a scoring tool configured to provide one or more trusted scores for a business, the scores including:
   a BOP network score, wherein the BOP network score is derived from validation data between the BOP components, the validation data being derived from at least one distributed immutable ledger shared with the client business entity registered to the application;
   wherein the scoring tool is configured to use matching information from BOP component matches to calculate at least one score for the business.

2. The system of claim 1 wherein the application comprises:
   a data management tool configured to log transactions between the matched BOP components on the distributed immutable ledger and matching information generated by the matching module to a client business entity database; and
   a transaction tool configured to transact on the distributed immutable ledger, wherein the distributed immutable ledger is configured to encrypt blocks of ledger data by encoding each ledger block with a hash of a prior block.

3. The system of claim 1, wherein the BOP tool is configured to allow a user to categorize the BOP components, the categories including the core BOP components, medium core BOP components, and non-core BOP components, and wherein the BOP component matching module is configured to present matching information based on a BOP component category.

4. The system of claim 1, wherein the application further comprises:
   the BOP module including an interface tool configured to display the BOP components for the client business entity,
   wherein the BOP interface is configured to show the BOP components as a hub and spoke configuration,
   wherein the BOP interface is configured to color code the BOP components based on BOP category, and
   wherein the BOP interface is configured to show matching information for the BOP components.

5. The system of claim 1 wherein the data management tool is configured to allow the registered client business entity to control access to client data, including controlling access with the trusted network platform.

6. The system of claim 5 wherein, if the client business entity gives access to the trusted network platform, the client business entity's distributed immutable ledger is replicated to the trusted network platform host.

7. The system of claim 1 wherein the distributed immutable ledger is a Blockchain.

8. The system of claim 1 wherein the data management tool is configured to log and store client data in one or more databases of client data that is controlled by the client side of the application, wherein the client data includes data recorded on the distributed immutable ledger.

9. The system of claim 1 wherein the transactions recorded on the distributed immutable ledger are at least one of a smart contract or a cryptocurrency transaction.

10. The system of claim 1 wherein a transactions interface is linked to a BOP Billing component.

11. The system of claim 1 wherein the application comprises: an invitation interface tool for inviting businesses to join the platform or enter into transactions recorded on the distributed immutable ledger or both.

12. The system of claim 1 wherein the application comprises: a registration tool for registering the client business entity linked to the application to the trusted network platform;
   wherein the registration tool is configured to
      determine if the client business entity is registered with the trusted network platform,
      or register the client business entity to the trusted network platform, and
      wherein the application is configured to obtain the firmographic data for the client business entity.

13. The system of claim 1 wherein the application further comprises:
   a map tool configured to populate a map interface with match information generated by the matching module;
   the map interface, wherein the interface is configured to display trust information for trusted businesses, the trust information including trust information based on data provided from client business entity registered to the trusted network platform.

14. The system of claim 1 wherein the system further comprises a finance component and:

the scoring tool is configured to generate a finance score derived from validation data confirming transactions validated between components on the distributed immutable ledger;
wherein the finance score is based on at least the BOP network score; and
a finance matching module configured to match a client business entity with a funding source, wherein the finance matching module matches funding sources to the client business entity using the finance score
wherein the finance matching module is configured to match funding sources to the client entity employing at least one of:
a funding model;
an SIC code, and
a rate;
wherein the finance matching module is configured to allow the client business entity to provide access to the client data including data recorded on the distributed immutable ledger to a funding source;
wherein the finance matching module is configured to provide the funding source with firmographic data and business operation data.

15. The system of claim 1, wherein the BOP network score is defined as $$S_i = \sum_j w_{ij} S_j$$

where $w_{ij} = f(R_{ij}, V_{ij}, C_{ij}, \ldots)$
$R_{ij}$=Importance of firm j for the business i–core/non-core relationship
$V_{ij}$=Strength of relationship between firms i and j
$C_{ij}$=Network distance between businesses i and j
and wherein V_ij is a volume of transactions.

16. The system of claim 1, wherein the BOP network score includes a base score and a plurality of tiered scores.

17. The system of claim 1, wherein the BOP network score is weighted into an entity rating score to generate an extended entity rating score.

18. The system of claim 1, wherein a geographic score includes a local score, wherein the local score is based on a BOP component distance.

19. The system of claim 1 wherein the scoring tool is configured to use the client business entity data the system is given access to for generating at least one of the scores.

20. The system of claim 1 wherein the scoring tool is configured to use matching information from BOP component matches to recalculate at least BOP network score.

21. The system of claim 1, wherein the system further comprises an interface for third party providers.

22. A method comprising:
provide an entity rating score for each of a plurality of business entities registered to a business network platform;
providing an application that is configured to:
create a Business Organizing Principle ("BOP") for a client business entity, the BOP comprising a plurality of BOP components based on firmographic data for the client business entity,
record application usage and transaction data on a distributed immutable ledger, wherein the distributed immutable ledger is configured with encrypted blocks of ledger data, where each ledger block is encoded with a hash of a prior block;
select one or more other scored business entities, BOP components, or both matched to the BOP component by a BOP matching module based on the firmographic data for the business entity, the BOP matching module being configured to at least:
match a BOP component of the plurality of the BOP components for the client business entity to at least one other scored business entity that can provide goods or services to the client business entity for that matched BOP component, wherein the BOP component is matched to the other scored business entity based on one or more trusted scores for the other scored business entity,
generate a BOP component network link between the BOP component for the client business entity and the other matched scored business entity, and
match the BOP component with at least one other BOP component of the at least one other scored business entity based on at least one score of the other BOP component, wherein the BOP component of the at least one other scored entity is based on firmographic data of the at least one other scored business entity;
record one or more transactions with the selected business entity and/or BOP component on the distributed immutable ledger;
provide at least one BOP network score generated for the businesses registered on the BOP network platform based on BOP component transactions recorded on the distributed immutable ledger facilitated by the application.

* * * * *